(12) United States Patent
Micucci et al.

(10) Patent No.: US 11,250,055 B2
(45) Date of Patent: Feb. 15, 2022

(54) SYSTEMS AND METHODS FOR PROVIDING ACCESS TO EXTERNAL CONTENT OBJECTS

(71) Applicant: salesforce.com, inc., San Francisco, CA (US)

(72) Inventors: Michael Micucci, San Francisco, CA (US); Suarav Mohapatra, Burlingame, CA (US); David Goldbrenner, San Francisco, CA (US); Nicolas Maquaire, San Francisco, CA (US); Laurent Kubaski, Paris (FR); Raphael Jean-Leconte, Paris (FR)

(73) Assignee: salesforce.com, inc., San Francisco, CA (US)

( * ) Notice: Subject to any disclaimer, the term of this patent is extended or adjusted under 35 U.S.C. 154(b) by 162 days.

(21) Appl. No.: 16/567,709

(22) Filed: Sep. 11, 2019

(65) Prior Publication Data
US 2020/0004783 A1    Jan. 2, 2020

Related U.S. Application Data

(63) Continuation of application No. 15/666,278, filed on Aug. 1, 2017, now Pat. No. 10,776,425, which is a
(Continued)

(51) Int. Cl.
*H04L 29/06*   (2006.01)
*G06F 16/90*   (2019.01)

(52) U.S. Cl.
CPC ............ *G06F 16/90* (2019.01); *H04L 63/08* (2013.01); *H04L 63/029* (2013.01); *H04L 63/168* (2013.01)

(58) Field of Classification Search
CPC .... G06F 16/90; G06F 16/903; G06F 16/9035; G06F 16/9038; H04L 63/08;
(Continued)

(56) References Cited

U.S. PATENT DOCUMENTS 5,577,188 A    11/1996  Zhu
5,608,872 A     3/1997  Schwartz et al.
(Continued)

FOREIGN PATENT DOCUMENTS

EP         2860646        4/2015

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.
(Continued)

*Primary Examiner* — Edward Zee
(74) *Attorney, Agent, or Firm* — Weaver Austin Villeneuve & Sampson LLP

(57) ABSTRACT

Disclosed are methods, apparatus, systems and computer program products for database system communications with external content management data sources. In some implementations, the data sources are identified in a user interface. An authorization selection enables authorization of a given identified data source, and a customization selection enables customization of one or more search settings for searching content of the data source. Persistent objects representing content objects of the data sources can be stored in one or more databases. A database search can be performed on both native database files and the persistent objects.

20 Claims, 48 Drawing Sheets

Related U.S. Application Data continuation of application No. 14/189,702, filed on Feb. 25, 2014, now Pat. No. 9,747,388, which is a continuation-in-part of application No. 13/844,203, filed on Mar. 15, 2013, now Pat. No. 8,990,958.

(60) Provisional application No. 61/845,015, filed on Jul. 11, 2013, provisional application No. 61/695,984, filed on Aug. 31, 2012.

(58) Field of Classification Search
CPC ..... H04L 63/029; H04L 63/168; H04L 63/10; H04L 63/101; H04L 63/102; H04L 63/104

See application file for complete search history.

(56) References Cited

U.S. PATENT DOCUMENTS

| | | | |
|---|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,200,775 B2 | 6/2012 | Moore |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,990,958 B2 | 3/2015 | Micucci et al. |
| 9,703,815 B2 | 7/2017 | Goldbrenner et al. |
| 9,747,388 B2 | 8/2017 | Micucci et al. |
| 9,892,177 B2 | 2/2018 | Maquaire et al. |
| 9,990,426 B2 | 6/2018 | Micucci et al. |
| 10,146,812 B2 | 12/2018 | Goldbrenner et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |

(56) References Cited

U.S. PATENT DOCUMENTS

| | | |
|---|---|---|
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0173985 A1 | 8/2006 | Moore |
| 2007/0150603 A1 | 6/2007 | Crull et al. |
| 2008/0082540 A1 | 4/2008 | Weissman et al. |
| 2008/0195483 A1 | 8/2008 | Moore |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0313250 A1 | 12/2010 | Chow |
| 2011/0071950 A1 | 3/2011 | Ivanovic |
| 2011/0218958 A1 | 9/2011 | Warshavsky et al. |
| 2011/0231276 A1 | 9/2011 | Yeap et al. |
| 2011/0247051 A1 | 10/2011 | Bulumulla et al. |
| 2011/0258679 A1 | 10/2011 | Kaplinger et al. |
| 2011/0320423 A1 | 12/2011 | Gemmell et al. |
| 2012/0042218 A1 | 2/2012 | Cinarkaya et al. |
| 2012/0078931 A1 | 3/2012 | Jaquette |
| 2012/0130973 A1 | 5/2012 | Tamm et al. |
| 2012/0227089 A1 | 9/2012 | Lee et al. |
| 2012/0233137 A1 | 9/2012 | Jakobson et al. |
| 2012/0290407 A1 | 11/2012 | Hubbard et al. |
| 2013/0019320 A1 | 1/2013 | Ericsson et al. |
| 2013/0091188 A1* | 4/2013 | Du .............. G06F 16/182 707/827 |
| 2013/0110922 A1 | 5/2013 | Shih et al. |
| 2013/0173798 A1 | 7/2013 | Micucci et al. |
| 2013/0174275 A1 | 7/2013 | Micucci et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0012908 A1 | 1/2014 | Manry et al. |
| 2014/0181013 A1 | 6/2014 | Micucci et al. |
| 2014/0230076 A1 | 8/2014 | Micucci et al. |
| 2014/0258418 A1* | 9/2014 | Subramani .......... H04L 67/1095 709/205 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0019480 A1 | 1/2015 | Maquaire et al. |
| 2015/0019559 A1 | 1/2015 | Maquaire et al. |
| 2015/0095162 A1 | 4/2015 | Jakobson et al. |
| 2015/0142596 A1 | 5/2015 | Jakobson et al. |
| 2015/0143503 A1 | 5/2015 | Micucci et al. |
| 2015/0172563 A1 | 6/2015 | Jakobson et al. |
| 2017/0329864 A1 | 11/2017 | Micucci et al. |
| 2018/0121440 A1 | 5/2018 | Maquaire et al. |
| 2019/0065537 A1 | 2/2019 | Goldbrenner et al. |

OTHER PUBLICATIONS

U.S. Office Action dated Jul. 31, 2014 issued in U.S. Appl. No. 13/844,203.
U.S. Notice of Allowance dated Nov. 24, 2014 issued in U.S. Appl. No. 13/844,203.
U.S. Office Action dated Aug. 12, 2016 issued in U.S. Appl. No. 14/189,781.
U.S. Final Office Action dated Feb. 17, 2017 issued in U.S. Appl. No. 14/189,781.
U.S. Office Action dated Jun. 30, 2017 issued in U.S. Appl. No. 14/189,781.
U.S. Final Office Action dated Nov. 15, 2017 issued in U.S. Appl. No. 14/189,781.
U.S. Notice of Allowance dated Mar. 21, 2018 issued in U.S. Appl. No. 14/189,781.
U.S. Office Action dated Aug. 13, 2015 issued in U.S. Appl. No. 14/609,027.
U.S. Office Action dated Sep. 24, 2015 issued in U.S. Appl. No. 14/189,702.
U.S. Final Office Action dated May 5, 2016 issued in U.S. Appl. No. 14/189,702.
U.S. Office Action dated Jul. 28, 2016 issued in U.S. Appl. No. 14/189,702.
U.S. Final Office Action dated Jan. 5, 2017 issued in U.S. Appl. No. 14/189,702.
U.S. Notice of Allowance dated Apr. 27, 2017 issued in U.S. Appl. No. 14/189,702.
U.S. Office Action dated Aug. 8, 2019 issued in U.S. Appl. No. 15/666,278.
European Extended Search Report dated Mar. 12, 2015 issued in Application No. EP 14 184 739.2.
European Office Action dated Jan. 24, 2017 issued in Application No. EP 14 184 739.2.
OPML article from Wikipedia, dated Jun. 26, 2011 (2 pages) https://en.wikipedia.org/w/index.php?title-OPML&oldid=436268846.

* cited by examiner

Event History Table 910

| Event ID 911 | Object ID 912 | Created by ID 913 |
|---|---|---|
| E1 | O615 | U5 |
| E2 | O489 | U101 |

Field Change Table 920

| Event ID 921 | Old value 922 | New value 923 |
|---|---|---|
| E37 | 300 | 400 |
| E37 | 4.23 | 4.10 |

Comment Table 930

| Event ID 931 | Comment 932 | Time/Date 933 |
|---|---|---|
| E37 | " " | 10-21-2010 5:32 PM |
| E37 | " " | 9-17-2010 |

Post Table 950

| Event ID 951 | Post Text 952 | Time/Date 953 |
|---|---|---|
| E69 | " " | 10-11-2010 4:12 PM |
| E90 | " " | 8-12-2010 |

User Subscription Table 940

| User ID 941 | Object ID 942 |
|---|---|
| U819 | O615 |
| U819 | O489 |
| U719 | O615 |

News Feed Table 960

| User ID 961 | Event ID 962 |
|---|---|
| U819 | E37 |
| U819 | E90 |
| U719 | E37 |

*FIGURE 9A*

```
                                                            ┌─ 1600
┌──────────────────────────────────────────────────────────┐
│ Computer-implemented method for providing access in an on-demand │
│ database service to a content object stored in an external content │
│           management data source                          │
└──────────────────────────────────────────────────────────┘
                              │                    ┌─ 1604
┌──────────────────────────────────────────────────────────┐
│ Receive at a computing device, information data identifying a │
│ content object from an on-demand database service, wherein the │
│ content object is stored in a content management data source │
│        external to the on-demand database service          │
└──────────────────────────────────────────────────────────┘
                              │                    ┌─ 1608
┌──────────────────────────────────────────────────────────┐
│ Communicate the information data identifying the content object to │
│ the content management data source through one or more │
│               middleware components                       │
└──────────────────────────────────────────────────────────┘
                              │                    ┌─ 1612
┌──────────────────────────────────────────────────────────┐
│ Establish access by the one or more middleware components with │
│ the content object to retrieve data regarding the content object │
└──────────────────────────────────────────────────────────┘
                              │                    ┌─ 1616
┌──────────────────────────────────────────────────────────┐
│ Store the data regarding the content object in a persistent object in │
│ a database of the on-demand database service, wherein the │
│ persistent object represents the content object in the on-demand │
│ database service and includes the information data identifying the │
│                     content object                        │
└──────────────────────────────────────────────────────────┘
                              │                    ┌─ 1620
┌──────────────────────────────────────────────────────────┐
│ Provide a selectable component for the persistent object to a │
│ display device operable to display the selectable component in a │
│ user interface for the on-demand database service          │
└──────────────────────────────────────────────────────────┘
```

*FIGURE 16*

Insert

*Provide values for the ContentVersion fields below:* — 2401

| Field — 2402 | Value | Smart Lookup |
|---|---|---|
| ContentDocumentID | | ▶ — 2404 |
| ContentLocation — 2405 | E | |
| ContentUrl | | |
| Description | | |
| ExternalDataSourceId — 2406 | OXCD000000005Q | ▶ |
| ExternalDocumentInfo1 — 2407 | /Shared%20Documents/Sales%205 | |
| ExternalDocumentInfo2 | | |
| FirstPublishLocationId | | ▶ |
| Origin — 2408 | H | |
| OwnerId | | ▶ |
| PathOnClient — 2409 | Sales%Strategies%202012.doc | |
| ReasonForChange | * | |
| TagCsv | | |
| Title — 2410 | Sales Strategies 2012 | |
| VersionData | | |

[Confirm Insert]

FIGURE 24

External Data Source: SharePoint

These settings identify an outside content system and let Salesforce access it. ← 2700

[Edit] [Validate and Sync] [Delete]

Label SharePoint ← 2702
Name SharePoint ← 2703
Type Content Hub SharePoint ← 2704
Server URL http://contenthub/?
factoryClassName=net.entropysoft.eci.sharepoint.clientom.SharepointClientOMContentProviderFactory&sharepointConnectorUrl=https%3A//entropysoft1.sharepoint.com
/&authenticationMode=Office 365 ← 2705

Default External Repository ← 2706

▼ Authentication

Identity Type ● Per User ← 2707
Authentication Protocol ● Basic Authentication ← 2708
Administration Username mylogin ← 2709

[Edit] [Validate and Sync] [Delete]

External Objects ← 2711 ← 2710

| Action | Label | Namespace Prefix | Description | Table Name |
|---|---|---|---|---|
| Edit \| Del | items_SharePoint ← 2712 | | | items_SharePoint |

Administrative Permissions

| Permission | | Permission | |
|---|---|---|---|
| API Enabled | ☑ | Manage Data Integrations | ☐ |
| API Only User | ☐ | Manage Dynamic Dashboards | ☐ |
| Author Apex | ☐ | Manage Email Client Configurations | ☐ |
| Bulk API Hard Delete | ☐ | Manage Letterheads | ☐ |
| Chatter Internal User | ☑ | Manage Mobile Configurations | ☐ |
| Create and Customize List Views | ☑ | Manage Package Licenses | ☐ |
| Create and Own New Chatter Groups | ☑ | Manage Public Documents | ☐ |
| Create and Upload Change Sets | ☐ | Manage Public List Views | ☐ |
| Customize Application | ☐ | Manage Public Reports | ☐ |
| Deploy Change Sets | ☐ | Manage Public Templates | ☐ |
| Edit HTML Templates | ☐ | Manage Salesforce CRM Content | ☐ |
| Edit Read Only Fields | ☐ | Manage Users | ☐ |
| Enable Content Hub | ☑ (3001) | Moderate Chatter | ☐ |

SYSTEMS AND METHODS FOR PROVIDING ACCESS TO EXTERNAL CONTENT OBJECTS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This patent document relates generally to accessing content in an external data repository from an on-demand database service and, more specifically, to techniques for providing access in an on-demand database service to a content object stored in an external content management data source.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Various content files and folders can be accessed in a cloud computing context. However, many of the content files and folders are stored across multiple data repositories. As such, it can be difficult to connect, access, and search for desired data across the multiple data repositories. It can also be difficult for users to share such content and collaborate with each other regarding the content in a cloud computing context, such as an online social network. Such difficulties can be exacerbated where the tools and techniques for providing access and referencing such content are limited.

BRIEF DESCRIPTION OF THE DRAWINGS

The included drawings are for illustrative purposes and serve only to provide examples of possible structures and operations for the disclosed inventive systems, apparatus, and methods for providing access in an on-demand database service to a content object stored in an external content management data source. These drawings in no way limit any changes in form and detail that may be made by one skilled in the art without departing from the spirit and scope of the disclosed implementations.

FIG. 7 shows an example of a group feed on a group page according to some implementations.

FIG. 8 shows an example of a record feed containing a feed tracked update, post, and comments according to some implementations.

FIG. 9A shows an example of a plurality of tables that may be used in tracking events and creating feeds according to some implementations.

FIG. 16 shows a flowchart of an example of a computer-implemented method 1600 for providing access in an on-demand database service to a content object stored in an external content management data source, performed in accordance with some implementations.

FIG. 24 shows an example of an application programming interface (API) for creating a persistent object representing a content object.

FIG. 27 shows an example of a settings page and details page for previously identified accessible external data sources.

FIG. 28 shows an example of a user interface for administering authorized connections to one or more external content management data sources.

FIG. 30 shows an example of a user interface for administering the permissions of the user accounts in accessing the one or more external data sources.

FIG. 34 shows an example of an example of a user interface displaying a content files list including the reference to the content object stored in the external content management data source from FIG. 32B.

FIG. 35 shows an example of a user interface including a detailed information page displaying data regarding a persistent object representing the content object stored in the external content management data source from FIG. 32B.

FIGS. 38A, 38B and 38C show an example of a user interface illustrating navigation through content files and folders stored in an external content management data source from an on-demand database service.

FIG. 38D shows an example of a user interface illustrating a detailed information page displaying data in the on-demand database service for an external content file.

FIGS. 39A, 39B and 39C show an example of a user interface illustrating a sequence of steps for sharing a content file stored in an external content management data source in an information feed in the on-demand database service.

DETAILED DESCRIPTION

Figure 1A:
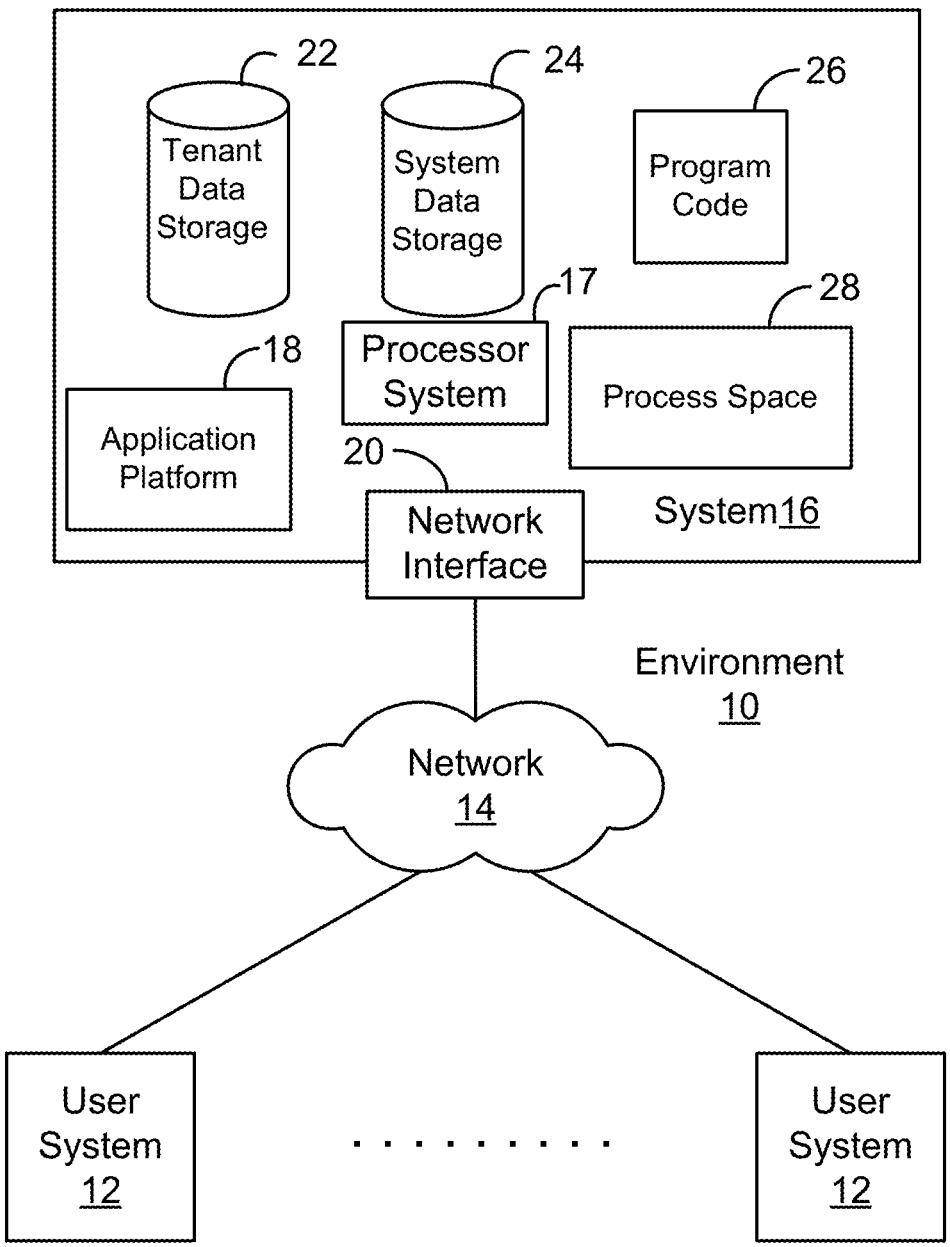
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for establishing access with and providing access to a content object stored in a content management data source from an on-demand database service. The on-demand database service can include online business applications and online social networks, also referred to herein as a social networking system.

Online social networks are increasingly becoming a common way to facilitate communication among people, any of whom can be recognized as users of a social networking system. One example of an online social network is Chatter®, provided by salesforce.com, inc. of San Francisco, Calif. salesforce.com, inc. is a provider of social networking services, customer relationship management (CRM) services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some online social networks can be implemented in various settings, including organizations. For instance, an online social network can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some online social networks, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Typically, content stored outside of an on-demand database service may be difficult to access from the on-demand database service and may be limited to having to move, replicate, or provide a hyperlink to the content. In addition, access to such content may be limited as various data repositories have different APIs for access and authentication requirements. Furthermore, various content files and folders may be scattered across a plurality of different data sources. Thus, users may be limited in their ability to access, collaborate on, share, modify, comment on, search, view, and otherwise interact with content stored in external data sources in an on-demand database service.

Some implementations of the disclosed systems, apparatus, methods, and computer readable storage media are configured to establish access with a content object stored in a content management data source from an on-demand database service. A computing device such as a server may receive a request from a user of the on-demand database service to access data regarding a content object stored in a content management data source, where the content management data source is external to the on-demand database service. Data regarding the content object in the content management data source may be identified via a universal application programming interface (API). The request may be communicated to a repository-specific connector, where the repository-specific connector is in communication with the content management data source. Access with the content object is established to retrieve the data regarding the content object. A virtual object associated with the on-demand database service may be created, where the virtual object instantiates connection between the content object and the on-demand database service. Data regarding the content object is provided to a display device operable to display the data regarding the content object in a user interface for the on-demand database service.

Some implementations of the disclosed systems, apparatus, methods, and computer readable storage media are configured to provide access in an on-demand database service to a content object stored in an external content management data source. A computing device such as a server may receive information data identifying a content object from an on-demand database service, where the content object is stored in a content management data source external to the on-demand database service. The information data identifying the content object may be communicated to the content management data source through one or more middleware components. Access may be established with the content object to retrieve data regarding the content object. The data regarding the content object may be stored in a persistent object in a database of the on-demand database service, where the persistent object represents the content object in the on-demand database service and includes the information data identifying the content object. A selectable component for the persistent object may be provided to a display device operable to display the selectable component in a user interface for the on-demand database service.

Some implementations of the disclosed systems, apparatus, methods, and computer readable storage media are configured to interact with a content object stored in an external content management data source. A computing device such as a server may access a content object stored in a content management data source, where the content management data source is external to the on-demand database service, and where the information data identifying the content object is stored in a persistent object in a database of the on-demand database service, the persistent object representing the content object. The computing device may receive an indication of an event requesting interaction with the content object. The persistent object may be updated to reflect the interaction with the content object.

Some implementations of the disclosed systems, apparatus, methods, and computer readable storage media are configured to identify a category associated with a persistent object in an on-demand database service. A computing device such as a server may receive information data identifying a content object from an on-demand database service, where the content object is stored in a content management data source external to the on-demand database service. Access may be established with the content object to retrieve data regarding the content object. The data regarding the content object may be stored in a persistent object in a database of the on-demand database service, where the persistent object represents the content object in the on-demand database service and includes information data identifying the content object. A selectable component for the persistent object is provided to a display device operable to display the selectable component in a user interface for the on-demand database service. At least one category associated with the persistent object is identified, the identified category configured to be stored in a data entry among a plurality of data entries in the database of the on-demand database service.

As more and more users and organizations move toward more collaborative sharing models to communicate and conduct business, there is a desire to better access, expose, integrate, and utilize content. Content may be fragmented across a number of data sources outside of an on-demand database service. For example, the on-demand database service may be operated by or on behalf of a first service provider, such as an organization or other type of entity, while the "outside" data sources are operated by or on behalf of a different second service provider. Conventionally, access to such content and sharing such content may be limited in an online social network or online business application, since different service providers generally have different and separately maintained security models restricting access to their respective services.

Some of the implementations described herein are directed to providing access to external content stored in an external data source, where "external" can refer to data sources maintained by other entities than the service provider providing a given on-demand database service. One or more middleware components may facilitate access to the external data sources, including external content management data sources. Communication may be established with the external content management data sources through repository-specific connectors, and communication with the repository-specific connectors may occur through one or more abstraction layers and/or one or more virtual objects. Connection between a content object in the external content management data source and the on-demand database service may be instantiated. In some implementations, the one or more middleware components may be configured to traverse a security layer between the on-demand database service and an on-premise content management data source. A unique and persistent representation of the content object may be stored as a persistent object in a database of the on-demand database service.

Data regarding the accessed content object may be stored in the persistent object in the on-demand database service. A persistent object behaves like a record stored in the on-demand database service. A persistent object can correspond to an external content object and allow an entity to access the external content object via a URL or unique content object identifier (ID). In some instances, the external content object can be accessed through the persistent object without moving or replicating the external content object. The persistent object can include some attributes of the external content object as well as other attributes described in greater detail below. In some instances, the persistent object may not be synchronized with the external content object.

The persistent object can be indexed, searched, commented upon, recommended to other users, liked, disliked, followed, shared, accessed, propagated, edited, updated, deleted, and otherwise interacted with in the on-demand database service. Because the persistent object is part of the on-demand database service, such as an online social network, the persistent object allows data regarding the content object to be shared, accessed, viewed, modified, collaborated upon, and otherwise interacted with in the context of an online social network. Interactions with the content object may be performed through a temporarily created virtual object. Requests to modify the content object may occur through the on-demand database service directly or through a notification of a modification of the content object from the external content management data source. Updates to the content object may be reflected in the persistent object.

One or more categories associated with the persistent object may be stored as one or more data entries in an index of categories, where the one or more categories can be topics associated with the persistent object. The topics can be determined using a social intelligence engine that analyzes data regarding the content object, such as the contents of the content object or the metadata associated with the content object. In addition, identification of appropriate topics may be based in part on data information ascertained from the social layer in which the persistent object is provided. Identification of appropriate topics can be further reinforced by event-based data, including user interaction data with respect to the persistent object. For example, the social intelligence engine can analyze selection of the persistent object from a search query or analyze attribute information of users that accessed the content object. Data gathered in the analysis can be used to predict and deliver the persistent object to users in the on-demand database service that would likely find the content object interesting, useful, and/or relevant.

By way of an example, a user in Chatter® or other online social network may have files stored in Dropbox, SharePoint, and other content management repositories. By implementing the one or more middleware components described above, which can be referred to as "content hub," the user in Chatter® can establish access to such files without having to have Chatter® host the content itself. The user can post any of those files in a feed or other social layer, thereby enabling other users with appropriate permissions to access and otherwise interact with the posted files as if the files were native to Chatter®. Interactions with the posted files in Chatter® can be written and saved to the files stored in Dropbox, SharePoint, etc. As the posted files are incorporated in the social environment, information regarding the files can be ascertained and delivered to other users in Chatter® that may find the files interesting, useful, and/or relevant.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and messages, such as posts, comments, likes, etc., can define group conversations and change over time.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
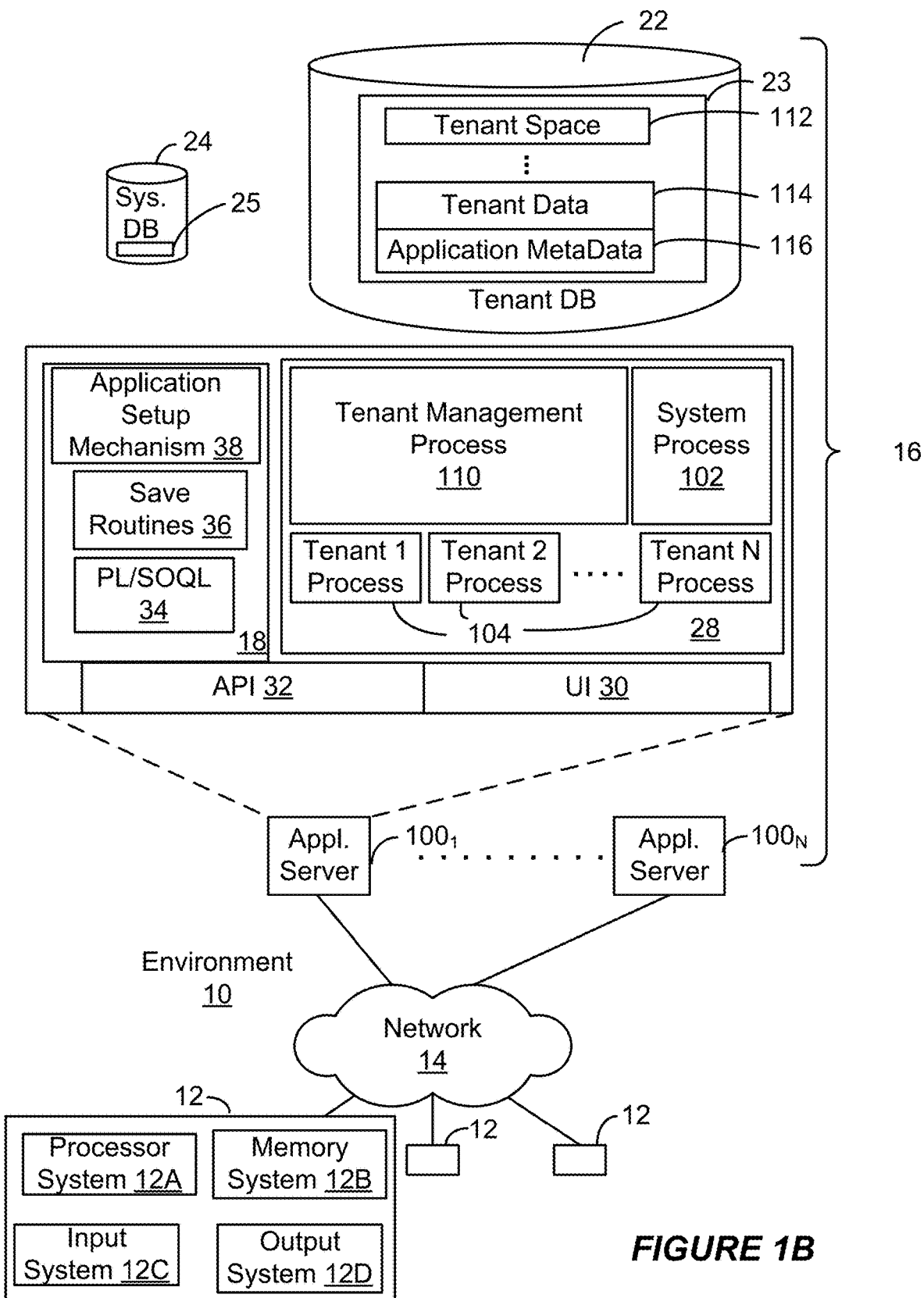
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle| databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
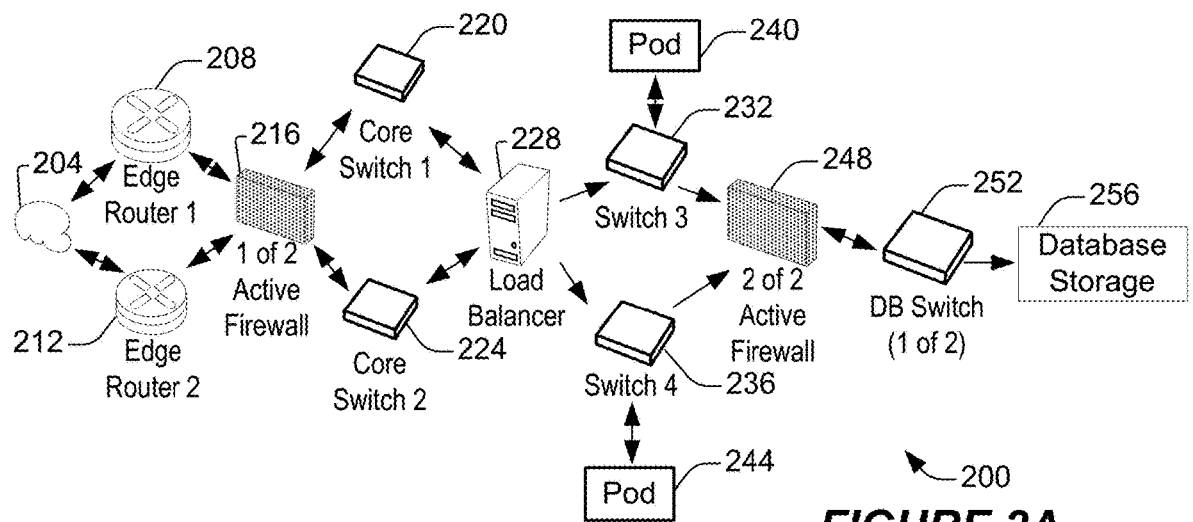
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
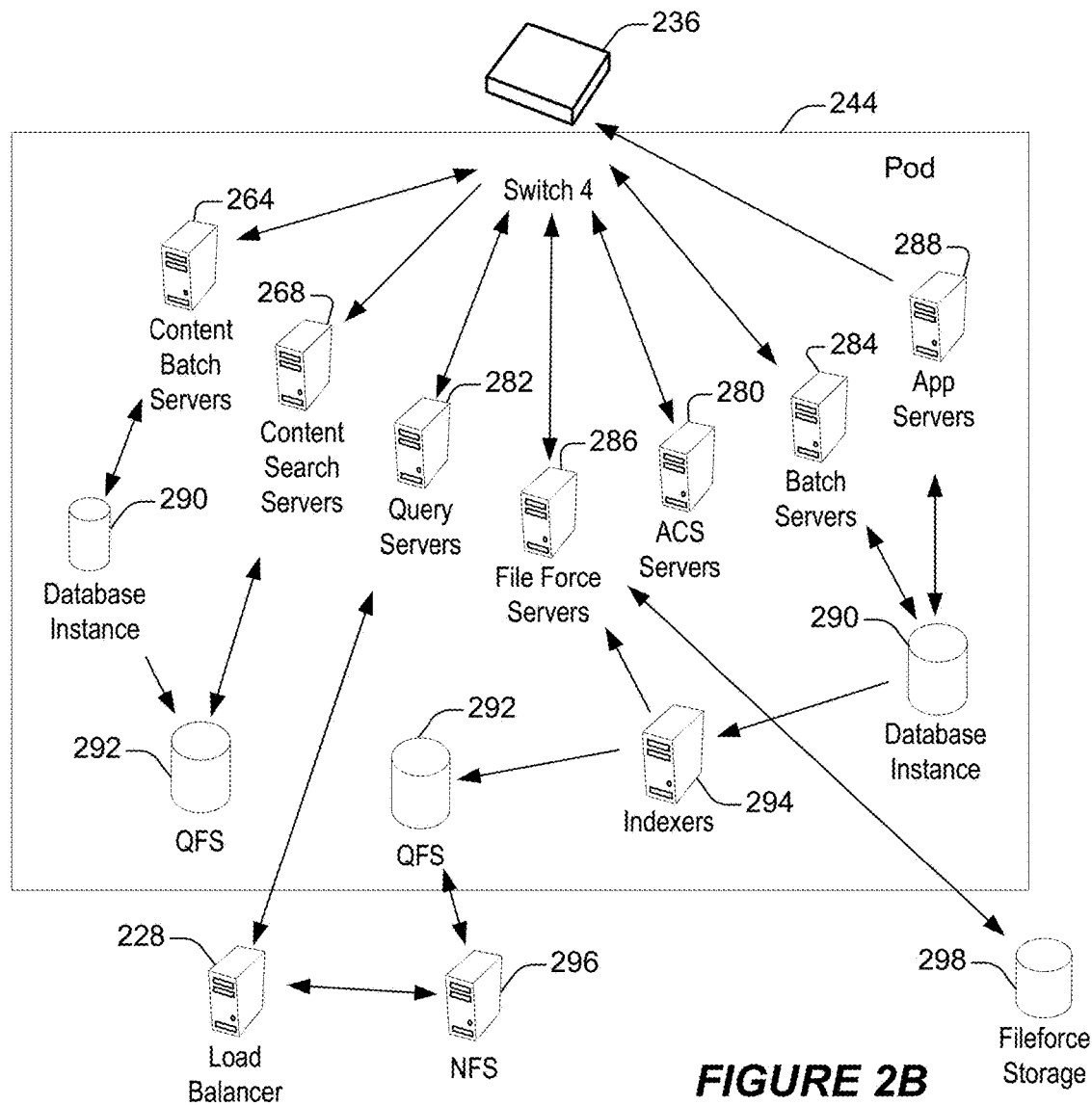
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 15-40. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an email to certain people, but this is onerous and the salesperson might not email all of the people who need to know or want to know. Accordingly, some implementations of the disclosed techniques can inform others (e.g., co-workers) who want to know about an update to a record automatically.

Figure 3:
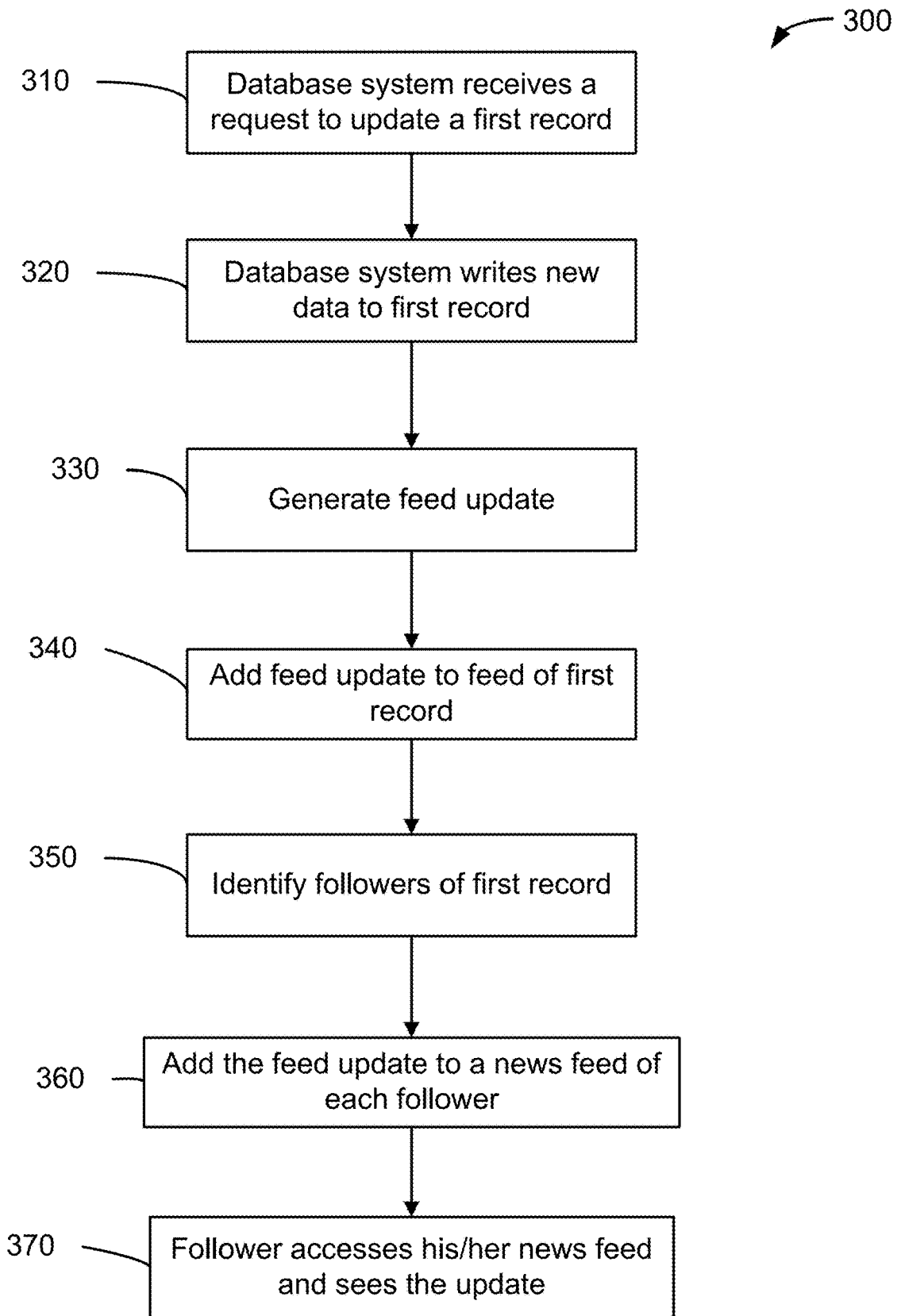
FIG. 3 shows a flowchart of an example of a method 300 for tracking updates to a record stored in a database system, performed in accordance with some implementations.

FIG. 3 shows a flowchart of an example of a method 300 for tracking updates to a record stored in a database system, performed in accordance with some implementations. Method 300 (and other methods described herein) may be implemented at least partially with multi-tenant database system 16, e.g., by one or more processors configured to receive or retrieve information, process the information, store results, and transmit the results. In other implementations, method 300 may be implemented at least partially with a single tenant database system. In various implementations, blocks may be omitted, combined, or split into additional blocks for method 300, as well as for other methods described herein.

In block 310, the database system receives a request to update a first record. In one implementation, the request is received from a first user. For example, a user may be accessing a page associated with the first record, and may change a displayed field and hit save. In another implementation, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other implementations, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type to another (e.g., converting a lead to an opportunity), closing a record (e.g., a case type record), and potentially any other state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In block 320, the database system writes new data to the first record. In one implementation, the new data may include a new value that replaces old data. For example, a field is updated with a new value. In another implementation, the new data can be a value for a field that did not contain data before. In yet another implementation, the new data could be a flag, e.g., for a status of the record, which can be stored as a field of the record.

In some implementations, a "field" can also include records, which are child objects of the first record in a parent-child hierarchy. A field can alternatively include a pointer to a child record. A child object itself can include further fields. Thus, if a field of a child object is updated with a new value, the parent record also can be considered to have a field changed. In one example, a field could be a list of related child objects, also called a related list.

In block 330, a feed tracked update is generated about the update to the record. In one implementation, the feed tracked update is created in parts for assembling later into a display version. For example, event entries can be created and tracked in a first table, and changed field entries can be tracked in another table that is cross-referenced with the first table. More specifics of such implementations are provided later, e.g., with respect to FIG. 9A. In another implementation, the feed tracked update is automatically generated by the database system. The feed tracked update can convey in words that the first record has been updated and provide details about what was updated in the record and who performed the update. In some implementations, a feed tracked update is generated for only certain types of event and/or updates associated with the first record.

In one implementation, a tenant (e.g., through an administrator) can configure the database system to create (enable) feed tracked updates only for certain types of records. For example, an administrator can specify that records of designated types such as accounts and opportunities are enabled. When an update (or other event) is received for the enabled record type, then a feed tracked update would be generated. In another implementation, a tenant can also specify the fields of a record whose changes are to be tracked, and for which feed tracked updates are created. In one aspect, a maximum number of fields can be specified for tracking, and may include custom fields. In one implementation, the type of change can also be specified, for example, that the value change of a field is to be larger than a threshold (e.g., an absolute amount or a percentage change). In yet another implementation, a tenant can specify which events are to cause a generation of a feed tracked update. Also, in one implementation, individual users can specify configurations specific to them, which can create custom feeds as described in more detail below.

In one implementation, changes to fields of a child object are not tracked to create feed tracked updates for the parent record. In another implementation, the changes to fields of a child object can be tracked to create feed tracked updates for the parent record. For example, a child object of the parent type can be specified for tracking, and certain fields of the child object can be specified for tracking. As another example, if the child object is of a type specified for tracking, then a tracked change for the child object is propagated to parent records of the child object.

In block 340, the feed tracked update is added to a feed for the first record. In one implementation, adding the feed tracked update to a feed can include adding events to a table (which may be specific to a record or be for all or a group of objects), where a display version of a feed tracked update can be generated dynamically and presented in a GUI as a feed item when a user requests a feed for the first record. In another implementation, a display version of a feed tracked update can be added when a record feed is stored and maintained for a record. As mentioned above, a feed may be maintained for only certain records. In one implementation, the feed of a record can be stored in the database associated with the record. For example, the feed can be stored as a field (e.g., as a child object) of the record. Such a field can store a pointer to the text to be displayed for the feed tracked update.

In some implementations, only the current feed tracked update (or other current feed item) may be kept or temporarily stored, e.g., in some temporary memory structure. For example, a feed tracked update for only a most recent change to any particular field is kept. In other implementations, many previous feed tracked updates may be kept in the feed. A time and/or date for each feed tracked update can be tracked. Herein, a feed of a record is also referred to as an entity feed, as a record is an instance of a particular entity object of the database.

In block 350, followers of the first record can be identified. A follower is a user following the first record, such as a subscriber to the feed of the first record. In one implementation, when a user requests a feed of a particular record, such an identification of block 350 can be omitted. In another implementation where a record feed is pushed to a user (e.g., as part of a news feed), then the user can be identified as a follower of the first record. Accordingly, this block can include the identification of records and other objects being followed by a particular user.

In one implementation, the database system can store a list of the followers for a particular record. In various implementations, the list can be stored with the first record or associated with the record using an identifier (e.g., a pointer) to retrieve the list. For example, the list can be stored in a field of the first record. In another implementation, a list of the records that a user is following is used. In one implementation, the database system can have a routine that runs for each user, where the routine polls the records in the list to determine if a new feed tracked update has been added to a feed of the record. In another implementation, the routine for the user can be running at least partially on a user device, which contacts the database to perform the polling.

In block 360, in one implementation, the feed tracked update can be stored in a table, as described in greater detail below. When the user opens a feed, an appropriate query is sent to one or more tables to retrieve updates to records, also described in greater detail below. In some implementations, the feed shows feed tracked updates in reverse chronological order. In one implementation, the feed tracked update is pushed to the feed of a user, e.g., by a routine that determines the followers for the record from a list associated with the record. In another implementation, the feed tracked update is pulled to a feed, e.g., by a user device. This pulling may occur when a user requests the feed, as occurs in block 370. Thus, these actions may occur in a different order. The creation of the feed for a pull may be a dynamic creation that identifies records being followed by the requesting user, generates the display version of relevant feed tracked updates from stored information (e.g., event and field change), and adds the feed tracked updates into the feed. A feed of feed tracked updates of records and other objects that a user is following is also generally referred to herein as a news feed, which can be a subset of a larger information feed in which other types of information updates appear, such as posts.

In yet another implementation, the feed tracked update could be sent as an email to the follower, instead of in a feed. In one implementation, email alerts for events can enable people to be emailed when certain events occur. In another implementation, emails can be sent when there are posts on a user profile and posts on entities to which the user subscribes. In one implementation, a user can turn on/off email alerts for all or some events. In an implementation, a user can specify what kind of feed tracked updates to receive about a record that the user is following. For example, a user can choose to only receive feed tracked updates about certain fields of a record that the user is following, and potentially about what kind of update was performed (e.g., a new value input into a specified field, or the creation of a new field).

In block 370, a follower can access his/her news feed to see the feed tracked update. In one implementation, the user has just one news feed for all of the records that the user is following. In one aspect, a user can access his/her own feed by selecting a particular tab or other object on a page of an interface to the database system. Once selected the feed can be provided as a list, e.g., with an identifier (e.g., a time) or including some or all of the text of the feed tracked update. In another implementation, the user can specify how the feed tracked updates are to be displayed and/or sent to the user. For example, a user can specify a font for the text, a location of where the feed can be selected and displayed, amount of text to be displayed, and other text or symbols to be displayed (e.g., importance flags).

Figure 4:
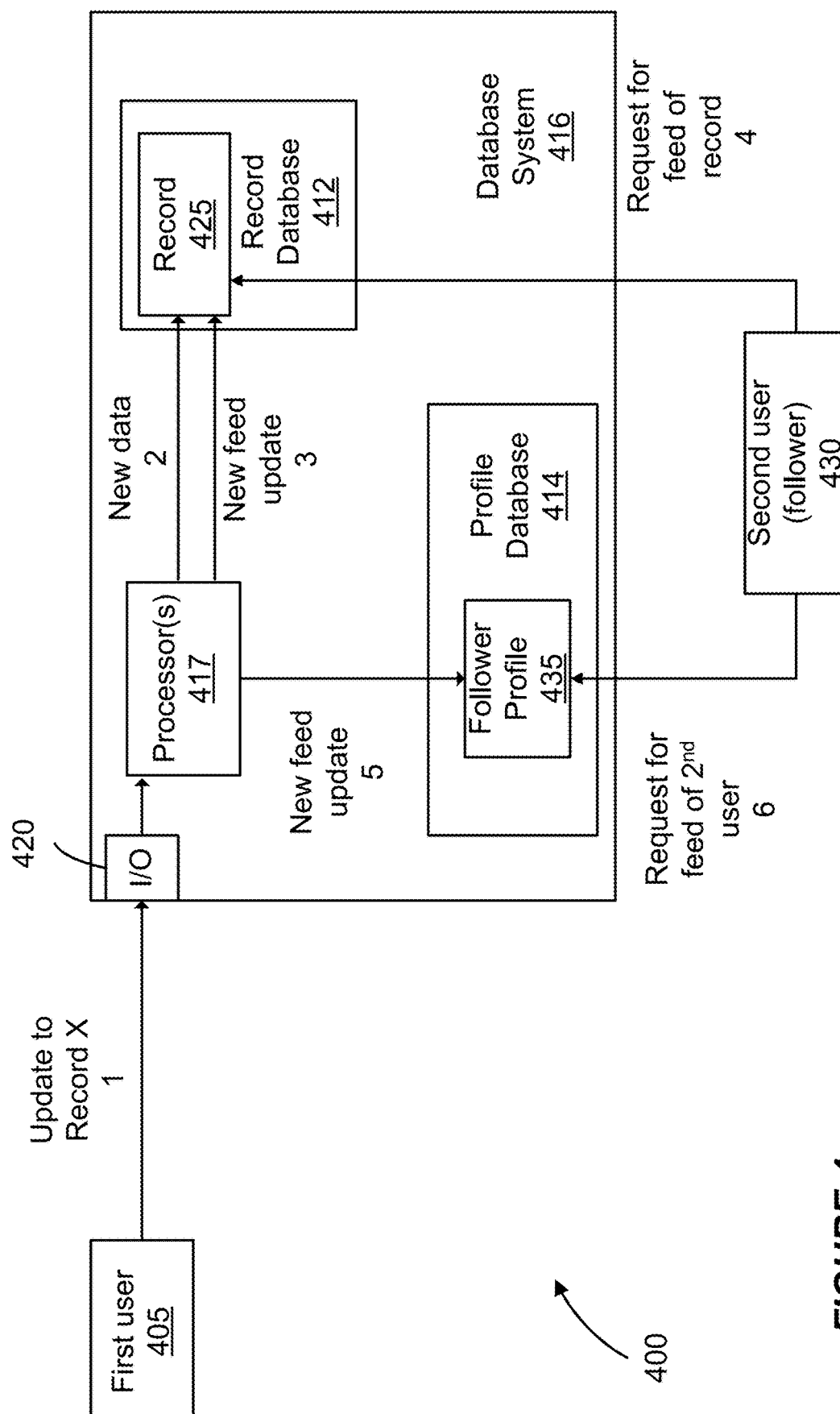
FIG. 4 shows a block diagram of an example of components of a database system configuration 400 performing a method for tracking an update to a record according to some implementations.

FIG. 4 shows a block diagram of an example of components of a database system configuration 400 performing a method for tracking an update to a record according to some implementations. Database system configuration 400 can perform implementations of method 300, as well as implementations of other methods described herein.

A first user 405 sends a request 1 to update record 425 in database system 416. Although an update request is described, other events that are being tracked are equally applicable. In various implementations, the request 1 can be sent via a user interface (e.g., 30 of FIG. 1B) or an application program interface (e.g., API 32). An I/O port 420 can accommodate the signals of request 1 via any input interface, and send the signals to one or more processors 417. The processor 417 can analyze the request and determine operations to be performed. Herein, any reference to a processor 417 can refer to a specific processor or any set of processors in database system 416, which can be collectively referred to as processor 417.

Processor 417 can determine an identifier for record 425, and send commands with the new data 2 of the request to record database 412 to update record 425. In one implementation, record database 412 is where tenant storage space 112 of FIG. 1B is located. The request 1 and new data commands 2 can be encapsulated in a single write transaction sent to record database 412. In one implementation, multiple changes to records in the database can be made in a single write transaction.

Processor 417 can also analyze request 1 to determine whether a feed tracked update is to be created, which at this point may include determining whether the event (e.g., a change to a particular field) is to be tracked. This determination can be based on an interaction (i.e., an exchange of data) with record database 412 and/or other databases, or based on information stored locally (e.g., in cache or RAM) at processor 417. In one implementation, a list of record types that are being tracked can be stored. The list may be different for each tenant, e.g., as each tenant may configure the database system to its own specifications. Thus, if the record 425 is of a type not being tracked, then the determination of whether to create a feed tracked update can stop there.

The same list or a second list (which can be stored in a same location or a different location) can also include the fields and/or events that are tracked for the record types in the first list. This list can be searched to determine if the event is being tracked. A list may also contain information having the granularity of listing specific records that are to be tracked (e.g., if a tenant can specify the particular records to be tracked, as opposed to just type).

As an example, processor 417 may obtain an identifier associated with record 425 (e.g., obtained from request 1 or database 412), potentially along with a tenant identifier, and cross-reference the identifier with a list of records for which feed tracked updates are to be created. Specifically, the record identifier can be used to determine the record type and a list of tracked types can be searched for a match. The specific record may also be checked if such individual record tracking was enabled. The name of the field to be changed can also be used to search a list of tracking-enabled fields. Other criteria besides field and events can be used to determine whether a feed tracked update is created, e.g., type of change in the field. If a feed tracked update is to be generated, processor 417 can then generate the feed tracked update.

In some implementations, a feed tracked update is created dynamically when a feed (e.g., the entity feed of record 425) is requested. Thus, in one implementation, a feed tracked update can be created when a user requests the entity feed for record 425. In this implementation, the feed tracked update may be created (e.g., assembled), including re-created, each time the entity feed is to be displayed to any user. In one implementation, one or more event history tables can keep track of previous events so that the feed tracked update can be re-created.

In another implementation, a feed tracked update can be created at the time the event occurs, and the feed tracked update can be added to a list of feed items. The list of feed items may be specific to record 425, or may be an aggregate of feed items including feed items for many records. Such an aggregate list can include a record identifier so that the feed items for the entity feed of record 425 can be easily retrieved. For example, after the feed tracked update has been generated, processor 417 can add the new feed tracked update 3 to a feed of record 425. As mentioned above, in one implementation, the feed can be stored in a field (e.g., as a child object) of record 425. In another implementation, the feed can be stored in another location or in another database, but with a link (e.g., a connecting identifier) to record 425. The feed can be organized in various ways, e.g., as a linked list, an array, or other data structure.

A second user 430 can access the new feed tracked update 3 in various ways. In one implementation, second user 430 can send a request 4 for the record feed. For example, second user 430 can access a home page (detail page) of the record 425 (e.g., with a query or by browsing), and the feed can be obtained through a tab, button, or other activation object on the page. The feed can be displayed on the screen or downloaded.

In another implementation, processor 417 can add the new feed tracked update 5 to a feed (e.g., a news feed) of a user that is following record 425. In one implementation, processor 417 can determine each of the followers of record 425 by accessing a list of the users that have been registered as followers. This determination can be done for each new event (e.g., update 1). In another implementation, processor 417 can poll (e.g., with a query) the records that second user 430 is following to determine when new feed tracked updates (or other feed items) are available. Processor 417 can use a follower profile 435 of second user 430 that can contain a list of the records that the second user 430 is following. Such a list can be contained in other parts of the database as well. Second user 430 can then send a request 6 to his/her profile 435 to obtain a feed, which contains the new feed tracked update. The user's profile 435 can be stored in a profile database 414, which can be the same or different than database 412.

In some implementations, a user can define a news feed to include new feed tracked updates from various records, which may be limited to a maximum number. In one implementation, each user has one news feed. In another implementation, the follower profile 435 can include the specifications of each of the records to be followed (with the criteria for what feed tracked updates are to be provided and how they are displayed), as well as the feed.

Some implementations can provide various types of record (entity) feeds. Entity Feeds can exist for record types like account, opportunity, case, and contact. An entity feed can tell a user about the actions that people have taken on that particular record or on one its related records. The entity feed can include who made the action, which field was changed, and the old and new values. In one implementation, entity feeds can exist on all supported records as a list that is linked to the specific record. For example, a feed could be stored in a field that allows lists (e.g., linked lists) or as a child object.

IV. Tracking Actions of a User

In addition to knowing about events associated with a particular record, it can be helpful for a user to know what a particular user is doing. In particular, it might be nice to know what the user is doing without the user having to generate the feed tracked update (e.g., a user submitting a synopsis of what the user has done). Accordingly, implementations can automatically track actions of a user that trigger events, and feed tracked updates can be generated for certain events.

Figure 5:
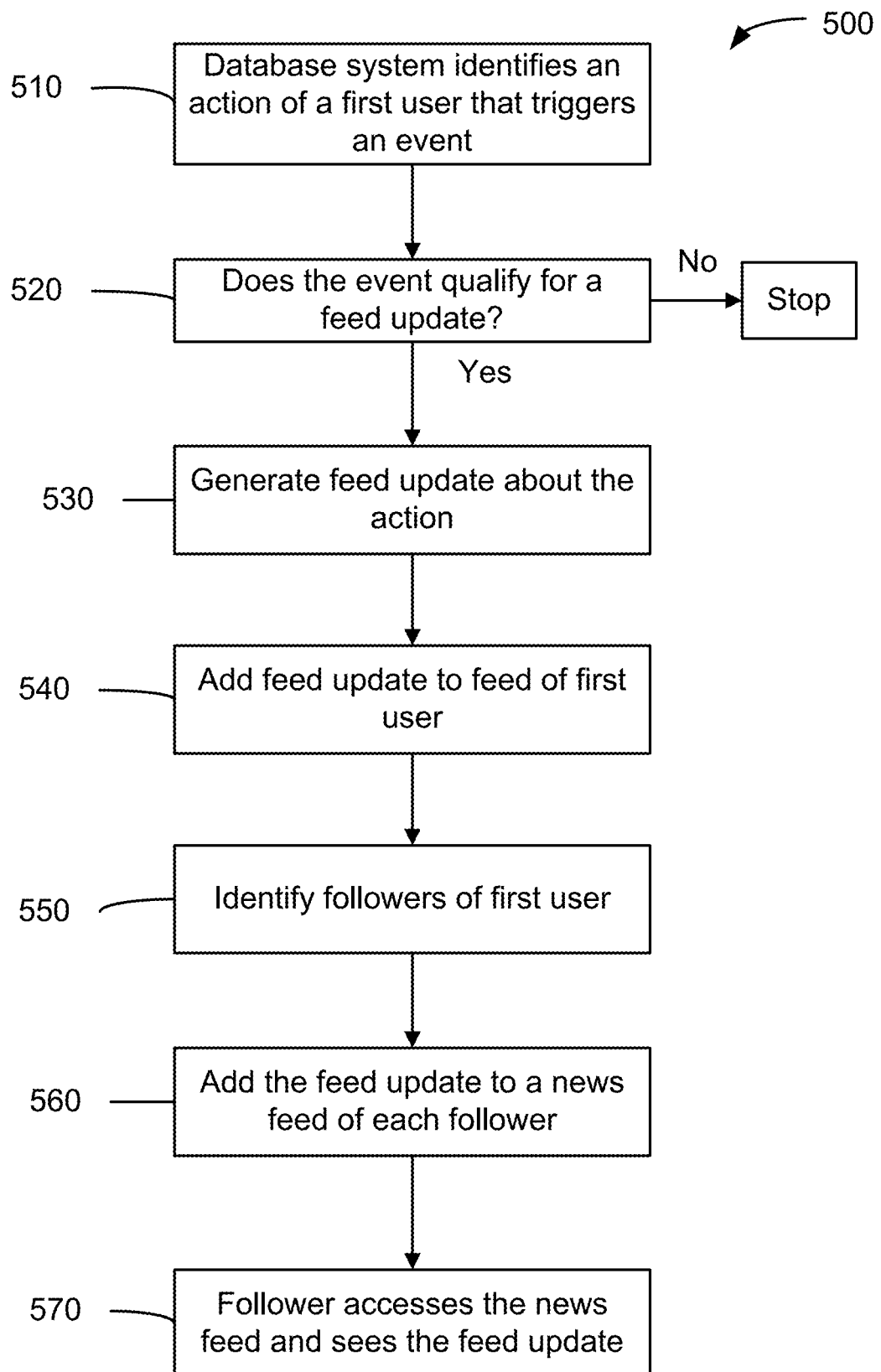
FIG. 5 shows a flowchart of an example of a method 500 for tracking actions of a user of a database system, performed in accordance with some implementations.

FIG. 5 shows a flowchart of an example of a method 500 for tracking actions of a user of a database system, performed in accordance with some implementations. Method 500 may be performed in addition to method 300. The operations of method 300, including order of blocks, can be performed in conjunction with method 500 and other methods described herein. Thus, a feed can be composed of changes to a record and actions of users.

In block 510, a database system (e.g., 16 of FIGS. 1A and 1B) identifies an action of a first user. In one implementation, the action triggers an event, and the event is identified. For example, the action of a user requesting an update to a record can be identified, where the event is receiving a request or is the resulting update of a record. The action may thus be defined by the resulting event. In another implementation, only certain types of actions (events) are identified. Which actions are identified can be set as a default or can be configurable by a tenant, or even configurable at a user level. In this way, processing effort can be reduced since only some actions are identified.

In block 520, it is determined whether the event qualifies for a feed tracked update. In one implementation, a predefined list of events (e.g., as mentioned herein) can be created so that only certain actions are identified. In one implementation, an administrator (or other user) of a tenant can specify the type of actions (events) for which a feed tracked update is to be generated. This block may also be performed for method 300.

In block 530, a feed tracked update is generated about the action. In an example where the action is an update of a record, the feed tracked update can be similar or the same as the feed tracked update created for the record. The description can be altered though to focus on the user as opposed to the record. For example, "John D. has closed a new opportunity for account XYZ" as opposed to "an opportunity has been closed for account XYZ."

In block 540, the feed tracked update is added to a profile feed of the first user when, e.g., the user clicks on a tab to open a page in a browser program displaying the feed. In one implementation, a feed for a particular user can be accessed on a page of the user's profile, in a similar manner as a record feed can be accessed on a detail page of the record. In another implementation, the first user may not have a profile feed and the feed tracked update may just be stored temporarily before proceeding. A profile feed of a user can be stored associated with the user's profile. This profile feed can be added to a news feed of another user.

In block 550, followers of the first user are identified. In one implementation, a user can specify which type of actions other users can follow. Similarly, in one implementation, a follower can select what actions by a user the follower wants to follow. In an implementation where different followers follow different types of actions, which users are followers of that user and the particular action can be identified, e.g., using various lists that track what actions and criteria are being followed by a particular user. In various implementations, the followers of the first user can be identified in a similar manner as followers of a record, as described above for block 350.

In block 560, the feed tracked update is added to a news feed of each follower of the first user when, e.g., the follower clicks on a tab to open a page displaying the news feed. The feed tracked update can be added in a similar manner as the feed items for a record feed. The news feed can contain feed tracked updates both about users and records. In another implementation, a user can specify what kind of feed tracked updates to receive about a user that the user is following. For example, a user could specify feed tracked updates with particular keywords, of certain types of records, of records owned or created by certain users, particular fields, and other criteria as mentioned herein.

In block 570, a follower accesses the news feed and sees the feed tracked update. In one implementation, the user has just one news feed for all of the records that the user is following. In another implementation, a user can access his/her own feed (i.e. feed about his/her own actions) by selecting a particular tab or other object on a page of an interface to the database system. Thus, a feed can include feed tracked updates about what other users are doing in the database system. When a user becomes aware of a relevant action of another user, the user can contact the co-worker, thereby fostering teamwork.

V. Generation of a Feed Tracked Update

As described above, some implementations can generate text describing events (e.g., updates) that have occurred for a record and actions by a user that trigger an event. A database system can be configured to generate the feed tracked updates for various events in various ways.

In one implementation, the feed tracked update is a grammatical sentence, thereby being easily understandable by a person. In another implementation, the feed tracked update provides detailed information about the update. In various examples, an old value and new value for a field may be included in the feed tracked update, an action for the update may be provided (e.g., submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g., a request to update). For example, the subject may be the user, the record, or a field being added or changed. The verb can be based on the action requested by the user, which can be selected from a list of verbs (which may be provided as defaults or input by an administrator of a tenant). In one implementation, feed tracked updates can be generic containers with formatting restrictions, As an example of a feed tracked update for a creation of a new record, "Mark Abramowitz created a new Opportunity for IBM-20,000 laptops with Amount as $3.5 M and Sam Palmisano as Decision Maker." This event can be posted to the profile feed for Mark Abramowitz and the entity feed for record of Opportunity for IBM-20,000 laptops. The pattern can be given by (AgentFullName) created a new (ObjectName)(RecordName) with [(FieldName) as (FieldValue) [,/and] ]*[[added/changed/removed] (RelatedListRecordName) [as/to/as] (RelatedListRecordValue) [,/and] ]*. Similar patterns can be formed for a changed field (standard or custom) and an added child record to a related list.

VI. Tracking Commentary from or about a User

Some implementations can also have a user submit text, instead of the database system generating a feed tracked update. As the text is submitted as part or all of a message by a user, the text can be about any topic. Thus, more information than just actions of a user and events of a record can be conveyed. In one implementation, the messages can be used to ask a question about a particular record, and users following the record can provide comments and responses.

Figure 6:
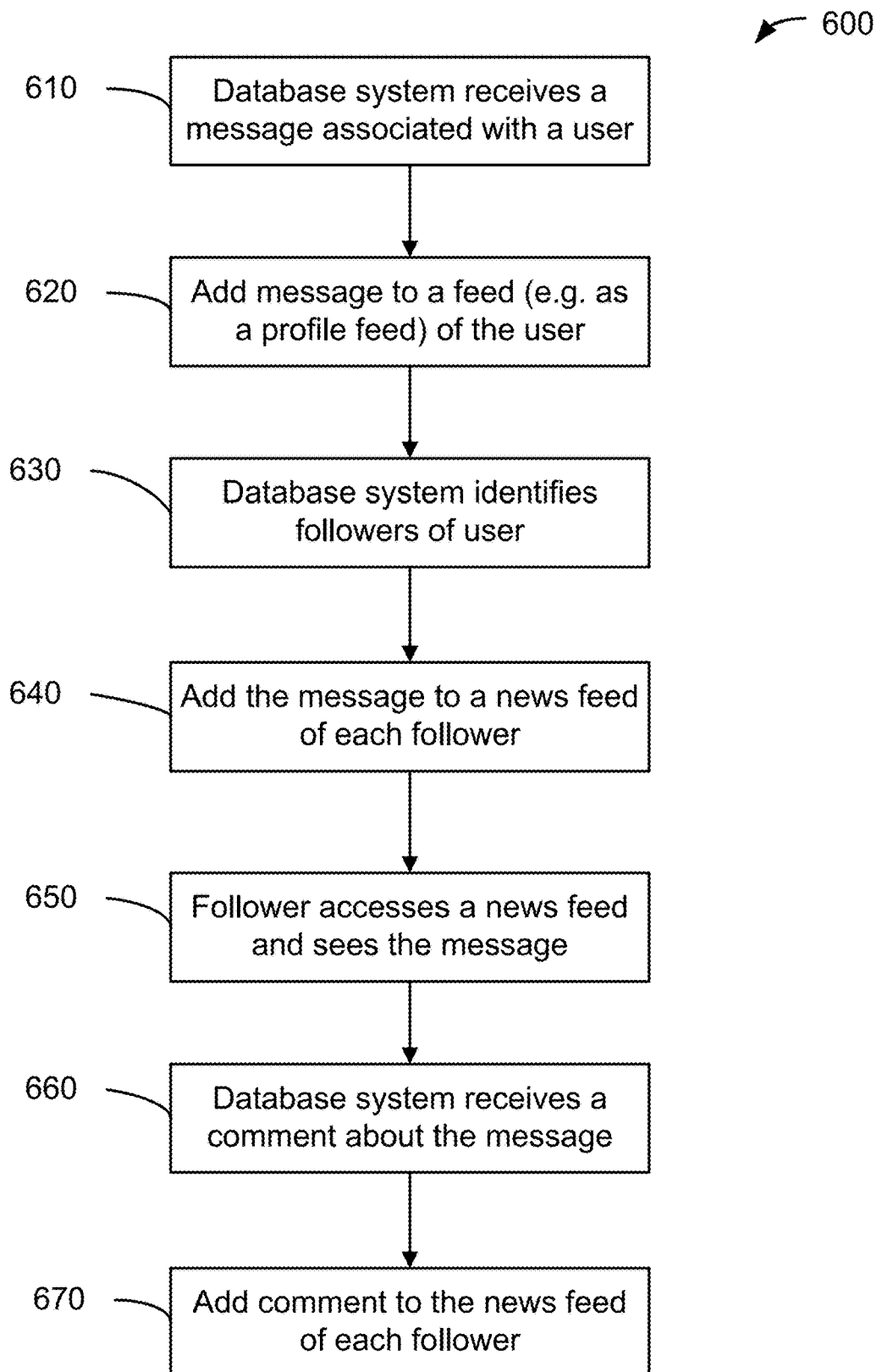
FIG. 6 shows a flowchart of an example of a method 600 for creating a news feed from messages created by a user about a record or another user, performed in accordance with some implementations.

FIG. 6 shows a flowchart of an example of a method 600 for creating a news feed from messages created by a user about a record or another user, performed in accordance with some implementations. In one implementation, method 600 can be combined with methods 300 and 500. In one aspect, a message can be associated with the first user when the first user creates the message (e.g., a post or comment about a record or another user). In another aspect, a message can be associated with the first user when the message is about the first user (e.g., posted by another user on the first user's profile feed).

In block 610, the database system receives a message (e.g., a post or status update) associated with a first user. The message (e.g., a post or status update) can contain text and/or multimedia content submitted by another user or by the first user. In one implementation, a post is for a section of the first user's profile page where any user can add a post, and where multiple posts can exist. Thus, a post can appear on the first user's profile page and can be viewed when the first user's profile is visited. For a message about a record, the post can appear on a detail page of a record. Note the message can appear in other feeds as well. In another implementation, a status update about the first user can only be added by the first user. In one implementation, a user can only have one status message.

In block 620, the message is added to a table, as described in greater detail below. When the feed is opened, a query filters one or more tables to identify the first user, identify other persons that the user is following, and retrieve the message. Messages and record updates are presented in a combined list as the feed. In this way, in one implementation, the message can be added to a profile feed of the first user, which is associated (e.g., as a related list) with the first user's profile. In one implementation, the posts are listed indefinitely. In another implementation, only the most recent posts (e.g., last 50) are kept in the profile feed. Such implementations can also be employed with feed tracked updates. In yet another implementation, the message can be added to a profile of the user adding the message.

In block 630, the database system identifies followers of the first user. In one implementation, the database system can identify the followers as described above for method 500. In various implementations, a follower can select to follow a feed about the actions of the first user, messages about the first user, or both (potentially in a same feed).

In block 640, the message is added to a news feed of each follower. In one implementation, the message is only added to a news feed of a particular follower if the message matches some criteria, e.g., the message includes a particular keyword or other criteria. In another implementation, a message can be deleted by the user who created the message. In one implementation, once deleted by the author, the message is deleted from all feeds to which the message had been added.

In block 650, the follower accesses a news feed and sees the message. For example, the follower can access a news feed on the follower's own profile page. As another example, the follower can have a news feed sent to his/her own desktop without having to first go to a home page.

In block 660, the database system receives a comment about the message. The database system can add the comment to a feed of the same first user, much as the original message was added. In one implementation, the comment can also be added to a feed of a second user who added the comment. In one implementation, users can also reply to the comment. In another implementation, users can add comments to a feed tracked update, and further comments can be associated with the feed tracked update. In yet another implementation, making a comment or message is not an action to which a feed tracked update is created. Thus, the message may be the only feed item created from such an action.

In one implementation, if a feed tracked update or post is deleted, its corresponding comments are deleted as well. In another implementation, new comments on a feed tracked update or post do not update the feed tracked update timestamp. Also, the feed tracked update or post can continue to be shown in a feed (profile feed, record feed, or news feed) if it has had a comment within a specified timeframe (e.g., within the last week). Otherwise, the feed tracked update or post can be removed in an implementation.

In some implementations, all or most feed tracked updates can be commented on. In other implementations, feed tracked updates for certain records (e.g., cases or ideas) are not commentable. In various implementations, comments can be made for any one or more records of opportunities, accounts, contacts, leads, and custom objects.

In block 670, the comment is added to a news feed of each follower. In one implementation, a user can make the comment within the user's news feed. Such a comment can propagate to the appropriate profile feed or record feed, and then to the news feeds of the following users. Thus, feeds can include what people are saying, as well as what they are doing. In one aspect, feeds are a way to stay up-to-date (e.g., on users, opportunities, etc.) as well as an opportunity to reach out to co-workers/partners and engage them around common goals.

In some implementations, users can rate feed tracked updates or messages (including comments). A user can choose to prioritize a display of a feed so that higher rated feed items show up higher on a display. For example, in an implementation where comments are answers to a specific question, users can rate the different status posts so that a best answer can be identified. As another example, users are able to quickly identify feed items that are most important as those feed items can be displayed at a top of a list. The order of the feed items can be based on an importance level (which can be determined by the database system using various factors, some of which are mentioned herein) and based on a rating from users. In one implementation, the rating is on a scale that includes at least 3 values. In another implementation, the rating is based on a binary scale.

Besides a profile for a user, a group can also be created. In various implementations, the group can be created based on certain attributes that are common to the users, can be created by inviting users, and/or can be created by receiving requests to join from a user. In one implementation, a group feed can be created, with messages being added to the group feed when someone submits a message to the group as a whole through a suitable user interface. For example, a group page may have a group feed or a section within the feed for posts, and a user can submit a post through a publisher component in the user interface by clicking on a "Share" or similar button. In another implementation, a message can be added to a group feed when the message is submitted about any one of the members. Also, a group feed can include feed tracked updates about actions of the group as a whole (e.g., when an administrator changes data in a group profile or a record owned by the group), or about actions of an individual member.

Figure 7:
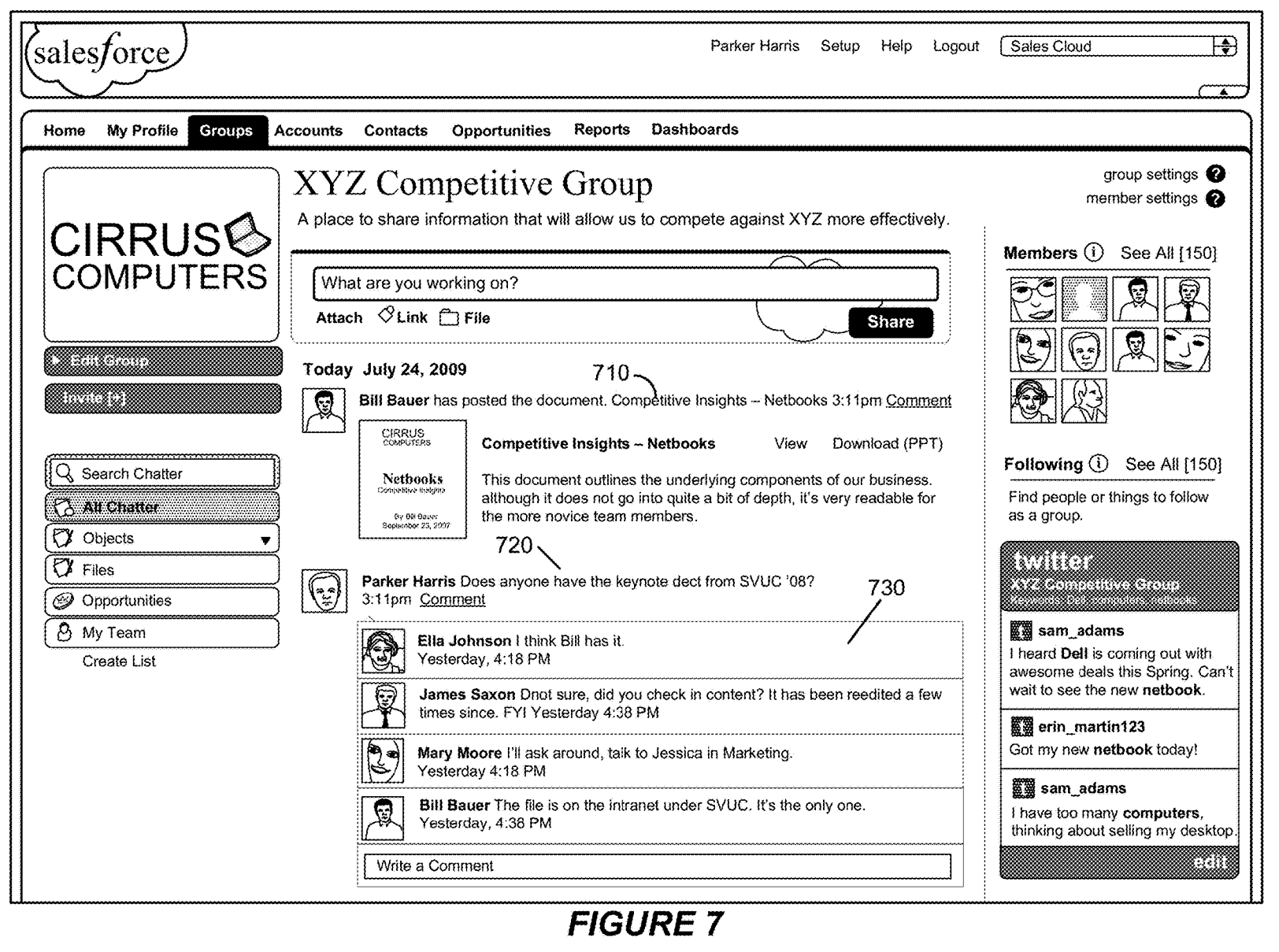

FIG. 7 shows an example of a group feed on a group page according to some implementations. As shown, a feed item 710 shows that a user has posted a document to the group object. The text "Bill Bauer has posted the document Competitive Insights" can be generated by the database system in a similar manner as feed tracked updates about a record being changed. A feed item 720 shows a post to the group, along with comments 730 from Ella Johnson, James Saxon, Mary Moore and Bill Bauer.

Figure 8:
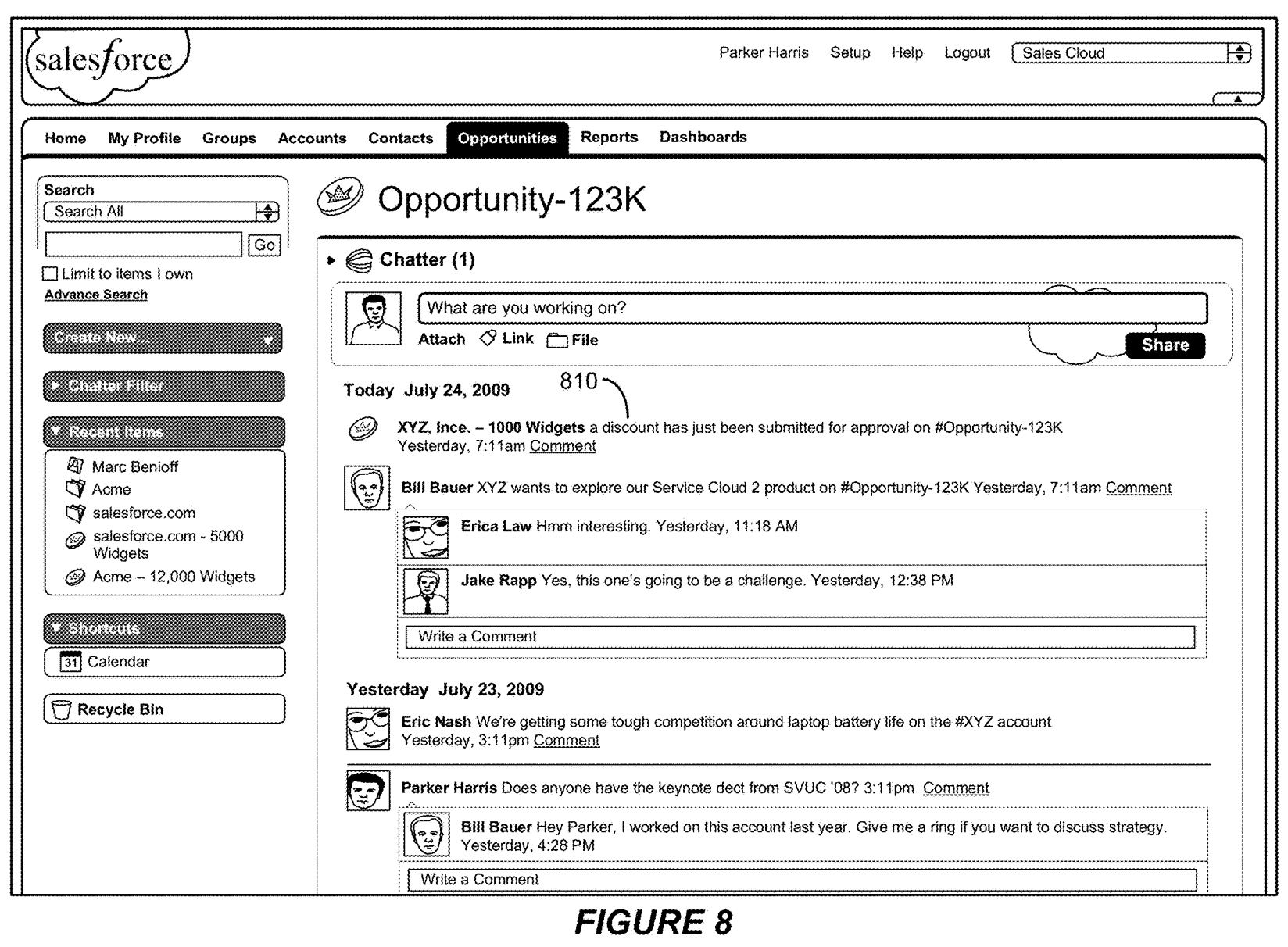

FIG. 8 shows an example of a record feed containing a feed tracked update, post, and comments according to some implementations. Feed item 810 shows a feed tracked update based on the event of submitting a discount for approval. Other feed items show posts, e.g., from Bill Bauer, that are made to the record and comments, e.g., from Erica Law and Jake Rapp, that are made on the posts.

VII. Infrastructure for a Feed

A. Tables Used to Create a Feed

FIG. 9A shows an example of a plurality of feed tracked update tables that may be used in tracking events and creating feeds according to some implementations. The tables of FIG. 9A may have entries added, or potentially removed, as part of tracking events in the database from which feed items are creates or that correspond to feed items. In one implementation, each tenant has its own set of tables that are created based on criteria provided by the tenant.

An event history table 910 can provide a feed tracked update of events from which feed items are created. In one aspect, the events are for objects that are being tracked. Thus, table 910 can store and change feed tracked updates for feeds, and the changes can be persisted. In various implementations, event history table 910 can have columns of event ID 911, object ID 912 (also called parent ID), and created by ID 913. The event ID 911 can uniquely identify a particular event and can start at 1 (or other number or value).

Each new event can be added chronologically with a new event ID, which may be incremented in order. An object ID 912 can be used to track which record or user's profile is being changed. For example, the object ID can correspond to the record whose field is being changed or the user whose feed is receiving a post. The created by ID 913 can track the user who is performing the action that results in the event, e.g., the user that is changing the field or that is posting a message to the profile of another user.

In one implementation, a name of an event can also be stored in table 910. In one implementation, a tenant can specify events that they want tracked. In an implementation, event history table 910 can include the name of the field that changed (e.g., old and new values). In another implementation, the name of the field, and the values, are stored in a separate table. Other information about an event (e.g., text of comment, feed tracked update, post or status update) can be stored in event history table 910, or in other tables, as is now described.

A field change table 920 can provide a feed tracked update of the changes to the fields. The columns of table 920 can include an event ID 921 (which correlates to the event ID 911), an old value 922 for the field, and the new value 923 for the field. In one implementation, if an event changes more than one field value, then there can be an entry for each field changed. As shown, event ID 921 has two entries for event E37.

A comment table 930 can provide a feed tracked update of the comments made regarding an event, e.g., a comment on a post or a change of a field value. The columns of table 930 can include an event ID 921 (which correlates to the event ID 911), the comment column 932 that stores the text of the comment, and the time/date 933 of the comment. In one implementation, there can be multiple comments for each event. As shown, event ID 921 has two entries for event E37.

A user subscription table 940 can provide a list of the objects being followed (subscribed to) by a user. In one implementation, each entry has a user ID 941 of the user doing the following and one object ID 942 corresponding to the object being followed. In one implementation, the object being followed can be a record or a user. As shown, the user with ID U819 is following object IDs 0615 and 0489. If user U819 is following other objects, then additional entries may exist for user U819. Also as shown, user U719 is also following object 0615. The user subscription table 940 can be updated when a user adds or deletes an object that is being followed.

In one implementation, regarding a profile feed and a news feed, these are read-only views on the event history table 910 specialized for these feed types. Conceptually the news feed can be a semi-join between the user subscription table 940 and the event history table 910 on the object IDs 912 and 942 for the user. In one aspect, these entities can have polymorphic parents and can be subject to a number of restrictions detailed herein, e.g., to limit the cost of sharing checks.

In one implementation, entity feeds are modeled in the API as a feed associate entity (e.g., AccountFeed, CaseFeed, etc). A feed associate entity includes information composed of events (e.g., event IDs) for only one particular record type. Such a list can limit the query (and sharing checks) to a specific record type. In one aspect, this structuring of the entity feeds can make the query run faster. For example, a request for a feed of a particular account can include the record type of account. In one implementation, an account feed table can then be searched, where the table has account record IDs and corresponding event IDs or pointers to particular event entries in event history table 910. Since the account feed table only contains some of the records (not all), the query can run faster.

In one implementation, there may be objects with no events listed in the event history table 910, even though the record is being tracked. In this case, the database service can return a result indicating that no feed items exist.

A feed item can represent an individual field change of a record, creation and deletion of a record, or other events being tracked for a record or a user. In one implementation, all of the feed items in a single transaction (event) can be grouped together and have the same event ID. A single transaction relates to the operations that can be performed in a single communication with the database. In another implementation where a feed is an object of the database, a feed item can be a child of a profile feed, news feed, or entity feed. If a feed item is added to multiple feeds, the feed item can be replicated as a child of each feed to which the feed item is added.

In some implementations, a comment exists as an item that depends from feed tracked updates, posts, status updates, and other items that are independent of each other. Thus, a feed comment object can exist as a child object of a feed item object. For example, comment table 930 can be considered a child table of event history table 910. In one implementation, a feed comment can be a child of a profile feed, news feed, or entity feed that is separate from other feed items.

In one implementation, viewing a feed pulls up the most recent messages or feed tracked updates (e.g., 25) and searches the most recent (e.g., 4) comments for each feed item. The comments can be identified via the comment table 930. In one implementation, a user can request to see more comments, e.g., by selecting a see more link.

After feed items have been generated, they can be filtered so that only certain feed items are displayed, which may be tailored to a specific tenant and/or user. In one implementation, a user can specify changes to a field that meet certain criteria for the feed item to show up in a feed displayed to the user, e.g., a news feed or even an entity feed displayed directly to the user. In one implementation, the criteria can be combined with other factors (e.g., number of feed items in the feed) to determine which feed items to display. For instance, if a small number of feed items exist (e.g., below a threshold), then all of the feed items may be displayed.

In one implementation, a user can specify the criteria via a query on the feed items in his/her new feed, and thus a feed may only return objects of a certain type, certain types of events, feed tracked updates about certain fields, and other criteria mentioned herein. Messages can also be filtered according to some criteria, which may be specified in a query. Such an added query can be added onto a standard query that is used to create the news feed for a user. A first user could specify the users and records that the first user is following in this manner, as well as identify the specific feed items that the first user wants to follow. The query could be created through a graphical interface or added by a user directly in a query language. Other criteria could include receiving only posts directed to a particular user or record, as opposed to other feed items.

In one implementation, a user can access a feed of a record if the user can access the record. The security rules for determining whether a user has access to a record can be performed in a variety of ways, some of which are described in commonly assigned U.S. Pat. No. 8,095,531, titled METHODS AND SYSTEMS FOR CONTROLLING ACCESS TO CUSTOM OBJECTS IN A DATABASE, by Weissman et al., issued on Jan. 10, 2012, and hereby incorporated by reference in its entirety and for all purposes.

In one implementation, a user can edit a feed of a record if the user has access to the record, e.g., deleting or editing a feed item. In another implementation, a user (besides an administrator) cannot edit a feed item, except for performing an action from which a feed item can be created. In one example, a user is first has to have access to a particular record and field for a feed item to be created based on an action of the user. In this case, an administrator can be considered to be a user with MODIFY-ALL-DATA security level. In yet another implementation, a user who created the record can edit the feed.

In one implementation, the text of posts are stored in a child table (post table 950), which can be cross-referenced with event history table 910. Post table 950 can include event ID 951 (to cross-reference with event ID 911), post text 952 to store the text of the post, and time/date 953. An entry in post table 950 can be considered a feed post object.

VIII. Subscribing to Users and Records to Follow

As described above, a user can follow users, groups, and records. Implementations can provide mechanisms for a user to manage which users, groups, and records that the user is currently following. In one implementation, a user can be limited to the number of users and records (collectively or separately) that the user can follow. For example, a user may be restricted to only following 10 users and 15 records, or as another example, 25 total. Alternatively, the user may be permitted to follow more or less users.

In one implementation, a user can go to a page of a record and then select to follow that object (e.g., with a button marked "follow" or "join"). In another implementation, a user can search for a record and have the matching records show up in a list. The search can include criteria of records that the user might want to follow. Such criteria can include the owner, the creation date, last comment date, and numerical values of particular fields (e.g., an opportunity with a value of more than $10,000).

A follow button (or other activation object) can then reside next to each record in the resulting list, and the follow button can be selected to start following the record. Similarly, a user can go to a profile page of a user and select to follow the user, or a search for users can provide a list, where one or more users can be selected for following from the list. The selections of subscribing and unsubscribing can add and delete rows in table 920.

In some implementations, a subscription center acts as a centralized place in a database application (e.g., application platform 18) to manage which records a user subscribes to, and which field updates the user wants to see in feed tracked updates. The subscription center can use a subscription table to keep track of the subscriptions of various users. In one implementation, the subscription center shows a list of all the items (users and records) a user is subscribed to. In another implementation, a user can unsubscribe to subscribed objects from the subscription center.

A. Automatic Subscription

Figure 9B:
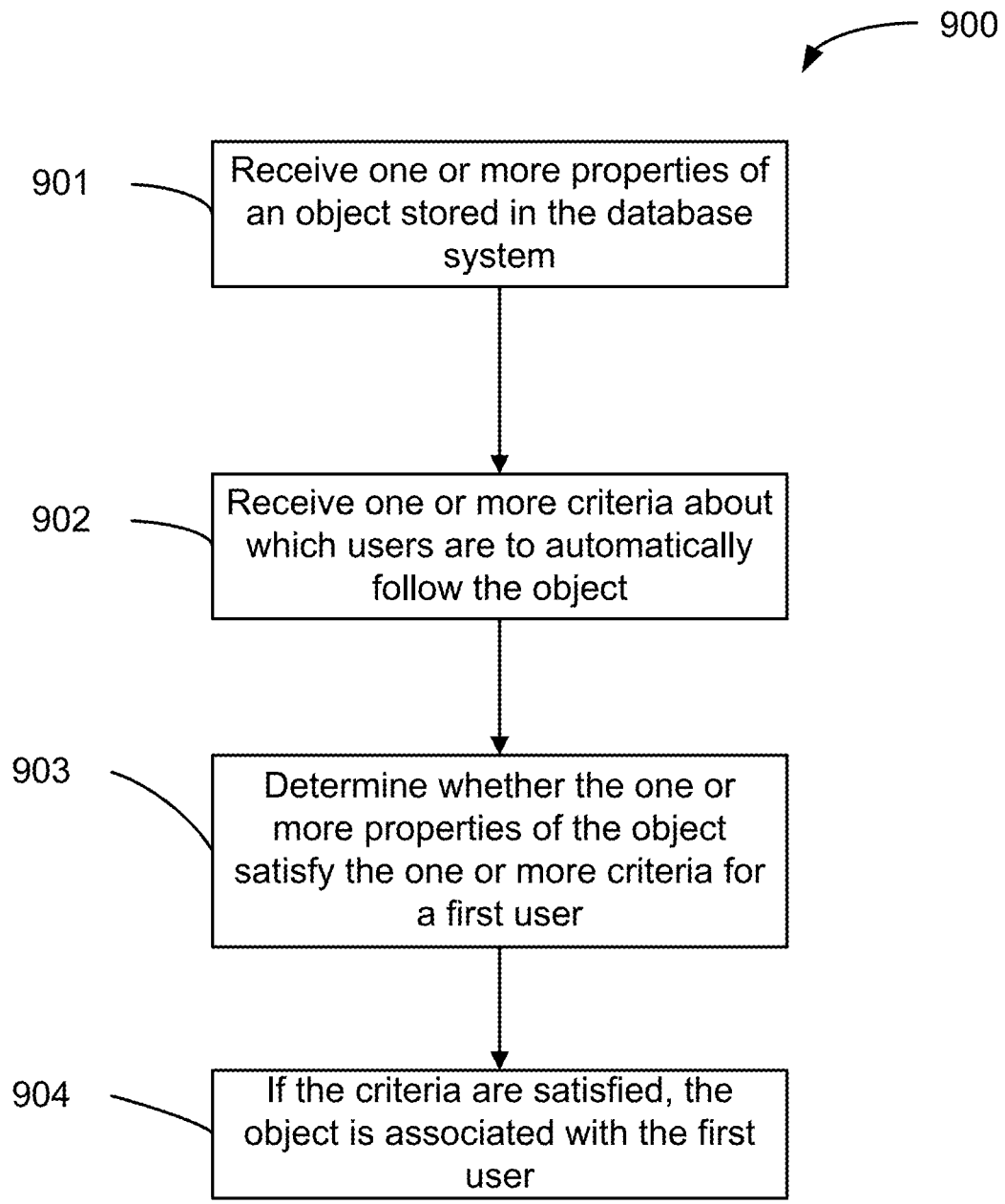
FIG. 9B shows a flowchart of an example of a method 900 for automatically subscribing a user to an object in a database system, performed in accordance with some implementations.

FIG. 9B shows a flowchart of an example of a method 900 for automatically subscribing a user to an object in a database system, performed in accordance with some implementations. Any of the following blocks can be performed wholly or partially with the database system, and in particular by one or more processor of the database system.

In block 901, one or more properties of an object stored in the database system are received. The properties can be received from administrators of the database system, or from users of the database system (which may be an administrator of a customer organization). The properties can be records or users, and can include any of the fields of the object that are stored in the database system. Examples of properties of a record include: an owner of the record, a user that converted the record from one record type to another record type, whether the first user has viewed the record, and a time the first user viewed the record. Examples of properties of a user include: which organization (tenant) the user is associated with, the second user's position in the same organization, and which other users the user had emailed or worked with on projects.

In block 902, the database system receives one or more criteria about which users are to automatically follow the object. Examples of the criteria can include: an owner or creator of a record is to follow the record, subordinates of an owner or creator of a record are to follow the record, and a user is to follow his/her manager, the user's peers, other users in the same business group as the user, and other users that the user has emailed or worked with on a project. The criteria can be specific to a user or group of users (e.g., users of a tenant).

In block 903, the database system determines whether the one or more properties of the object satisfy the one or more criteria for a first user. In one implementation, this determination can occur by first obtaining the criteria and then determining objects that satisfy the criteria. The determination can occur periodically, at time of creation of an object, or at other times.

In block 904, if the criteria are satisfied, the object is associated with the first user. The association can be in a list that stores information as to what objects are being followed by the first user. User subscription table 940 is an example of such a list. In one implementation, the one or more criteria are satisfied if one property satisfies at least one criterion. Thus, if the criteria are that a user follows his/her manager and the object is the user's manager, then the first user will follow the object.

In one implementation, a user can also be automatically unsubscribed, e.g., if a certain action happens. The action could be a change in the user's position within the organization, e.g., a demotion or becoming a contractor. As another example, if a case gets closed, then users following the case may be automatically unsubscribed.

IX. Adding Items to a Feed

As described above, a feed includes feed items, which include feed tracked updates and messages, as defined herein. Various feeds can be generated. For example, a feed can be generated about a record or about a user. Then, users can view these feeds. A user can separately view a feed of a record or user, e.g., by going to a home page for the user or the record. As described above, a user can also follow another user or record and receive the feed items of those feeds through a separate feed application. The feed application can provide each of the feeds that a user is following and, in some examples, can combine various feeds in a single information feed.

A feed generator can refer to any software program running on a processor or a dedicated processor (or combination thereof) that can generate feed items (e.g., feed tracked updates or messages) and combine them into a feed. In one implementation, the feed generator can generate a feed item by receiving a feed tracked update or message, identifying what feeds the item should be added to, and adding the feed. Adding the feed can include adding additional information (metadata) to the feed tracked update or message (e.g., adding a document, sender of message, a determined importance, etc.). The feed generator can also check to make sure that no one sees feed tracked updates for data that they don't have access to see (e.g., according to sharing rules). A feed generator can run at various times to pre-compute feeds or to compute them dynamically, or combinations thereof.

In one implementation, processor 417 in FIG. 4 can identify an event that meets criteria for a feed tracked update, and then generate the feed tracked update. Processor 417 can also identify a message. For example, an application interface can have certain mechanisms for submitting a message (e.g., "submit" buttons on a profile page, detail page of a record, "comment" button on post), and use of these mechanisms can be used to identify a message to be added to a table used to create a feed or added directly to a list of feed items ready for display.

A. Adding Items to a Pre-Computed Feed

In some implementations, a feed of feed items is created before a user requests the feed. Such an implementation can run fast, but have high overall costs for storage. In one implementation, once a profile feed or a record feed has been created, a feed item (messages and feed tracked updates) can be added to the feed. The feed can exist in the database system in a variety of ways, such as a related list. The feed can include mechanisms to remove items as well as add them.

As described above, a news feed can be an aggregated feed of all the record feeds and profile feeds to which a user has subscribed. The news feed can be provided on the home page of the subscribing user. Therefore, a news feed can be created by and exist for a particular user. For example, a user can subscribe to receive entity feeds of certain records that are of interest to the user, and to receive profile feeds of people that are of interest (e.g., people on a same team, that work for the user, are a boss of the user, etc.). A news feed can tell a user about all the actions across all the records (and people) whom have explicitly (or implicitly) been subscribed to via the subscriptions center (described above).

In one implementation, only one instance of each feed tracked update is shown on a user's news feed, even if the feed tracked update is published in multiple entities to which the user is subscribed. In one aspect, there may be delays in publishing news articles. For example, the delay may be due to queued up messages for asynchronous entity feed tracked update persistence. Different feeds may have different delays (e.g., delay for new feeds, but none of profile and entity feeds). In another implementation, certain feed tracked updates regarding a subscribed profile feed or an entity feed are not shown because the user is not allowed access, e.g., due to sharing rules (which restrict which users can see which data). Also, in one implementation, data of the record that has been updated (which includes creation) can be provided in the feed (e.g., a file or updated value of a feed can be added as a flash rendition).

B. Dynamically Generating Feeds

In some implementations, a feed generator can generate the feed items dynamically when a user requests to see a particular feed, e.g., a profile feed, entity feed, or the user's news feed. In one implementation, the most recent feed items (e.g., top 50) are generated first. In one aspect, the other feed items can be generated as a background process, e.g., not synchronously with the request to view the feed. However, since the background process is likely to complete before a user gets to the next 50 feed items, the feed generation may appear synchronous. In another aspect, the most recent feed items may or may not include comments, e.g., that are tied to feed tracked updates or posts.

In one implementation, the feed generator can query the appropriate subset of tables shown in FIG. 9A and/or other tables as necessary, to generate the feed items for display. For example, the feed generator can query the event history table 910 for the updates that occurred for a particular record. The ID of the particular record can be matched against the ID of the record. In one implementation, changes to a whole set of records can be stored in one table. The feed generator can also query for status updates, posts, and comments, each of which can be stored in different parts of a record or in separate tables, as shown in FIG. 9A. What gets recorded in the entity event history table (as well as what is displayed) can be controlled by a feed settings page in setup, which can be configurable by an administrator and can be the same for the entire organization, as is described above for custom feeds.

In one implementation, there can be two feed generators. For example, one generator can generate the record and profile feeds and another generator can generate news feeds. For the former, the feed generator can query identifiers of the record or the user profile. For the latter, the news feed generator can query the subscribed profile feeds and record feeds, e.g., user subscription table 940. In one implementation, the feed generator looks at a person's subscription center to decide which feeds to query for and return a list of feed items for the user. The list can be de-duped, e.g., by looking at the event number and values for the respective table, such as field name or ID, comment ID, or other information.

C. Adding Information to Feed Tracked Update Tables

Figure 10:
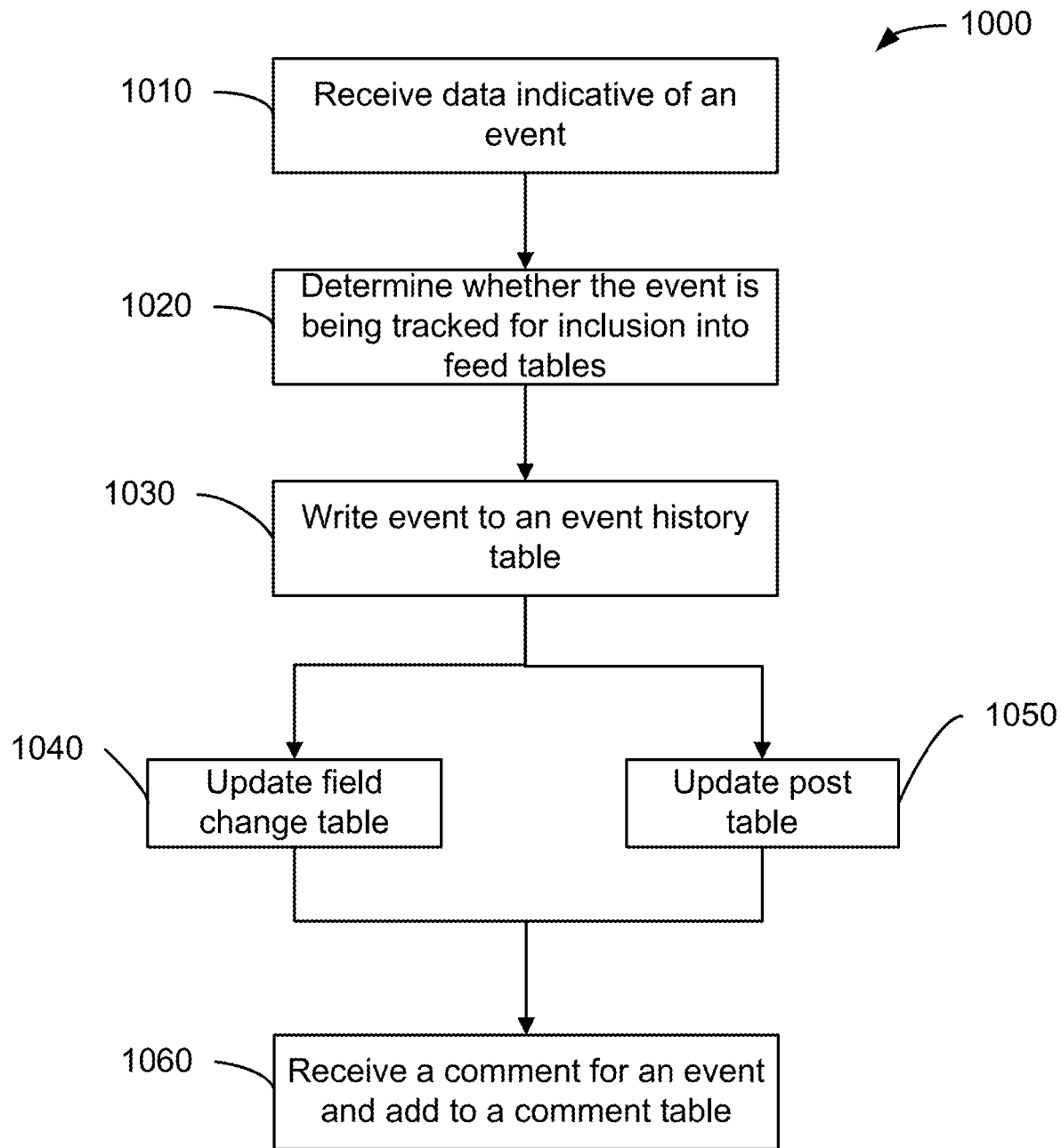
FIG. 10 shows a flowchart of an example of a method 1000 for saving information to feed tracking tables, performed in accordance with some implementations.

FIG. 10 shows a flowchart of an example of a method 1000 for saving information to feed tracking tables, performed in accordance with some implementations. In one implementation, some of the blocks may be performed regardless of whether a specific event or part of an event (e.g., only one field of an update is being tracked) is being tracked. In various implementations, a processor or set of processors (hardwired or programmed) can perform method 1000 and any other method described herein.

In block 1010, data indicative of an event is received. The data may have a particular identifier that specifies the event. For example, there may be a particular identifier for a field update. In another implementation, the transaction may be investigated for keywords identifying the event (e.g., terms in a query indicating a close, change field, or create operations).

In block 1020, it is determined whether the event is being tracked for inclusion into feed tracked update tables. The determination of what is being tracked can be based on a tenant's configuration as described above. In one aspect, the event has an actor (person performing an event), and an object of the event (e.g., record or user profile being changed).

In block 1030, the event is written to an event history table (e.g., table 910). In one implementation, this feed tracking operation can be performed in the same transaction that performs a save operation for updating a record. In another implementation, a transaction includes at least two roundtrip database operations, with one roundtrip being the database save (write), and the second database operation being the saving of the update in the feed tracked update table. In one implementation, the event history table is chronological. In another implementation, if user A posts on user B's profile, then user A is under the "created by" 913 and user B is under the object ID 912.

In block 1040, a field change table (e.g., field change table 920) can be updated with an entry having the event identifier and fields that were changed in the update. In one implementation, the field change table is a child table of the event history table. This table can include information about each of the fields that are changed. For example, for an event that changes the name and balance for an account record, an entry can have the event identifier, the old and new name, and the old and new balance. Alternatively, each field change can be in a different row with the same event identifier. The field name or ID can also be included to determine which field the values are associated.

In block 1050, when the event is a post, a post table (e.g., post table 950) can be updated with an entry having the event identifier and text of the post. In one implementation, the field change table is a child table of the event history table. In another implementation, the text can be identified in the transaction (e.g., a query command), stripped out, and put into the entry at the appropriate column. The various tables described herein can be combined or separated in various ways. For example, the post table and the field change table may be part of the same table or distinct tables, or may include overlapping portions of data.

In block 1060, a comment is received for an event and the comment is added to a comment table (e.g., comment table 930). The comment could be for a post or an update of a record, from which a feed tracked update can be generated for display. In one implementation, the text can be identified in the transaction (e.g., a query command), stripped out, and put into the entry at the appropriate column.

D. Reading Information from Feed Tracked Update Tables

Figure 11:
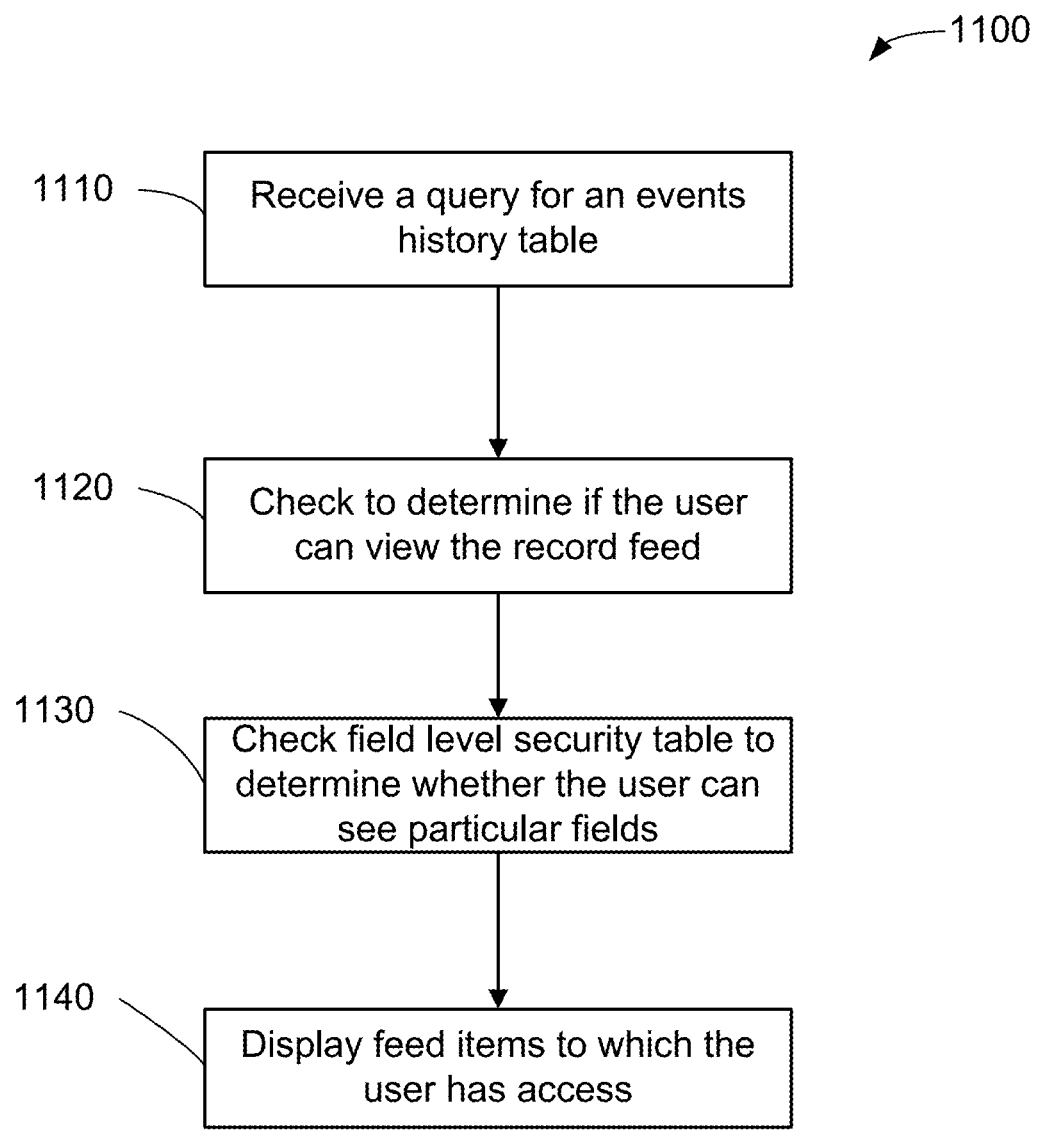
FIG. 11 shows a flowchart of an example of a method 1100 for reading a feed item as part of generating a feed for display, performed in accordance with some implementations.

FIG. 11 shows a flowchart of an example of a method 1100 for reading a feed item as part of generating a feed for display, performed in accordance with some implementations. In one implementation, the feed item may be read as part of creating a feed for a record.

In block 1110, a query is received for an events history table (e.g., event history table 910) for events related to a particular record. In one implementation, the query includes an identifier of the record for which the feed is being requested. In various implementations, the query may be initiated from a detail page of the record, a home page of a user requesting the record feed, or from a listing of different records (e.g., obtained from a search or from browsing).

In block 1120, the user's security level can be checked to determine if the user can view the record feed. Typically, a user can view a record feed, if the user can access the record. This security check can be performed in various ways. In one implementation, a first table is checked to see if the user has a classification (e.g., a security level that allows him to view records of the given type). In another implementation, a second table is checked to see if the user is allowed to see the specific record. The first table can be checked before the second table, and both tables can be different sections of a same table. If the user has requested the feed from the detail page of the record, one implementation can skip the security level check for the record since the check was already done when the user requested to view the detail page.

In one implementation, a security check is determined upon each request to view the record feed. Thus, whether or not a feed item is displayed to a user is determined based on access rights, e.g., when the user requests to see a feed of a record or a news feed of all the objects the user is following.

In this manner, if a user's security changes, a feed automatically adapts to the user's security level when it is changed. In another implementation, a feed can be computed before being requested and a subsequent security check can be made to determine whether the person still has access right to view the feed items. The security (access) check may be at the field level, as well as at the record level.

In block 1130, if the user can access the record, a field level security table can be checked to determine whether the user can see particular fields. In one implementation, only those fields are displayed to the user. Alternatively, a subset of those the user has access to is displayed. The field level security check may optionally be performed at the same time and even using the same operation as the record level check. In addition, the record type check may also be performed at this time. If the user can only see certain fields, then any feed items related to those fields (e.g., as determined from field change table 920) can be removed from the feed being displayed.

In block 1140, the feed items that the user has access to are displayed. In one implementation, a predetermined number (e.g., 20) of feed items are displayed at a time. The method can display the first 20 feed items that are found to be readable, and then determine others while the user is viewing the first 20. In another implementation, the other feed items are not determined until the user requests to see them, e.g., by activating a see more link.

Figure 12:
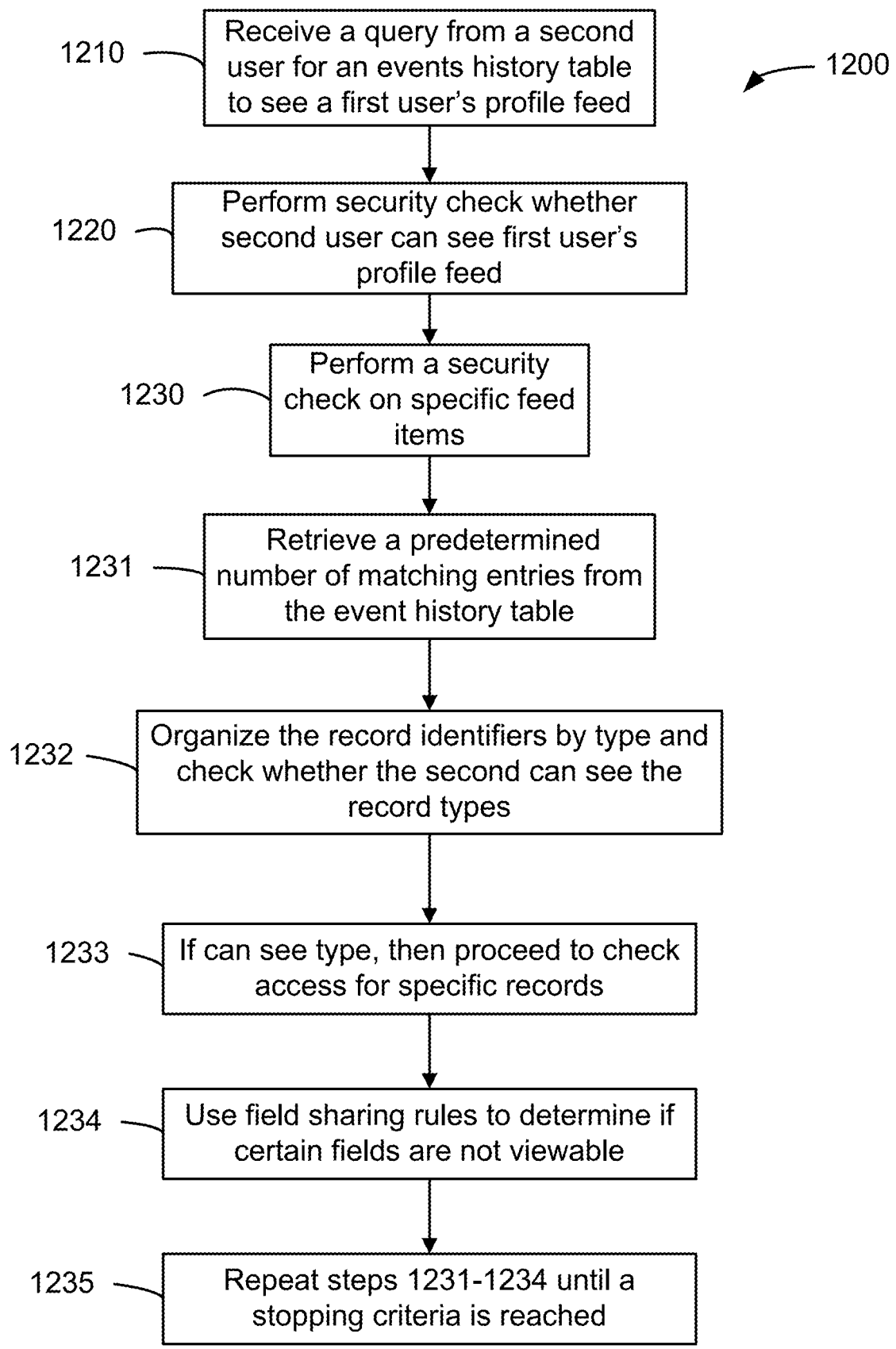
FIG. 12 shows a flowchart of an example of a method 1200 for reading a feed item of a profile feed for display, performed in accordance with some implementations.

FIG. 12 shows a flowchart of an example of a method 1200 for reading a feed item of a profile feed for display, performed in accordance with some implementations. In one implementation, the query includes an identifier of the user profile feed that is being requested. Certain blocks may be optional, as is also true for other methods described herein. For example, security checks may not be performed.

In block 1210, a query is directed to an event history table (e.g., event history table 910) for events having a first user as the actor of the event (e.g., creation of an account) or on which the event occurred (e.g., a post to the user's profile). In various implementations, the query may be initiated by a second user from the user's profile page, a home page of a user requesting the profile feed (e.g., from a list of users being followed), or from a listing of different users (e.g., obtained from a search or from browsing). Various mechanisms for determining aspects of events and obtaining information from tables can be the same across any of the methods described herein.

In block 1220, a security check may also be performed on whether the second user can see the first user's profile. In one implementation any user can see the profile of another user of the same tenant, and block 1220 is optional.

In block 1230, a security (access) check can be performed for the feed tracked updates based on record types, records, and/or fields, as well security checks for messages. In one implementation, only the feed tracked updates related to records that the person has updated are the ones that need security check as the feed items about the user are readable by any user of the same tenant. Users of other tenants are not navigable, and thus security can be enforced at a tenant level. In another implementation, messages can be checked for keywords or links to a record or field that the second user does not have access.

As users can have different security classifications, it is important that a user with a low-level security cannot see changes to records that have been performed by a user with high-level security. In one implementation, each feed item can be checked and then the viewable results displayed, but this can be inefficient. For example, such a security check may take a long time, and the second user would like to get some results sooner rather than later. The following blocks illustrate one implementation of how security might be checked for a first user that has a lot of feed items, but the second user cannot see most of them. This implementation can be used for all situations, but can be effective in the above situation.

In block 1231, a predetermined number of entries are retrieved from the event history table (e.g., starting from the most recent, which may be determined from the event identifier). The retrieved entries may just be ones that match the user ID of the query. In one implementation, entries are checked to find the entries that are associated with the user and with a record (i.e. not just posts to the user account). In another implementation, those entries associated with the user are allowed to be viewed, e.g., because the second user can see the profile of the first user as determined in block 1220.

In block 1232, the record identifiers are organized by type and the type is checked on whether the second user can see the record types. Other checks such as whether a record was manually shared (e.g., by the owner) can also be performed. In one implementation, the queries for the different types can be done in parallel.

In block 1233, if a user can see the record type, then a check can be performed on the specific record. In one implementation, if a user can see a record type, then the user can see all of the records of that type, and so this block can be skipped. In another implementation, the sharing model can account for whether a user below the second user (e.g., the second user is a manager) can see the record. In such an implementation, the second user may see such a record. In one implementation, if a user cannot see a specific record, then comments on that record are also not viewable.

In block 1234, field level sharing rules can be used to determine whether the second user can see information about an update or value of certain fields. In one implementation, messages can be analyzed to determine if reference to a particular field name is made. If so, then field level security can be applied to the messages.

In block 1280, blocks 1231-1234 are repeated until a stopping criterion is met. In one implementation, the stopping criteria may be when a maximum number (e.g., 100) of entries that are viewable have been identified. In another implementation, the stopping criteria can be that a maximum number (e.g., 500) of entries from the entity feed tracked update table have been analyzed, regardless of whether the entries are viewable or not.

In one implementation, a news feed can be generated as a combination of the profile feeds and the entity feeds, e.g., as described above. In one implementation, a list of records and user profiles for the queries in blocks 1110 and 1210 can be obtained from user subscription table 940. In one implementation, there is a maximum number of objects that can be followed.

E. Partial Pre-Computing of Items for a Feed

Figure 13:
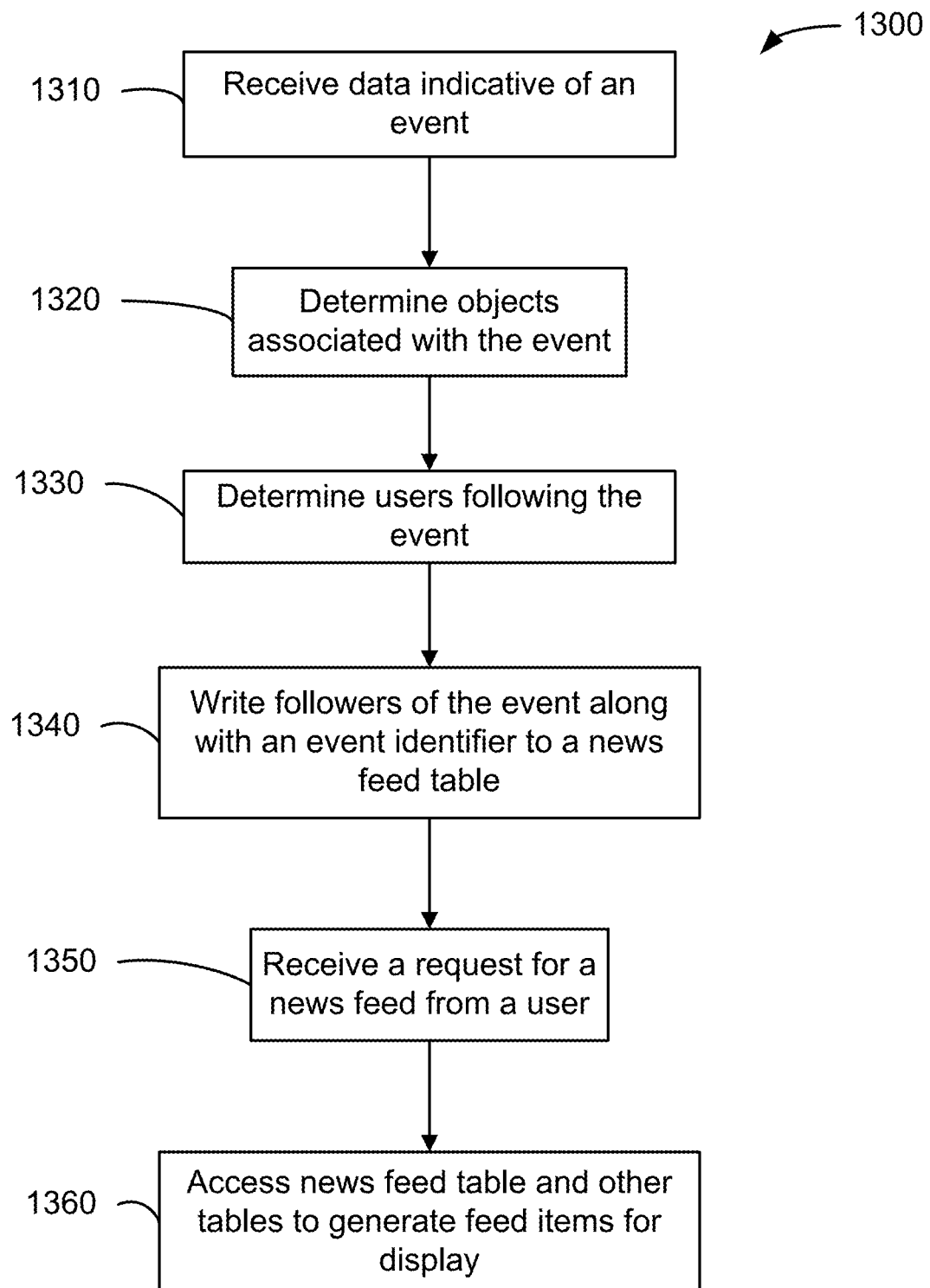
FIG. 13 shows a flowchart of an example of a method 1300 of storing event information for efficient generation of feed items to display in a feed, performed in accordance with some implementations.

FIG. 13 shows a flowchart of an example of a method 1300 of storing event information for efficient generation of feed items to display in a feed, performed in accordance with some implementations. In various implementations, method 1300 can be performed each time an event is written to the event history table, or periodically based on some other criteria (e.g., every minute, after five updates have been made, etc.).

In block 1310, data indicative of an event is received. The data may be the same and identified in the same way as described for block 1010. The event may be written to an event history table (e.g., table 910).

In block 1320, the object(s) associated with the event are identified. In various implementations, the object may be identified by according to various criteria, such as the record being changed, the user changing the record, a user posting a message, and a user whose profile the message is being posted to.

In block 1330, the users following the event are determined. In one implementation, one or more objects that are associated with the event are used to determine the users following the event. In one implementation, a subscription table (e.g., table 940) can be used to find the identified objects. The entries of the identified objects can contain an identifier (e.g., user ID 941) of each the users following the object In block 1340, the event and the source of the event, e.g., a record (for a record update) or a posting user (for a user-generated post) are written to a news feed table along with an event identifier. In one implementation, such information is added as a separate entry into the news feed table along with the event ID. In another implementation, each of the events for a user is added as a new column for the row of the user. In yet another implementation, more columns (e.g., columns from the other tables) can be added.

News feed table 960 shows an example of such a table with user ID 961 and event ID or pointer 962. The table can be organized in any manner. One difference from event history table 910 is that one event can have multiple entries (one for each subscriber) in the news feed table 960. In one implementation, all of the entries for a same user are grouped together, e.g., as shown. The user U819 is shown as following events E37 and E90, and thus any of the individual feed items resulting from those events. In another implementation, any new entries are added at the end of the table. Thus, all of the followers for a new event can be added as a group. In such an implementation, the event IDs would generally be grouped together in the table. Of course, the table can be sorted in any suitable manner.

In an implementation, if the number of users is small, then the feed items in one or more of the tables may be written as part of the same write transaction. In one implementation, the determination of small depends on the number of updates performed for the event (e.g., a maximum number of update operations may be allowed), and if more operations are performed, then the addition of the feed items is performed. In one aspect, the number of operations can be counted by the number of rows to be updated, including the rows of the record (which depends on the update event), and the rows of the feed tracked update tables, which can depend on the number of followers. In another implementation, if the number of users is large, the rest of the feed items can be created by batch. In one implementation, the feed items are written as part of a different transaction, i.e., by batch job.

In one implementation, security checks can be performed before an entry is added to the news feed table 960. In this manner, security checks can be performed during batch jobs and may not have to be performed at the time of requesting a news feed. In one implementation, the event can be analyzed and if access is not allowed to a feed item of the event, then an entry is not added. In one aspect, multiple feed items for a same user may not result from a same event (e.g., by how an event is defined in table 910), and thus there is no concern about a user missing a feed item that he/she should be able to view.

In block 1350, a request for a news feed is received from a user. In one implementation, the request is obtained when a user navigates to the user's home page. In another implementation, the user selects a table, link, or other page item that causes the request to be sent.

In block 1360, the news feed table and other tables are accessed to provide displayable feed items of the news feed. The news feed can then be displayed. In one implementation, the news feed table can then be joined with the event history table to determine the feed items. For example, the news feed table 960 can be searched for entries with a particular user ID. These entries can be used to identify event entries in event history table 910, and the proper information from any child tables can be retrieved. The feed items (e.g., feed tracked updates and messages) can then be generated for display.

In one implementation, the most recent feed items (e.g., 100 most recent) are determined first. The other feed items may then be determined in a batch process. Thus, the feed item that a user is most likely to view can come up first, and the user may not recognize that the other feed items are being done in batch. In one implementation, the most recent feed items can be gauged by the event identifiers. In another implementation, the feed items with a highest importance level can be displayed first. The highest importance being determined by one or more criteria, such as, who posted the feed item, how recently, how related to other feed items, etc.

In one implementation where the user subscription table 940 is used to dynamically create a news feed, the query would search the subscription table, and then use the object IDs to search the event history table (one search for each object the user is following). Thus, the query for the news feed can be proportional to the number of objects that one was subscribing to. The news feed table allows the intermediate block of determining the object IDs to be done at an earlier stage so that the relevant events are already known. Thus, the determination of the feed is no longer proportional to the number of object being followed.

In some implementations, a news feed table can include a pointer (as opposed to an event identifier) to the event history table for each event that is being followed by the user. In this manner, the event entries can immediately be retrieved without having to perform a search on the event history table. Security checks can be made at this time, and the text for the feed tracked updates can be generated.

X. Display of a Feed

Feeds include messages and feed tracked updates and can show up in many places in an application interface with the database system. In one implementation, feeds can be scoped to the context of the page on which they are being displayed. For example, how a feed tracked update is presented can vary depending on which page it is being displayed (e.g., in news feeds, on a detail page of a record, and even based on how the user ended up at a particular page). In another implementation, only a finite number of feed items are displayed (e.g., 50). In one implementation, there can be a limit specifically on the number of feed tracked updates or messages displayed. Alternatively, the limit can be applied to particular types of feed tracked updates or messages. For example, only the most recent changes (e.g., 5 most recent) for a field may be displayed. Also, the number of fields for which changes are displayed can also be limited. Such limits can also be placed on profile feeds and news feeds. In one implementation, feed items may also be subject to certain filtering criteria before being displayed, e.g., as described below.

XI. Filtering and Searching Feeds

It can be possible that a user subscribes to many users and records, which can cause a user's news feed to be very long and include many feed items. In such instances, it can be difficult for the user to read every feed item, and thus some important or interesting feed items may not be read. In some implementations, filters may be used to determine which feed items are added to a feed or displayed in the feed.

Figure 14:
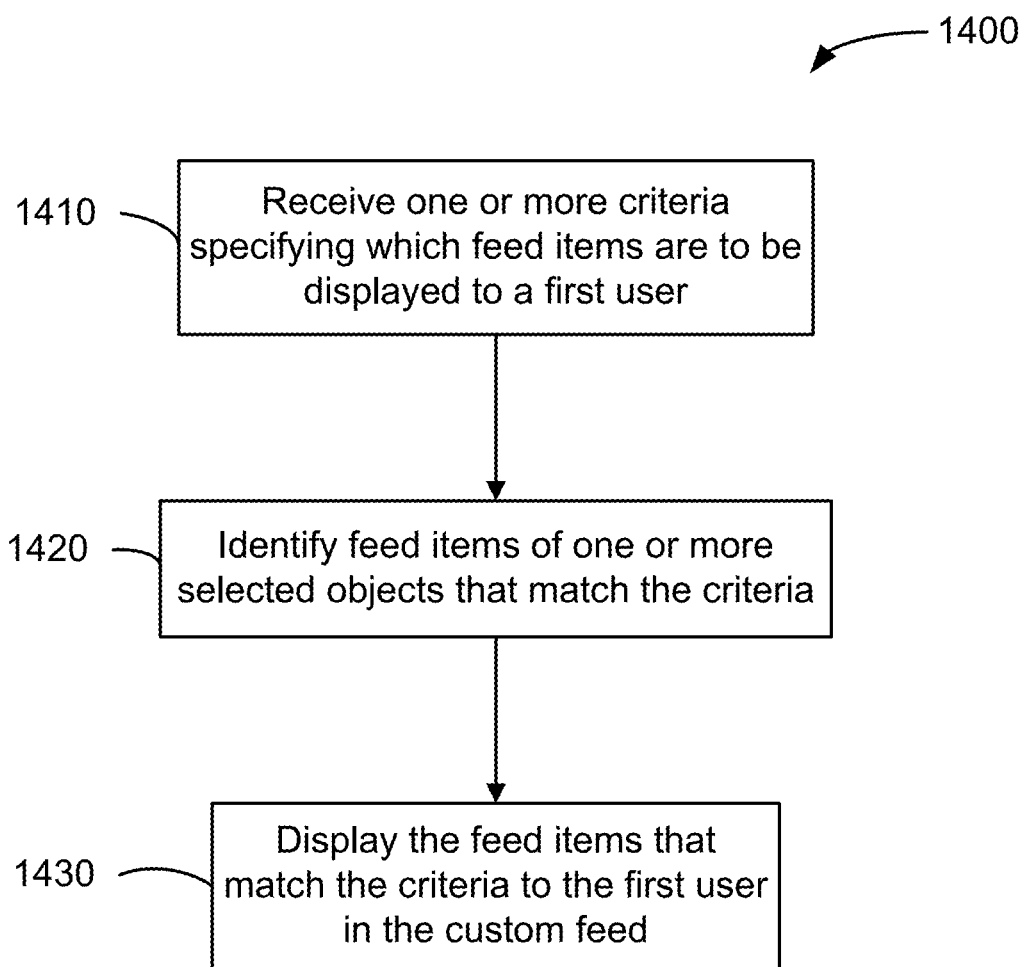
FIG. 14 shows a flowchart of an example of a method 1400 for creating a custom feed for users of a database system using filtering criteria, performed in accordance with some implementations.

FIG. 14 shows a flowchart of an example of a method 1400 for creating a custom feed for users of a database system using filtering criteria, performed in accordance with some implementations. Any of the following blocks can be performed wholly or partially with the database system, and in particular by one or more processor of the database system.

In block 1410, one or more criteria specifying which feed items are to be displayed to a first user are received from a tenant. In one implementation, the criteria specify which items to add to the custom feed. For example, the criteria could specify to only include feed items for certain fields of a record, messages including certain keywords, and other criteria mentioned herein. In another implementation, the criteria specify which items to remove from the custom feed. For example, the criteria could specify not to include feed items about certain fields or including certain keywords.

In block 1420, the database system identifies feed items of one or more selected objects that match the criteria. The feed items can be stored in the database, e.g., in one or more of the tables of FIG. 9A. In one implementation, the one or more selected objects are the objects that the first user is following. In another implementation, the one or more selected objects is a single record whose record feed the first user is requesting.

In block 1430, the feed items that match the criteria are displayed to the first user in the custom feed. The generation of text for a feed tracked update can occur after the identification of the feed items (e.g., data for a field change) and before the display of the final version of the feed item.

In one implementation, the criteria are received before a feed item is created. In another implementation, the criteria are received from the first user. In one aspect, the criteria may only be used for determining feeds to display to the first user. In yet another implementation, the criteria are received from a first tenant and apply to all of the users of the first tenant. Also, in an implementation where a plurality of criteria are specified, the criteria may be satisfied for a feed item if one criterion is satisfied. Some implementations can provide mechanisms to search for feed items of interest. For example, the feed items can be searched by keyword, e.g., as entered by a user. As another example, a tab (or other selection device) can show feed items about or from a particular user. In one implementation, only messages (or even just comments) from a particular user can be selected. Besides searching for feed items that match criteria, one also could search for a particular feed item.

XII. Establishing Access with External Content

Content can be scattered across many different network domains on the Internet. Such content can be stored in various data repositories or data sources that are hosted on different network domains from an on-demand database service. In some implementations, the data repositories can include content management data sources. Examples of content management data sources include Dropbox, Box.net, Google Drive, SharePoint, FileNet, Documentum, Skydrive, etc. Various content files and folders may be stored in one or more content management data sources outside of the on-demand database service, leading to content fragmentation. This may present difficulties in connecting, accessing, viewing, sharing, editing, searching, and performing other desired actions on content that is stored across many different content management data sources.

A system architecture may be provided to establish and unify access to content between an on-demand database service and one or more external content management data sources. The system architecture can include various software, application, user interface, and/or API components to facilitate access and communicate with the one or more content management data sources. The system architecture can provide a centralized read-write point of access to each of the one or more content management data sources.

Figure 15:
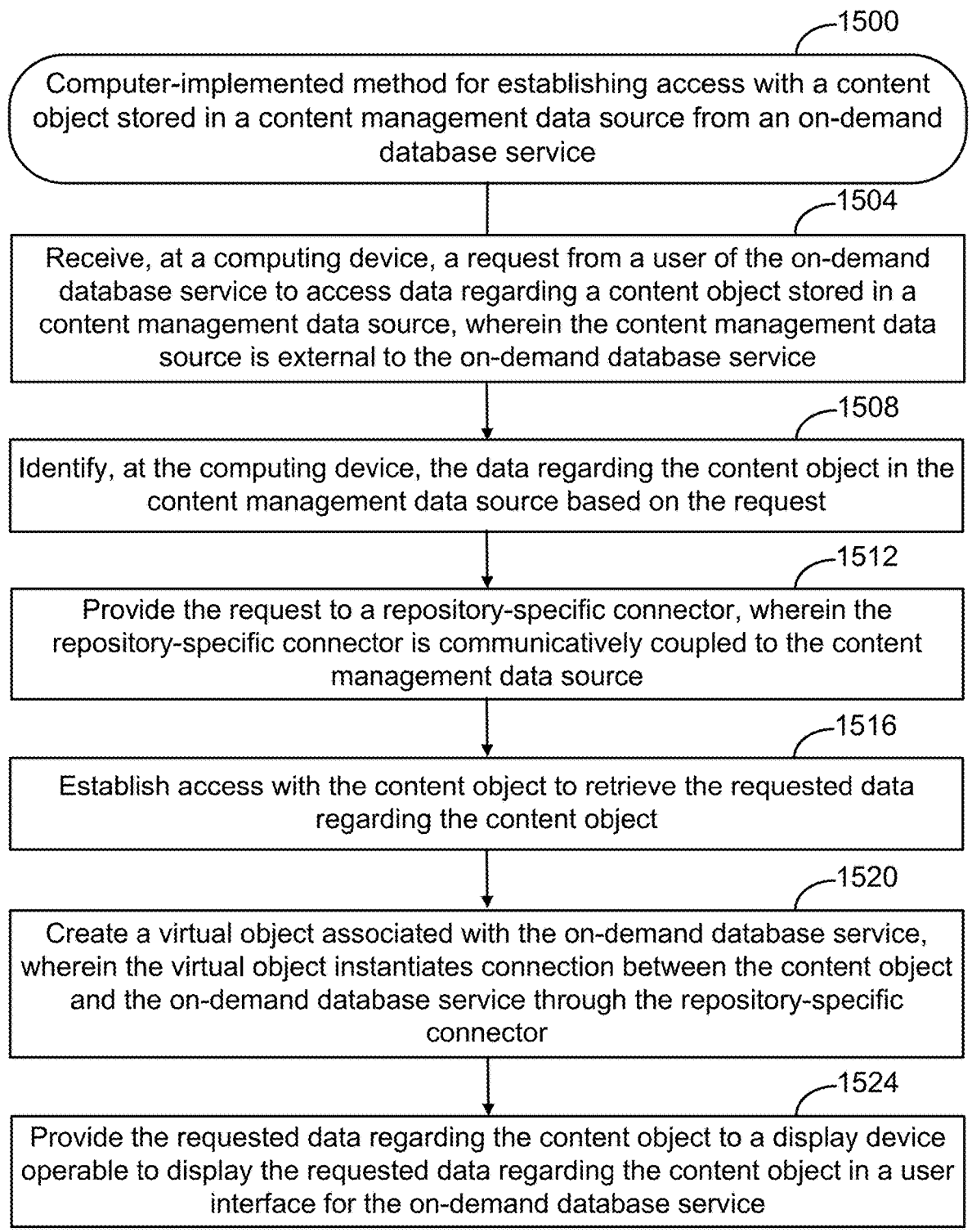
FIG. 15 shows a flowchart of an example of a computer-implemented method 1500 for establishing access with a content object stored in a content management data source from an on-demand database service, performed in accordance with some implementations.

FIG. 15 shows a flowchart of an example of a computer-implemented method 1500 for establishing access with a content object stored in a content management data source from an on-demand database service, performed in accordance with some implementations. The method 1500 shows a high-level overview of the types of operations that may be performed in establishing access to external content from an on-demand database service. The operations in the method 1500 may be performed in different orders and/or with different, fewer, or additional operations. The method 1500 may be described with reference to some examples as illustrated in FIGS. 19-23.

At block 1504 of the method 1500, a request is received at a computing device from a user of the on-demand database service to access data regarding a content object stored in a content management data source, where the content management data source is external to the on-demand database service. Content objects can include metadata as well as the actual content itself. Content objects can include content files and/or folders. However, it is understood that content objects are not limited to files and folders, but can include data of any type. Content files can include any file types, including text, audio, video, image, and/or other file. Content objects may be stored in various data repositories and hosted in network domains different than the on-demand database service.

In some implementations, the on-demand database service can include cloud-based services, including online business applications and online social networks. An online social network, such as Chatter®, facilitates communication and collaboration among entities. The online social network can be managed and controlled by a database service provider, such as salesforce.com. The online social network may also facilitate usage of other online services, including CRM services and database management services. The on-demand database services can also include online business applications, including but not limited to task management services (e.g., Do.com™), CRM services (e.g., Salescloud®), customer services (Service Cloud® and Desk.com™), performance management services (e.g., Rypple® and work.com), social marketing services (e.g., Radian6® and Buddy Media™), content and/or data management services (e.g., Database.com™, Data.com®), platform services (e.g., Site.com™, Heroku™, Force.com®, AppExchange®).

The data source is external to the on-demand database service and can store one or more content objects. In some implementations, the data source is "external" in that it is hosted on a network domain separate from the network domain of the on-demand database service. The data source can be a repository configured to store and manage content. In some instances, the data source can be a content management data source. The content management data source can be provided by a service provider such as Dropbox, Box.net, Google Drive, SharePoint, FileNet, Documentum, Skydrive, etc. In some implementations, the content management data source can provide content management and storage within a cloud-based environment, such as Dropbox, Box.net, and Google Drive. In some implementations, the content management data source can provide content management and storage within an organization, such as SharePoint and Documentum. This can be referred to as an on-premise content management data source.

The content management data source can serve as a content repository for storage of any data type. For example, a piece of formatted text or excerpt from a webpage can be stored in EverNote, a video can be stored in YouTube or Vimeo, an image can be stored in Flickr, a business report can be provided in SAP or Oracle, a search result can be provided in Google, etc.

A process call or request can be made to the content object stored in the external content management data source. The request can include instructions for locating and retrieving the content object so that data regarding the content object can be delivered to an end user in the on-demand database service. Instructions can include information data identifying the content object. In some implementations, information data identifying the content object can include a URL to the content object or a unique content object ID to the content object. Information data identifying the content object can further include a title, a source, an author, and other metadata. In some implementations, the information data identifying the content object can be provided by the user and received at the computing device.

In some implementations, the request to access data regarding the content object does not necessarily get transmitted directly to the external content management data source. The request may be communicated through one or more components in a system architecture to establish access with the external content management data source. The one or more components may provide the interface for communicating between the on-demand database service and the external content management data source. The request to access data regarding the content object may include information data identifying the content object to gain access to the content object when access with the external content management data source is established. The components of the system architecture may be described with reference to FIGS. 19-20.

Figure 19:
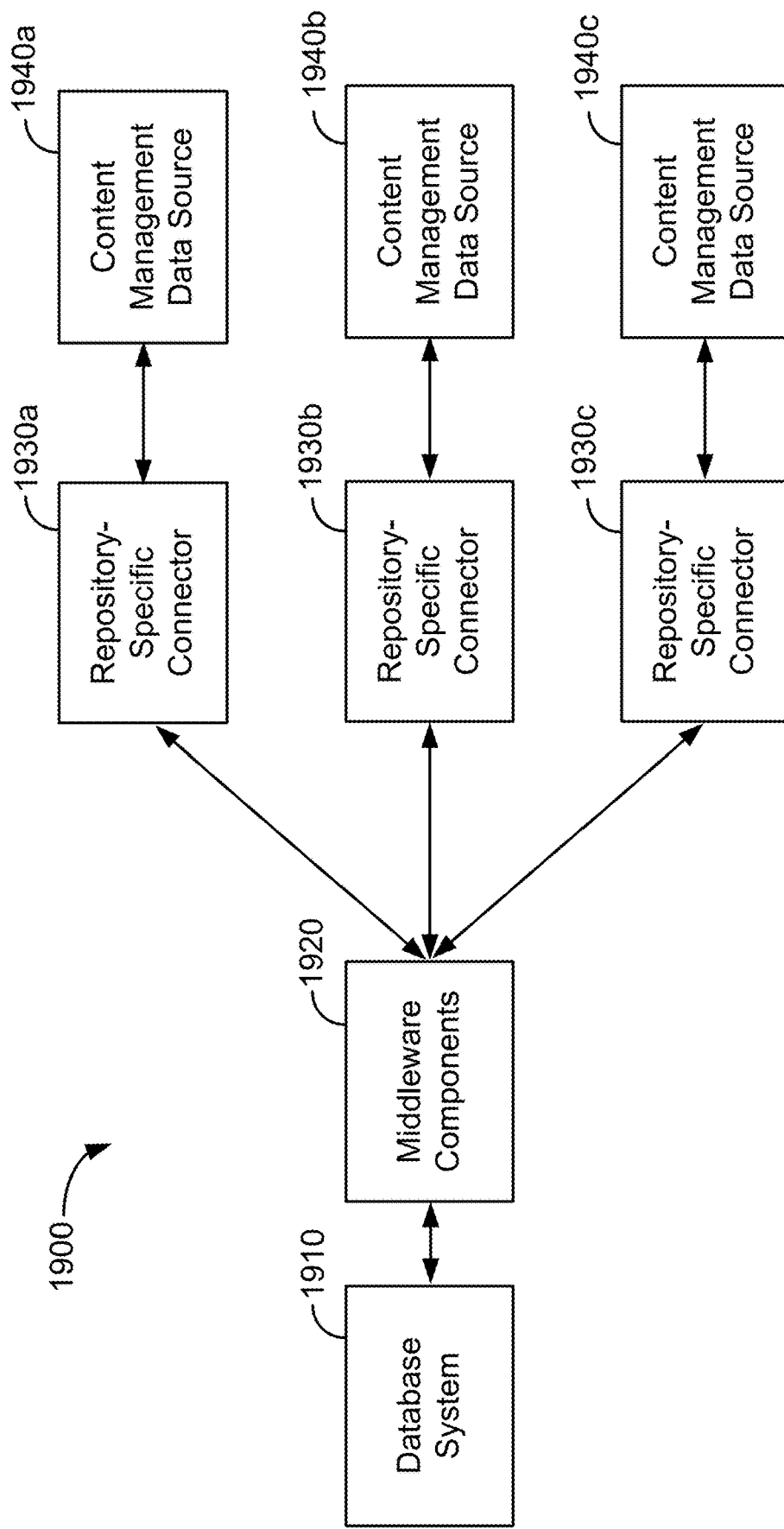
FIG. 19 shows an example of a system diagram 1900 illustrating architectural components for establishing access with a plurality of content management data sources, according to some implementations.

FIG. 19 shows an example of a system diagram 1900 illustrating architectural components for establishing access with a plurality of content management data sources, according to some implementations. A database system 1910, such as a multi-tenant database system, may be managed by a data provider, such as salesforce.com. A plurality of content management data sources 1940a, 1940b, and 1940c may provide a repository for storage and management of content. Integrating access across the plurality of content management data sources 1940a, 1940b, and 1940c may be limited without components mediating between the database system 1910 and each of the content management data sources 1940a, 1940b, and 1940c.

A system architecture can be implemented in the system diagram 1900 to mediate between the database system 1910 and each of the content management data sources 1940a,

1940b, and 1940c. The system architecture can include middleware components 1920. Middleware connects two or more otherwise separate applications or systems to enable seamless integration of the separate applications or systems. The middleware components 1920 can include a collection of software modules, APIs, and other associated infrastructure that allows for integrated access of content stored in external data repositories with the database system 1910. Integrated access of such content can be provided in the database system 1910 as if they were native to the database system 1910. The middleware components 1920 can be implemented as one or both of a set of features and an application platform. As used herein, the middleware components 1920 can collectively be referred to as a "content hub."

Each of the content management data sources 1940a, 1940b, and 1940c can be in communication with corresponding repository-specific connectors 1930a, 1930b, and 1930c. Each content management data source 1940a, 1940b, and 1940c can have an API. In some instances, the API can be publicly available. The repository-specific connectors 1930a, 1930b, and 1930c can include applications, such as Java applications, configured to communicate with the APIs of the corresponding content management data sources 1940a, 1940b, and 1940c.

The middleware components 1920 communicate with the repository-specific connectors 1930a, 1930b, and 1930c to establish access with the content management data sources 1940a, 1940b, and 1940c. In some implementations, the middleware components 1920 include an abstraction layer that is coded to write against each of the APIs of the content management data sources 1940a, 1940b, and 1940c through the repository-specific connectors 1930a, 1930b, and 1930c. In some implementations, the middleware components 1920 can provide a centralized read-write point of access across the plurality of content management data sources 1940a, 1940b, and 1940c.

Returning to FIG. 15, at block 1508 of the method 1500, the data regarding the content object in the content management data source is identified based on the request at the computing device. The content management data source may be identified via a universal API. Connectivity across several different content management data sources may be challenging. Each of the content management data sources may require different APIs to establish access. In some implementations, a universal API may be provided as an abstraction layer that normalizes access to a plurality of content management data sources. The universal API can provide a single API syntax that facilitates ease of communication with many disparate content management data sources.

Each external content management data source may have a connector adapted for communicating requests to and from the content management data source. Accordingly, the universal API communicates the request to a connector for a specific content management data source. The connector may be referred to as a repository-specific connector, as discussed above.

In some implementations, the request can include the information data identifying the content object that can be passed through the universal API to identify and locate the content management data source. For example, the universal API can process the unique content object ID to identify the particular content management data source storing the content object.

The universal API can process a request to access data regarding the content object and communicate such a request to a specific repository-specific connector. By way of an example, the universal API can process a request to retrieve metadata from the content object, such as a request "GetAuthor (file ID, source)." The universal API can write the request in a universal API syntax so that the request can be subsequently processed and translated for a particular content management data source API. Thus, the request can be made without having to define the request according to the syntax of the particular content management data source. Therefore, the processed request can locate the appropriate file in the appropriate source to retrieve the desired author name of the file.

At block 1512 of the method 1500, the request is provided to a repository-specific connector, where the repository-specific connector is communicatively coupled with the content management data source. The repository-specific connector communicates with the content management data source through the API of the content management data source. The repository-specific connector can include code to provide retrieval and/or access of data to and from the content management data source. The code can wrap the API of the content management data source with the universal API. In some implementations, the repository-specific connector can be configured to provide read-write to/from the content management data source. In some implementations, the repository-specific connector can be part of a connector server deployed by an entity (e.g., customer) for the content management data source. For example, the connector server can be deployed where the content management data source exists behind a security layer or firewall. In some implementations, providing the requested data to the repository-specific connector can be performed through one or both of the universal API and a virtual object.

At block 1516 of the method 1500, access is established with the content object to retrieve the data regarding the content object. One or both of the abstraction layer in the universal API and the repository-specific connector can process the request from the on-demand database service to gain access to the content object. Upon gaining access, the data regarding the content object can be retrieved. In some implementations, the data regarding the content object can include metadata that can include but is not limited to a title, a source, an author, a description, a unique ID, a created date, a last modified timestamp, a file size, a URL, etc.

At block 1520 of the method 1500, a virtual object associated with the on-demand database service is created, where the virtual object instantiates connection between the content object and the on-demand database service through the repository-specific connector. The virtual object can be a temporary object that provides an interface between data coming from the content management data source and one or more APIs employed by the on-demand database service. The virtual object can function like an Open Database Connectivity (ODBC) component, serving as a translation layer between the content management data source and the on-demand database service. The virtual object may be temporarily stored in a memory unit in the on-demand database service and then subsequently removed after use.

In some implementations, the virtual object can create a mapping between the retrieved data coming from the content management data source and the API format that the on-demand database service is built around. For example, if the on-demand database service uses objects having a format provided by a standard API in the on-demand database service, then the virtual object can be created to mimic objects having such a format. Thus, when a user queries for data regarding an external content object from an on-demand database service, and the external content object is not formatted according to a standard object format in the on-demand database service, the virtual object can be created to represent the external content object according to the standard object format.

When data regarding the content object is retrieved from the content management data source, the data can be mapped to the virtual object. For example, objects in salesforce.com can be formatted as data structures having tables including columns for data such as author, title, file size, etc. A virtual object can be temporarily created to provide mapping of retrieved data from the content object to the columns for data such as author, title, file size, etc. As such, connection between the content object and the on-demand database service can be instantiated.

Figure 20:
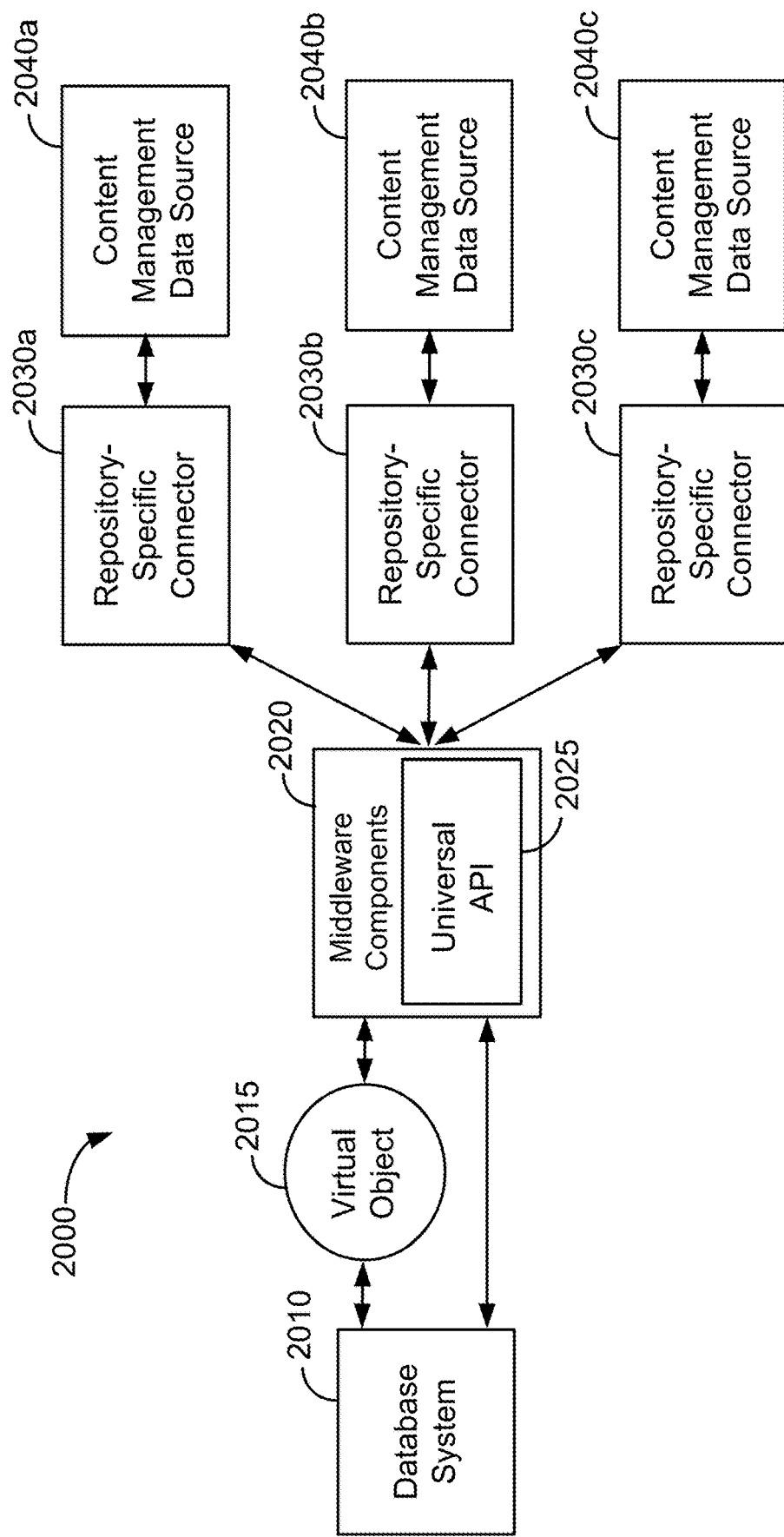
FIG. 20 shows another example of a system diagram 2000 illustrating architectural components for establishing access with a plurality of content management data sources, according to some implementations.

FIG. 20 shows another example of a system diagram 2000 illustrating architectural components for establishing access with a plurality of content management data sources, according to some implementations. Similar to FIG. 19, the system diagram 2000 includes a database system 2010, middleware components 2020, repository-specific connectors 2030a, 2030b, and 2030c, and content management data sources 2040a, 2040b, and 2040c. And like FIG. 19, the repository-specific connectors 2030a, 2030b, and 2030c provide communication with their corresponding content management data sources 2040a, 2040b, and 2040c.

In the system diagram 2000 in FIG. 20, the architectural components show at least two abstraction layers for interfacing between the database system 2010 and the content management data sources 2040a, 2040b, and 2040c. One abstraction layer can include the universal API 2025 that enables users to write against disparate content management data sources in a single API syntax. The universal API 2025 can be part of the middleware components 2020. This abstraction layer can instantiate connection between the content management data sources 2040a, 2040b, and 2040c and the database system 2010.

Another abstraction layer can include the virtual object 2015. The virtual object 2015 provides a mapping for retrieved data coming from a content management data source to the database system 2010. An on-demand database service providing the database system 2010 can access the data by querying the virtual object 2015. In other words, the virtual object 2015 can provide temporary representation of an external content object to the on-demand database service. This abstraction layer can instantiate connection between the content object stored in one of the content management data sources 2040a, 2040b, and 2040c and the database system 2010.

In some implementations, as illustrated in the example in FIG. 20, the virtual object 2015 can communicate with the middleware components 2020, which can facilitate unified access across a plurality of content management data sources 2040a, 2040b, and 2040c. However, in other implementations, the virtual object 2015 can be in direct communication with one of the repository-specific connectors 2030a, 2030b, and 2030c. In such instances, communication of data might not pass through a centralized content hub, but separately through individual connectors.

Returning to FIG. 15, at block 1524 of the method 1500, the requested data regarding the content object is provided to a display device operable to display the requested data regarding the content object in a user interface for the on-demand database service. The user interface can include, for example, a social layer of an online social network or online business application, where the social layer is accessible to a plurality of users in the online social network or online business application. Data can be exposed in the user interface so that the users can view or otherwise interact with the data. For example, the data can include metadata such as a title, a source, an author, a file size, etc.

In some implementations, the requested data regarding the content object can be stored in a persistent object in a database of the on-demand database service. The persistent object can provide persistent representation of the content object. The content object can be accessed by information data identifying the content object, where the information data identifying the content object can be stored in the persistent object. While the persistent object may not store actual content (e.g., blob) of a content object, the persistent object may represent the content objet by including a pointer (e.g., URL) to the actual content and including other data regarding the content object. In some implementations, the persistent object can have a database structure in the form of a table with various data fields logically arranged as columns. The persistent object can behave and function like a record in the on-demand database service. The persistent object can facilitate access to the external content object without having the content object be moved to or replicated in the on-demand database service.

In some implementations, providing the requested data regarding the content object can include providing a selectable component for the persistent object to the display device operable to display the selectable component in the user interface for the on-demand database service. For instance, the selectable component can serve as a hyperlink to take an entity directly to the URL of the content object. The selectable component can include but is not limited to an icon, a button, a link, a reference, or a string of characters. Selection of the selectable component can initiate an action, such as opening the content object via the URL or unique content object ID, downloading the content object via the URL or unique content object ID, and opening a detailed information page view regarding the persistent object.

In some implementations, the method 1500 can further include determining that the user has permission to access the data regarding the content object. Various schemes can be employed to authenticate users to the external content management data source, which is discussed in more detail below. Security and access permissions may be controlled by the content management data source of the content object. In some implementations, the security and access permissions may be controlled by a third-party broker.

In some instances, the content management data source can be an on-premise content management data source. Examples of on-premise content management data sources can include SharePoint and Documentum. In some implementations, the method 1500 can further include traversing a security layer between the on-demand database service and the on-premise content management data source. System architectures for traversing a security layer can be described with reference to FIGS. 21-23.

Figure 21:
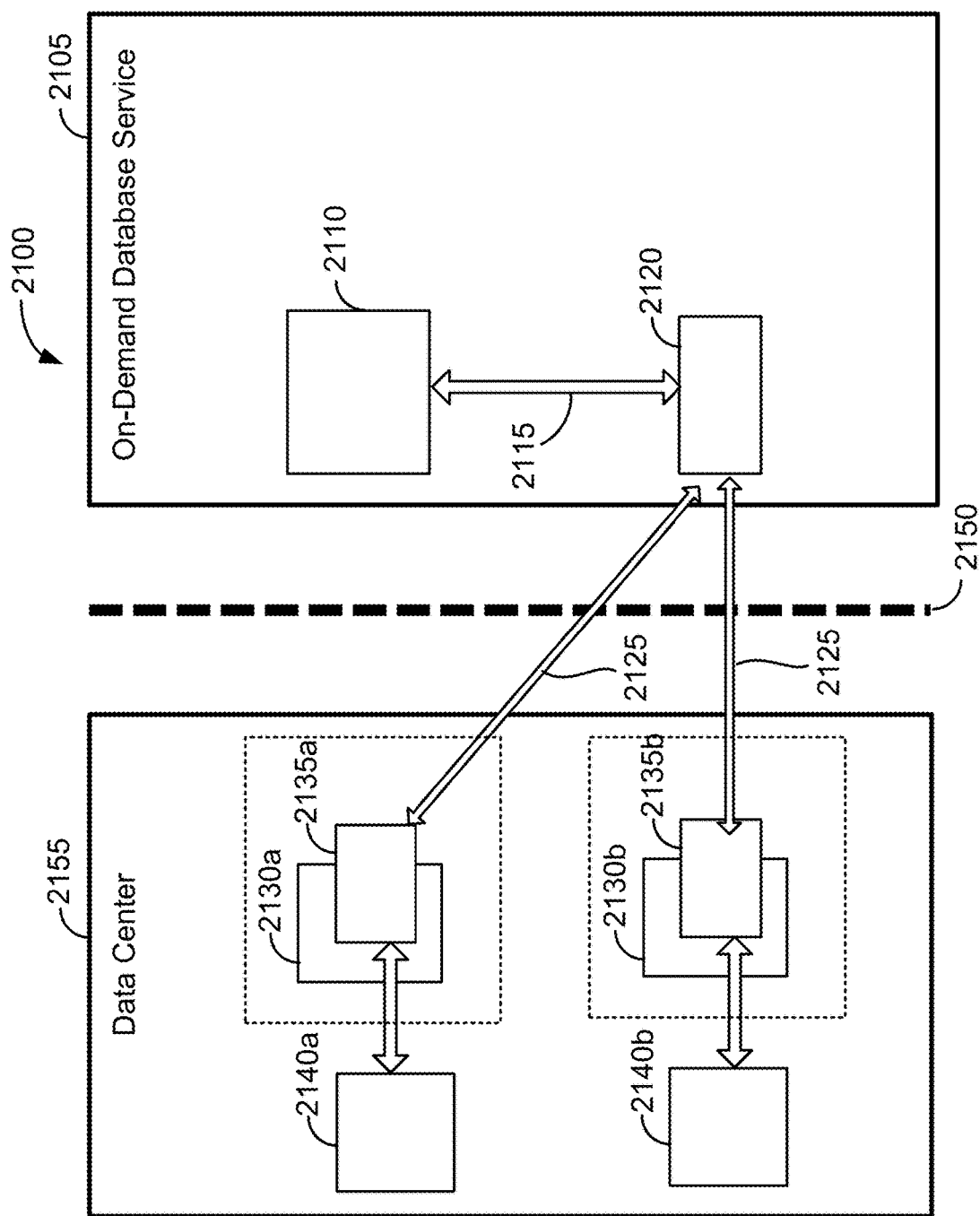
FIG. 21 shows an example of a system diagram 2100 illustrating an on-demand database service in communication with a data center having on-premise content management data sources, according to some implementations.

FIG. 21 shows an example of a system diagram 2100 illustrating an on-demand database service in communication with a data center having on-premise content management data sources, according to some implementations. A data center 2155 can include a plurality of data sources 2140a and 2140b, including content management data sources. The content management data sources can include on-premise content management data sources, such as Documentum, SharePoint, and FileNet. The data sources 2140a and 2140b are external to an on-demand database service 2105. In some implementations, the on-demand database service 2105 may be part of a first network domain managed by a first data provider, and the data sources 2140a and 2140b may be part of a second network domain managed by one or more second data providers. In some implementations, the data source 2140a and the data source 2140b may be managed by different data providers, or may be managed by the same data provider. In some instances, two data sources 2140a and 2140b from the same data provider may result in different sites accessible to different entities. The on-demand database service 2105 may be separated from the data center 2155 by a security layer or firewall 2150. The security layer 2150 can limit inbound connections to the data sources 2140a and 2140b.

To access the data sources 2140a and 2140b, the on-demand database service 2105 may traverse the security layer 2150. In some implementations, connector servers 2130a and 2130b may exist or otherwise be deployed behind the security layer 2150. Connector servers 2130a and 2130b may establish inbound connections with their corresponding data sources 2140a and 2140b. In some implementations, the connector servers 2130a and 2130b may include repository-specific connectors customized to establish read-write access to/from their corresponding data sources 2140a and 2140b.

To communicate with the connector servers 2130a and 2130b, connection may be established between a secure transport server 2120 and one or more secure transport clients 2135a and 2135b through secure transport communication channels 2125. Process calls and requests may be made to/from the on-demand database service 2105 and the data center 2155 through the secure transport communication channels 2125. The secure transport communication channels 2125 may be a full-duplex secure transport tunnel. In some implementations, the full-duplex secure transport tunnel may be a Websocket protocol.

The secure transport server 2120 may be part of the on-demand database service 2105, and the secure transport clients 2135a and 2135b may be part of the data center 2155. In some implementations, a customer may deploy or otherwise provide a component that includes a secure transport client and a connector server, such as secure transport clients 2135a and 2135b and connector servers 2140a and 2140b. The component can include, for example, a Linux box. Each connector server 2130a and 2130b can be configured to connect to their corresponding data sources 2140a and 2140b. The secure transport clients 2135a and 2135b can be configured to connect with the secure transport server 2120.

The on-demand database service 2105 may include one or more middleware components that provide a centralized read-write point of access for the on-demand database service 2105 to connected data sources 2140a and 2140b, which can be referred to as a content hub 2110. The content hub 2110 may be implemented as a set of features or as an application platform. Any requests made in the on-demand database service 2105 may be sent to the content hub 2110. The content hub 2110 then forwards the requests to the secure transport server 2120, which can be passed through an API 2115. The requests may then be forwarded to a connector server 2130a or 2130b via the secure transport communication channel 2125. The connector server 2130a or 2130b connects to a corresponding data source 2140a or 2140b to execute the request. A response may be sent back from the connector server 2130a or 2130b to the secure transport server 2120 via the secure transport communication channel 2125. The response may be forwarded to the content hub 2110, which may then be sent back to the on-demand database service 2105. Accordingly, interactions with content in the data sources 2140a and 2140b can pass signals through such a sequence of operations in the system diagram 2100.

In some implementations, secure transport communication channel 2125 not only can provide for communication between the secure transport server 2120 and the secure transport clients 2135a and 2135b, but also can provide for a secure connection. In some implementations, a computing device, such as a secure transport server 2120, may determine that authentication credentials for a connector server 2130a or 2130b are valid through the secure transport communication channel 2125. The secure transport communication channel 2125 may forward authentication requests and authentication credentials to the connector server 2130a or 2130b at the corresponding secure transport client 2135a or 2135b. A determination can be made that the authentication credentials are valid. Thus, a request to access any of the data sources 2140a and 2140b through the secure transport communication channel 2125 may be authenticated.

In some implementations, the secure transport client 2135a or 2135b can be identified using an addressing scheme indicating organization-site-product-process (OSPR) for the corresponding data source 2140a or 2140b. An OSPR token authenticates the secure transport client 2135a or 2135b and is used to request routing by the secure transport server 2120. An OSPR token may be provided from the secure transport client 2135a or 2135b each time a connection is established with the secure transport server 2120. The secure transport server 2120 can validate that the received OSPR token originates from a secure transport client 2135a or 2135b if it is "white-listed" or otherwise known by the secure transport server 2120. In some implementations, the OSPR token may be embedded in a client certificate.

Figure 22:
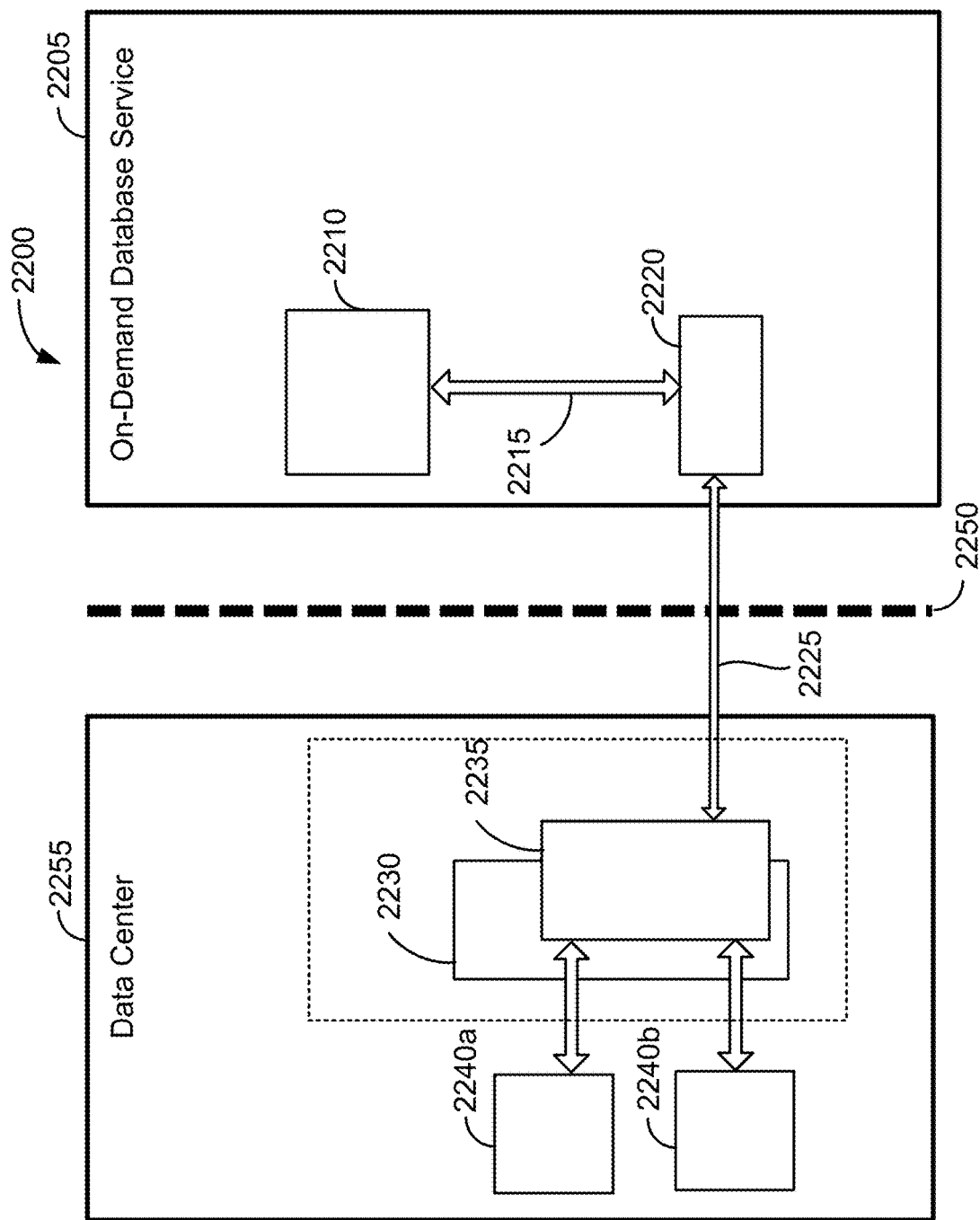
FIG. 22 shows another example of a system diagram 2200 illustrating an on-demand database service in communication with a data center having on-premise content management data sources, according to some other implementations.

FIG. 22 shows another example of a system diagram 2200 illustrating an on-demand database service in communication with a data center having on-premise content management data sources, according to some other implementations. A data center 2255 can include at least two data sources 2240a and 2240b separated from an on-demand database service 2205 by a security layer 2250. The security layer 2250 can be traversed by establishing connection between a secure transport server 2220 and a secure transport client 2235 via a secure transport communication channel 2225. As illustrated in the example in FIG. 22, a content hub 2210 can send requests via an API 2215 to the secure transport server 2220, which then forwards the request to a connector server 2230 via the secure transport communication channel 2225. The connector server 2230 can connect to at least two data sources 2240a and 2240b. In some implementations, the connector server 2230 can harness multiple customized connectors to connect to multiple data sources 2240a and 2240b. In some implementations, the connector server 2230 can employ a single customized connector to connect to multiple data sources 2240a and 2240b, where the data sources 2240a and 2240b may be managed by a single data provider. For example, the data sources 2240a and 2240b can include different sites accessible to different entities.

Figure 23:
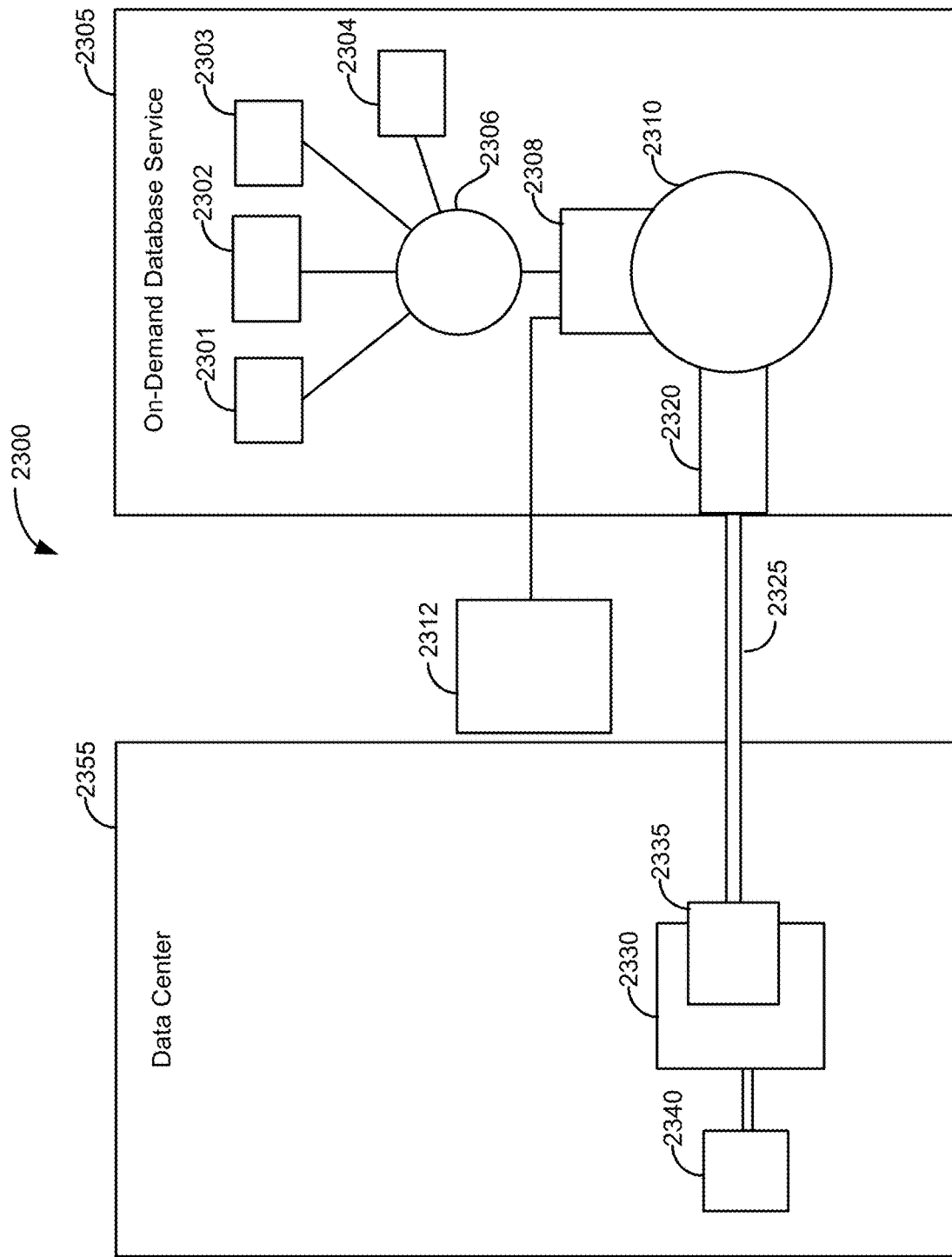
FIG. 23 shows an example of a system diagram 2300 illustrating a system architecture for establishing access with an external content management data source from an on-demand database service, according to some implementations.

FIG. 23 shows an example of a system diagram 2300 illustrating a system architecture for establishing access with an external content management data source from an on-demand database service, according to some implementations. A data center 2355 can include at least one data source 2340 external to an on-demand database service 2305. In some implementations, the data source 2340 may be separated from the on-demand database service 2305 by a security layer (not shown), in which case a secure transport communication channel 2325 may be provided to traverse the security layer between a secure transport server 2320 and a secure transport client 2335. A connector server 2330 may be configured to provide read-write access to/from the data source 2340. A content hub 2310 may include one or more middleware components to provide an interface between the on-demand database service 2305 and the data source 2340 so that content objects stored in the data source 2340 can be accessed as if they were native to the on-demand database service 2305.

The on-demand database service 2305 may include a multi-tenant database system managed by a data provider, such as salesforce.com. For example, the multi-tenant database system may include a social networking system, such as Chatter®. The data source 2340 may include a content management data source, such as Dropbox, Box.net, Google Drive, SharePoint, FileNet, Documentum, Skydrive, etc.

The on-demand database service 2305 can include various database-stored procedures and methods, such as applications 2301, searches 2302, object-oriented programming code 2303, persistent objects 2304, and the like. The database-stored procedures and methods may be processed through a virtual object API 2306. The virtual object API 2306 can include virtual objects that provide mapping for data coming from the data source 2340 to the on-demand database service 2305. In implementations with using salesforce.com, applications 2301 can include, for example, Force.com, Work.com, Data.com, Visualforce.com, and other applications provided by salesforce.com to interface with the virtual object API 2306. Searches 2302 can take user input to perform federated searches across the at least one data source 2340 using the virtual object API 2306. Object-oriented programming code can allow developers to execute flow and transaction control statements on the virtual object API 2306. Persistent objects 2304 provide persistent representations of content objects stored in the data source 2340, where data regarding the content object may be described in the virtual object in the virtual object API 2306.

The virtual object API 2306 can process the database-stored procedures and methods and submit them to an internal content hub API 2308. The internal content hub API 2308 can forward such submissions to the content hub 2310. The internal content hub API 2308 can serve as a gateway for database-stored procedures and methods that go through the content hub 2310.

In some implementations, various process calls and requests may be made by users and/or applications from within the on-demand database service 2305 or external to the on-demand database service 2305. Process calls and requests made external to the on-demand database service 2305 may go through a user/public API 2312. The user/public API 2312 then forwards the requests to the internal content hub API 2308. The user/public API 2312 may process requests that include content not addressable by the virtual object API 2306. Requests from the user/public API or virtual object API 2306 may be forwarded to the connector server 2330 through the content hub 2310 and secure transport communication channel 2325. Requests and responses between the on-demand database service 2305 and the data source 2340 may undergo a sequence of operations similar to the sequence of operations described earlier with respect to FIGS. 21 and 22.

XIII. Providing Access to External Content in an on-Demand Database Service

When access to an external data source is established from an on-demand database service, data regarding a content object may be retrieved from the external data source. At least some of the data can be stored in a persistent object in a database of the on-demand database service. The persistent object can provide a persistent representation of the content object in the on-demand database system without replicating the content object in the on-demand database service or causing the content object to leave its original source. The persistent object may be made accessible to a plurality of users in the on-demand database service. The persistent object can be viewed, indexed, searched, commented upon, recommended to other users, liked, followed, shared, accessed, propagated, collaborated upon, moved, edited, updated, deleted, and otherwise interacted with in the context of an online social network or online business application. This can provide users with social collaborative capabilities with respect to third-party content in the context of an on-demand database service.

FIG. 16 shows a flowchart of an example of a computer-implemented method 1600 for providing access in an on-demand database service to a content object stored in an external content management data source, performed in accordance with some implementations. The method 1600 may be described with reference to some examples illustrated in FIGS. 24-35.

At block 1604 of the method 1600, information data identifying a content object is received at a computing device, where the content object is stored in a content management data source external to the on-demand database service. In some implementations, the on-demand database service can include cloud-based services, including services for online business applications and online social networks. In some implementations, the content management data source can be any data repository that manages and stores content. The content management data source can be hosted on a network domain separate from the network domain of the on-demand database service. The content object can include any data type. As used herein, the content management data source may be referred to as a "third-party repository" and the content object may be referred to as a "third-party file."

A process call can be made to the content object or third-party file stored in the data repository. The process call can include instructions for locating and retrieving the content object so that the content object can be delivered to an end user. However, the content object does not necessarily leave its data repository. Instructions can include information data identifying the content object. In some implementations, information data identifying the content object can include a URL to the content object or a content object identifier (ID) to the content object. The content object ID can include a title, a source, a URL, and/or a unique identification (ID) of the content object. Information data identifying the content object can further include other metadata. In some implementations, the information data identifying the content object can be provided by an entity and received at a computing device.

In some implementations, the information data identifying the content object can be provided by user input via an API. FIG. 24 shows an example of an API for creating a persistent object representing a content object. A process call to the content object can be made via the persistent object. The persistent object can be created using the information data identifying the content object.

As illustrated in the example in FIG. 24, the API 2400 includes a table 2401 having a plurality of fields 2402. At least some of the fields 2402 can represent data fields for identifying a content object stored in a third-party repository.

A user can provide information data identifying the content object by manually inputting values into each of the values 2403 of the table 2401. In some implementations, the user can provide values by applying a "smart lookup" 2404 to select values that can be automatically generated.

Figure 25:
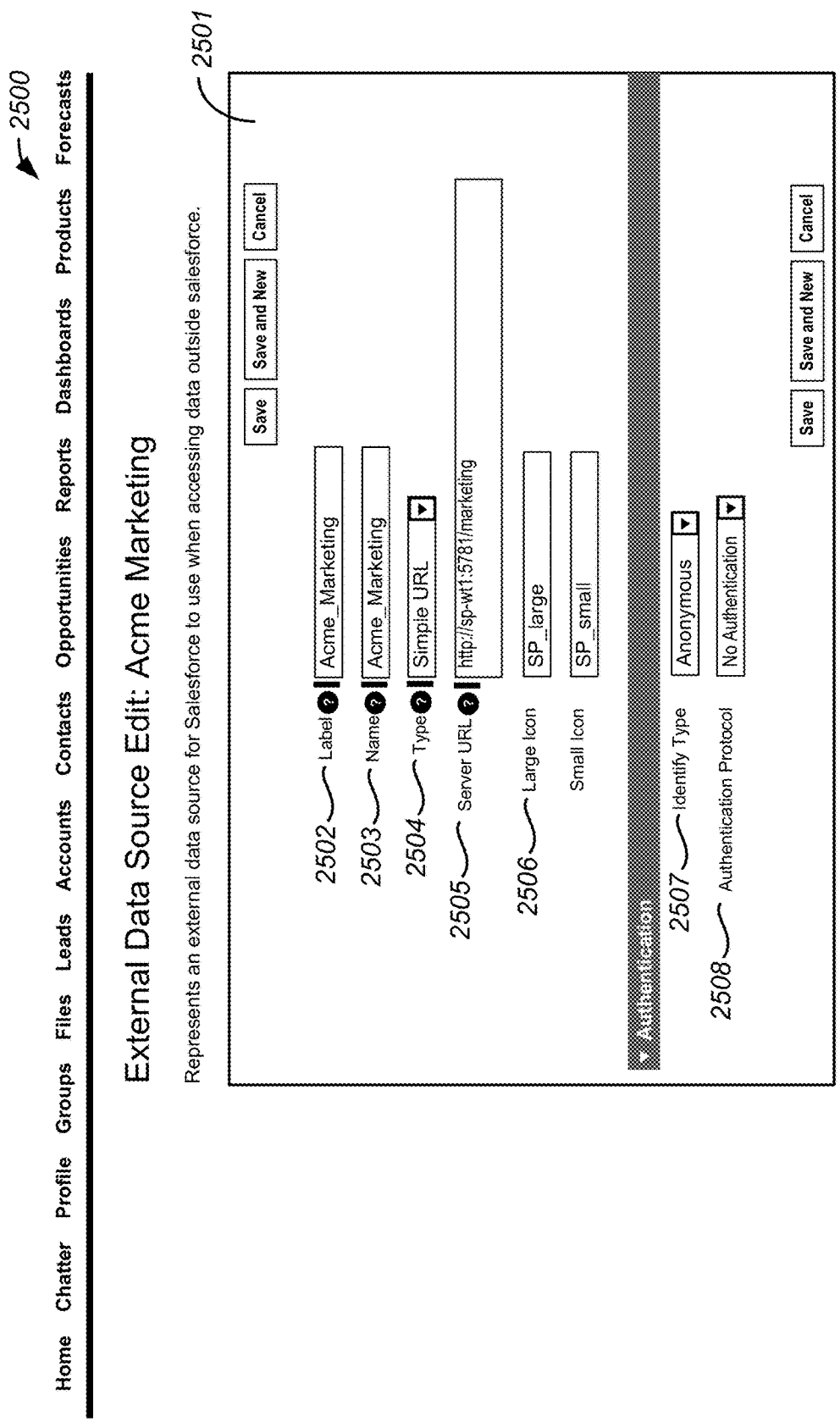
FIG. 25 shows an example of a user interface for identifying an external data source to access.
Figure 26:
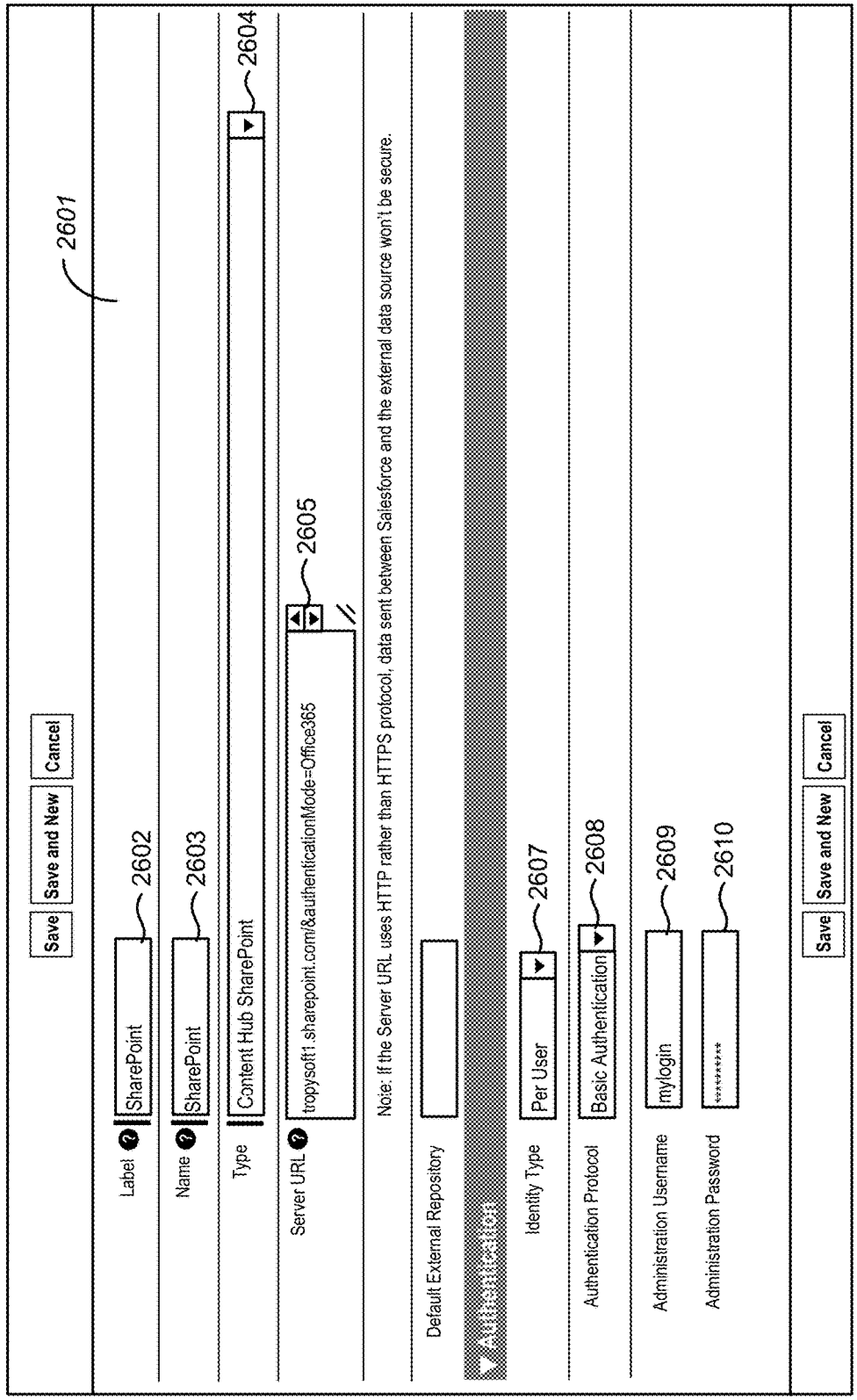
FIG. 26 shows an example of a user interface for identifying an external content management data source to access.

In providing information data identifying the content object, a content location 2405 can be identified. In the example in FIG. 24, a value of "E" is indicated to show that the content location 2405 is external to the on-demand database service. In addition, an External Data Source ID 2406 can be identified to determine the source of the content object. The value in the External Data Source ID 2406 can be represented by a string of characters indicating a unique ID of the external data repository, which can be scraped from a browser URL bar when viewing the third-party repository. Alternatively, the External Data Source ID 2406 can be specified from another API as shown in FIGS. 25 and 26. Under External Document Info1 2407, a string of characters can be indicated to show the URL or remainder of the URL pointing to the content object. The External Data Source ID 2406 and the External Document Info1 2407 can collectively provide the URL to the content object. Furthermore, an origin 2408 can be specified by the user to indicate what kind of object the persistent object will be and where the persistent object will be stored. In FIG. 24, a value of "H" is provided to show that the persistent object will be a Chatter® file and stored in a database in Chatter®. A Path On Client 2409 can be specified to indicate the original source of content object and the content object's extension. This data can be used to open the appropriate application when accessing the content object. For example, the document extension of *.doc can provide instructions to the computing device to open the content object using Microsoft Word or other word processing application. A Title 2410 can be provided to indicate the title of the content object for display in a user interface.

In some implementations, the information data identifying the content object can be automatically generated. In particular, the values for providing identification of the content object can be automatically generated based on previously known values or default values. Rather than manually entering information data identifying the content object, such data can be machine or system-generated. For example, identification of the URL of the content object or the ID of the source can automatically generate a value for Content Location 2405. In another example, identification of the URL or can automatically generate a value for the Title 2410 by scraping a portion of the URL.

In some implementations, the information data identifying the content object may be provided in a manner other than through API 2400, such as through computer programming instructions shown below:

```
var cv =new sforce.SObject("ContentVersion");
cv.Origin='H'; cv.ContentLocation='E';
cv.ExternalDataSourceId='OXCD0000000005z';
cv.ExternalDocumentInfo1='/sites/sfde/sandbox/Shared%20Documents/
Marketing%20brochure.docx';
cv.PathOnClient=
'https://sp.marketing.fisker.com/sites/sfdc/sandbox/SharedDocuments/
Fiskermarketingguidelines.docx';
cv.Title='Fisker Marketing Guidelines';
sforce.connection.create([cv]);
```

In some implementations, the information data identifying the content object may be retrieved from the third-party repository. As will be discussed in more detail below with respect to FIGS. 32A and 32B, a browser plug-in or other client application may enable communication between the third-party repository and the on-demand database service. By way of an example, such communication may facilitate publication of an external content object to a social layer (e.g., information feed) of the on-demand database service from the third-party repository. The information data identifying the content object may be automatically generated by pulling data from the third-party repository. Such data can be provided in a persistent object corresponding to the content object and stored in a database of the on-demand database service.

In some implementations, identification of the third-party repository can be independently specified through an API. FIG. 25 shows an example of a user interface for identifying an external data source to access. The external data source can be a website hosting content. A user interface 2500 can provide an API 2501 for defining the location of the server on which the external content object resides. In some implementations, the user can be a system administrator who can define as many data sources external to the on-demand database service as desired. The user can provide a Label 2502 for the external data source, which constitutes the name of the external data source to be displayed to users in the on-demand database service. The user can provide a Name 2503 for the external data source, which can refer to the internal name of the external data source. The user can further identify a Type 2504 for establishing the type of connection to access the external data source, which can be through a simple URL. Furthermore, the user can specify the server URL 2505 in which the external data source resides, and the user can select an icon 2506 to represent the external data source. Additionally, the user can choose the means of authenticating the user to the external data source by selecting the Identity Type 2507 (e.g., anonymous) and Authentication Protocol 2508 (e.g., no authentication).

FIG. 26 shows an example of a user interface for identifying an external content management data source to access. The external content management data source can be an on-premise content management data source. A user interface 2600 can provide an API 2601 for defining the location of the external content management data source. The user can provide a Label 2602 and a Name 2603 for the external content management data source. The user can further identify a Type 2604 for establishing the type of connection to access the external content management data source. As illustrated in the example in FIG. 26, the type of connection can be through a content hub and SharePoint connection. Furthermore, the user can specify the server URL 2605 in which the external content management data source resides. Additionally, the user can choose the means of authenticating the user to the external data repository by selecting the Identity Type 2607 (e.g., per user) and Authentication Protocol 2608 (e.g., basic authentication). Authentication can including providing the username 2609 and password 2610 credentials to authenticate from the on-demand database service or having the authentication occur at the external content management data source.

FIG. 27 shows an example of a settings page and details page for previously identified accessible external data sources. The details page 2710 displays a list of external objects 2711, such as a SharePoint external data source 2712. Selection of the SharePoint external data source 2712 can redirect the user to a settings page 2700 for the SharePoint external data source 2712. The settings page 2700 can display a Label 2702, a Name 2703, a Type 2704 of connection, and a server URL 2705 for the SharePoint external data source 2712 corresponding to some of the values provided in FIG. 26. The settings page 2700 can further display an Identity Type 2707, an Authentication Protocol 2708, and a username 2709 corresponding to values provided in FIG. 26. With respect to the user interfaces and pages in FIGS. 25-27, management of authorized connections with external data sources can be performed through a system administrator or other appropriate entity.

Returning to FIG. 16, at block 1608 of the method 1600, the information data identifying the content object is communicated to the content management data source through one or more middleware components. As described earlier, the one or more middleware components can include a collection of software components, API components, and other associated infrastructure that allows for integrated access of content stored in external data repositories with the on-demand database service. The one or more middleware components may be configured to instantiate connection between the on-demand database service and the content management data source. The one or more middleware components may be referred to as a content hub. In some implementations, communication of the information data identifying the content object to the content management data source may undergo a series of operations through the one or more middleware components as described earlier in Section XII.

At block 1612 of the method 1600, access is established by the one or more middleware components with the content object to retrieve data regarding the content object, as generally described above at block 1516 of the method 1500. In some implementations, access is established with the content object via the content object identifier. Upon gaining access, the data regarding the content object can be retrieved. In some implementations, the data regarding the content object can include metadata that can include but is not limited to a title, a source, an author, a description, a unique ID, a created date, a last modified timestamp, a file size, a URL, etc.

Figure 28:
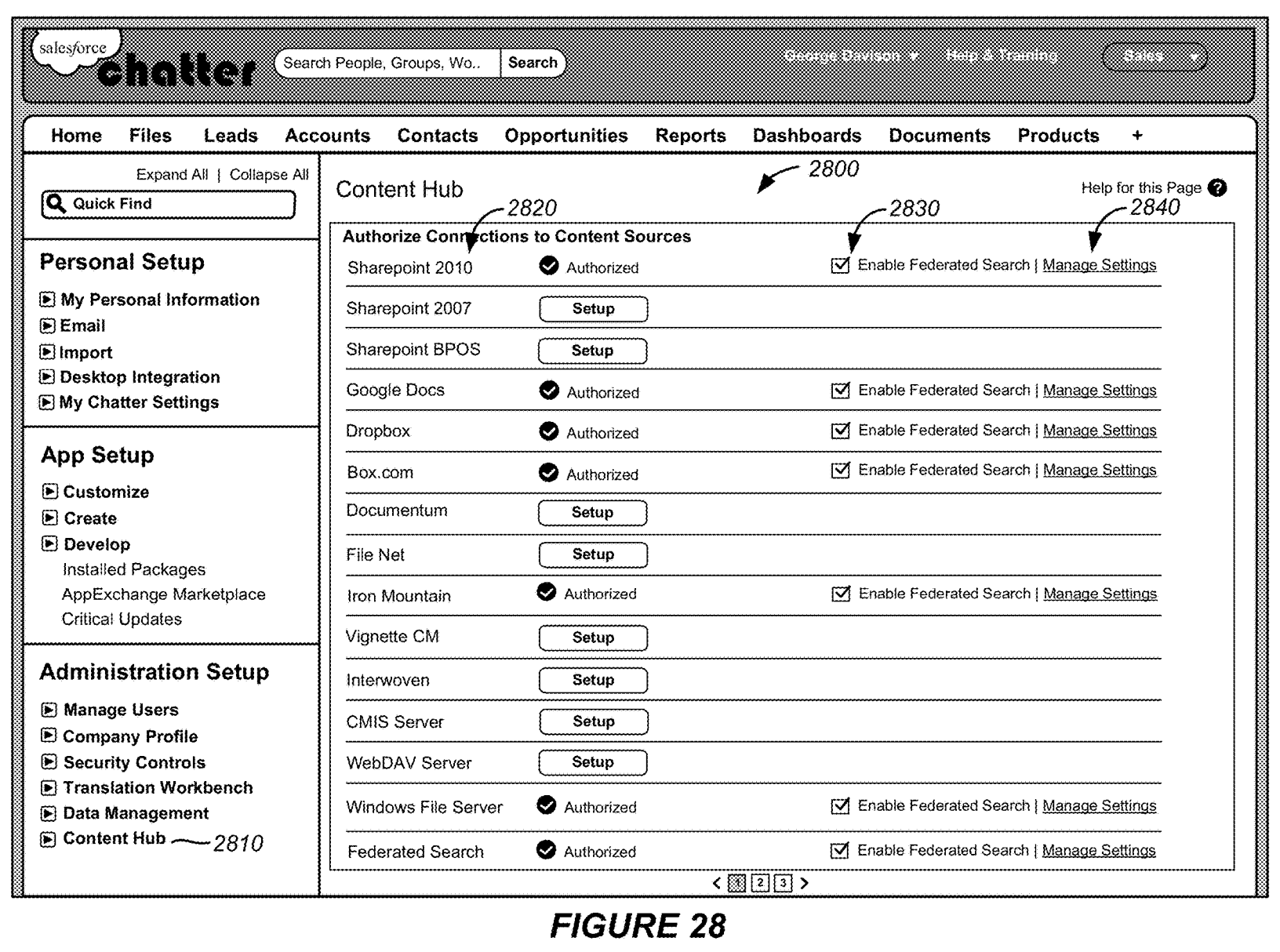

In some implementations, establishing access with the content object may necessitate authorizing the communication with the content management data source. A content hub can manage a list of authorized connections with connectors or connector servers of external data sources. FIG. 28 shows an example of a user interface for administering authorized connections to one or more external content management data sources. A user, such as a system administrator, can launch a content hub application 2810 to cause the user interface 2800 to display a list of external data sources 2820. The user can authorize which of the external data sources 2820 to establish a connection with. The user can check off whether to Enable Federated Search 2830 for the external data source and can also Manage Settings 2840 for the external data source.

By way of an example, a system administrator can receive an IP address of each new connector server and register it in the on-demand database service. That way, the content hub can avoid processing responses originating from an unknown connector server.

One example of a connection flow for registering a connector server can proceed as follows: a customer can provide a new remote connector server and install a customized connector for communicating with an external content management data source. An IP and OSPR token are generated and stored in a database of the on-demand database service. A client certificate can also be generated. The customer can provide proxy credentials for accessing the remote connector server. The customer can launch the connector for the remote connector server. A secure transport client communicates with a secure transport server via a transport layer security (TLS) tunnel such that the connector server can send an IP and OSPR token to the secure transport server. The secure transport server can validate that the values match the ones stored in the on-demand database service during installation and that the IP address is still active. The secure transport server registers the remote connector server node.

From the standpoint of a user, validation of an external data source may proceed by identifying external data sources from API 2601 in FIG. 26 or API 2701 in FIG. 27. When the external data source is validated, it may appear in a list of available external data sources that a user may authorize connection to as shown in the user interface 2800 in FIG. 28.

When the external data source is validated, the content hub can send requests along with the appropriate OSPR token from the on-demand database service to the target remote connector server node. The remote connector server node can process the requests and send responses back to the content hub.

In some implementations, a determination can be made that the user has permission to access the external data source. A user can be authenticated by providing a user's access credentials. Access credentials can include a username and password. Access credentials for authentication may be provided from an API 2601 in FIG. 26 or API 2701 in FIG. 27, for example. In some implementations, Open Authorization (OAuth) may provide secure credential management for API authorization. Access credentials may include an API key or an OAuth bearer token to allow the database of the on-demand database service to access and make changes to data regarding a content object in a content management data source.

Figure 29:
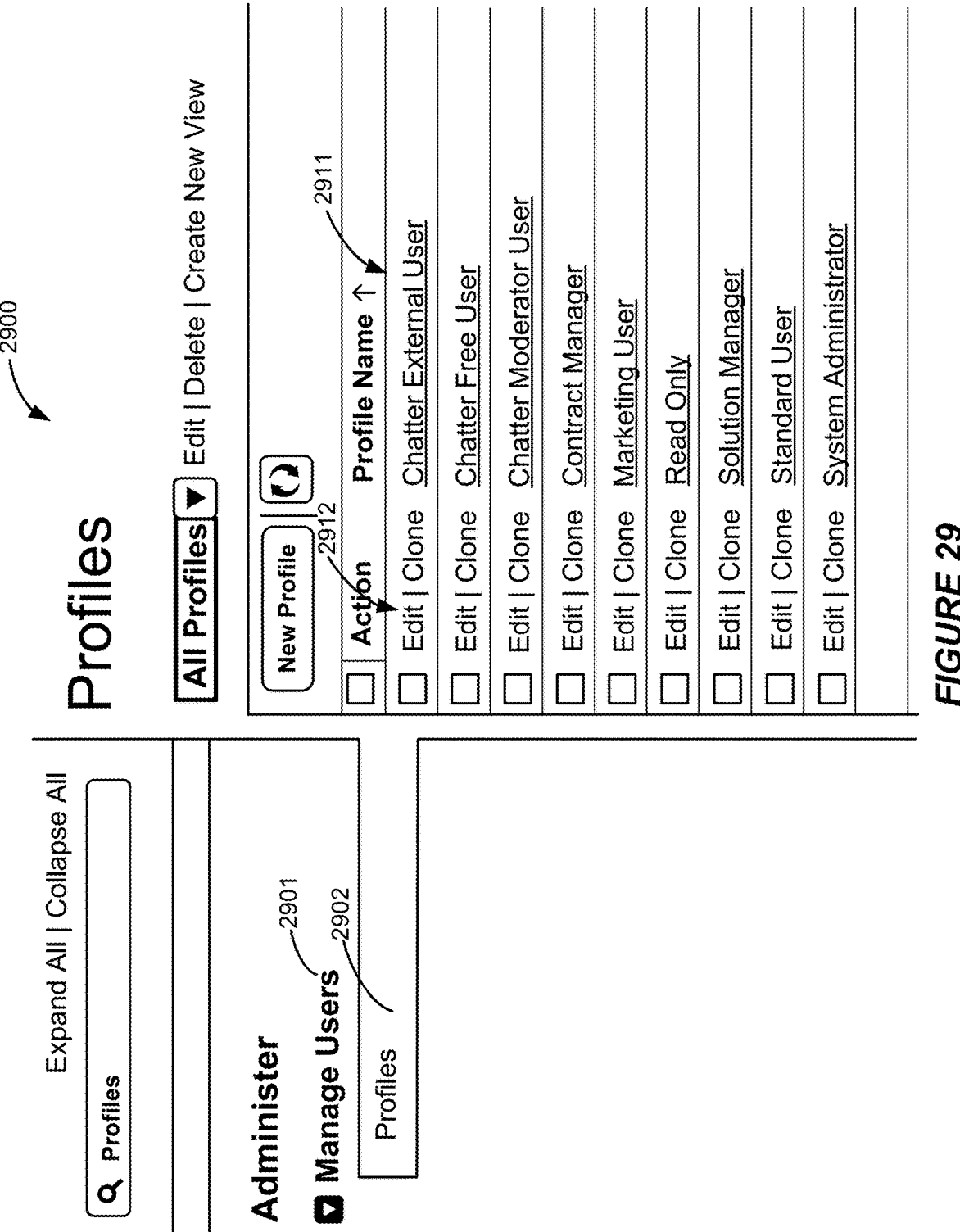
FIG. 29 shows an example of a user interface for administering the types of user accounts authorized to access one or more external data sources.

A system administrator can limit access to external data sources by enabling or disabling content hub to certain users. FIG. 29 shows an example of a user interface for administering the types of user accounts authorized to access one or more external data sources. The user interface 2900 includes a tab labeled Manage Users 2901 where the system administrator can select Profiles 2902. The system administrator can select from among a number of user accounts 2911, such as a Standard User. When the system administrator selects Edit 2912, a user interface for managing the permissions of the user account can be displayed. FIG. 30 shows an example of a user interface for administering the permissions of the user accounts in accessing the one or more external data sources. The user interface 3000 includes a number of checkboxes for managing permissions of the user account, including an Enable Content Hub 3001 checkbox. Once content hub is enabled to the user account, the system administrator can further determine which external data sources are exposed for access to the user account.

Returning to FIG. 16, at block 1616 of the method 1600, the data regarding the content object is stored in a persistent object in a database of the on-demand database service, where the persistent object represents the content object in the on-demand database service and includes the information data identifying the content object. In some implementations, the persistent object can have a database structure in the form of a table with various data fields logically arranged as columns. For example, the persistent object can represent a content folder including a plurality of content files, where each row can represent a content file and the columns can represent metadata. Alternatively, the persistent object can be represented as a single row in a larger database table. For example, the row can represent a content file and the columns in the database table can represent metadata, including but not limited to a title, a description, a source, a unique ID, an author, a created date, a date modified, and a URL. A persistent object in the database table may provide at least some values for the one or more data fields, though some of the data fields may be left blank.

In some implementations, the persistent object does not store actual content (e.g., blob) of a content object, but the persistent object can act and behave like a content object (e.g., record). For example, the persistent object can provide persistent representation of the corresponding content object by including a pointer (e.g., URL) to the actual content of the content object. The persistent object can have a data structure like any other content object that may be native to the on-demand database service. In other words, the persistent object can behave and function like a record in the on-demand database service. The difference is that the persistent object may include different data fields from a record, including data identifying the content object and an indicator that the content object is external. By way of an example, the persistent object in the database can indicate that there's an external SharePoint document with a unique ID of 123456789 and located on the SharePoint server at www.office.microsoft.com/sharepoint/123456789.doc. The persistent object may also include data such as a file's name, creation date, owner, and other metadata. In some instances, the persistent object can store an access-controlled preview of the content object. The persistent object can maintain a persistent relationship with the content object in the database of the on-demand database service, regardless of changes made or interactions performed in the external data source.

Without necessarily replicating the content object or causing the content object to leave its original source, the persistent object can enable users to interact with third-party content in a social collaborative context by performing various operations through the persistent object. The persistent object can serve as an interface between content stored in external content objects and functionality provided in an on-demand database service. For example, the persistent object may be generated to display in a user interface of display device as a selectable component.

At block 1620 of the method 1600, a selectable component for the persistent object is provided to a display device operable to display the selectable component in a user interface for the on-demand database service. In some implementations, the selectable component for the persistent object includes a copy of the content object. In some implementations, the selectable component for the persistent object includes a URL or content object ID of the content object. The selectable component can serve as a hyperlink to take an entity directly to the URL or content object ID of the content object. The selectable component can include but is not limited to an icon, a button, a link, a reference, or a string of characters. Selection of the selectable component can initiate an action, such as opening the content object via the URL or content object ID, downloading the content object via the URL or content object ID, and opening a detailed information page view regarding the persistent object.

In some implementations, the selectable component may be provided in a social layer of the on-demand database service, such as a group, a record, an organization, a content management files list, an information feed, or a user profile. The social layer may be accessible to a plurality of users in the on-demand database service. This provides an interface for sharing and collaboration of external content through the persistent object. Users can access, share, search, index, comment, like, recommend, edit, update, delete, and otherwise interact with the persistent object as if the persistent object were any other record in the on-demand database service. In one example, a user can publish the persistent object from SharePoint to a Chatter® feed, as will be discussed in more detail with respect to FIGS. 32A and 32B. In another example, a user can publish the persistent object from Chatter® and into a Chatter® feed.

In some implementations, one or more graphical representations regarding the content object are exposed for display in the user interface by the display device, where the exposed graphical representations depend at least in part on the data source. The one or more graphical representations can accompany the selectable component in the user interface. The one or more graphical representations can be displayed in the form of GUI buttons, links, tabs, channels, icons, images, animations, menus, string of characters, and the like.

What is exposed in the user interface can depend on the source of the content object. If the source of the content object is Dropbox, a graphical representation can indicate such information by showing an icon representing Dropbox. The persistent object as rendered in the user interface can present both (1) a selectable component directing a user to a content object via a URL or unique content object ID and (2) one or more graphical representations that are "polymorphic." What this means is that the persistent object can identify its source and render different information or representations of information depending on its identified source in the user interface.

In some implementations, the one or more graphical representations can include metadata, where metadata is rendered depending on the identified source of the content object. Metadata can include but is not limited to at least one of a title, a source, a file size, an author, a created date, a last modified timestamp, etc. Thus, what metadata is exposed regarding the content object can depend on the identified source of the content object.

In some implementations, the one or more graphical representations can include one or more actionable selections configured to interact with the content object. Once the source of the content object is identified, the one or more graphical representations can provide different capabilities and functions depending on the source of the content object without actually retrieving the content object from the source itself. By way of an example, if a link to a SharePoint document is provided in the user interface, an actionable selection can accompany the link to allow a user to "Check In" or "Check Out" the SharePoint document. In another example, if a link to an EverNote file is provided in the user interface, an actionable selection can accompany the link to allow a user to author directly into the EverNote file within a preview window. In some implementations, interactions via the actionable selections are made to the persistent object and subsequently written to the corresponding content object.

Figure 31:
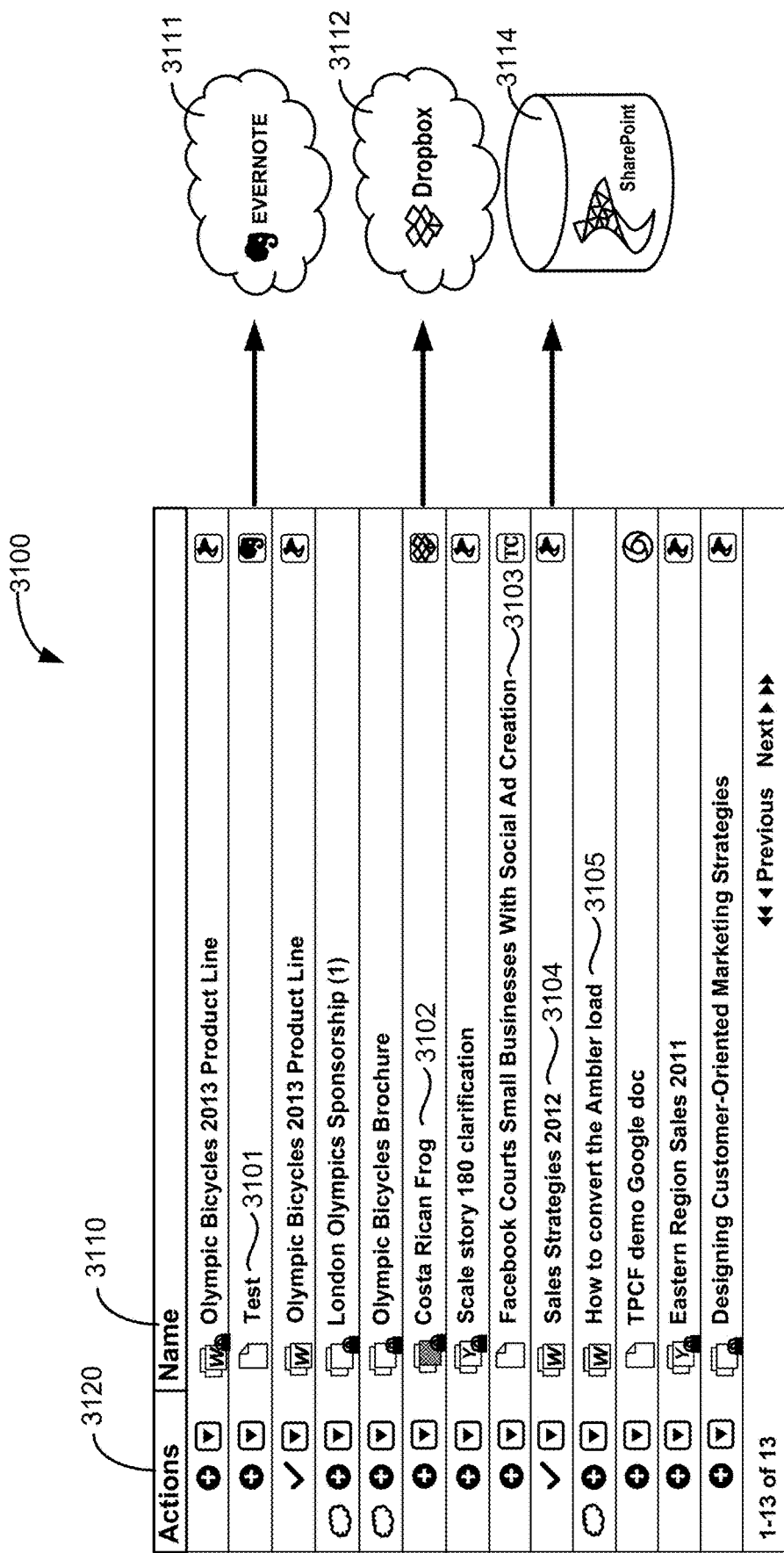
FIG. 31 shows an example of a user interface including a plurality of references to persistent objects for content stored in a plurality of external data sources.

FIG. 31 shows an example of a user interface including a plurality of selectable components for persistent objects for content stored in a plurality of external data sources. A user interface 3100 can display a plurality of files in a single portal regardless of whether the files are external to a database or the files are native to the database. Hence, a user can be provided with unified access to all their files located across many different data sources, allowing access to both third-party content files and native content files using the on-demand database service.

In FIG. 31, the user interface 3100 can include a plurality of files organized under Name 3110 and accompanied with Actions 3120. Under Name 3110, each of the files can include a title identifying a name for the file. Each of the files can include a first icon to the left of its name identifying the type of file, such as a Microsoft Word document, a Microsoft Excel spreadsheet, a JPEG image, etc. In some implementations, the first icon may include a lock symbol to indicate that the file has restrictions for access. Each of the files can also include a second icon to the right of its name identifying the source of the file, such as EverNote, Dropbox, SharePoint, etc. An EverNote file 3101 named "Test" can display an EverNote icon 3111, a JPEG image 3102 named "Costa Rican Frog" can display a Dropbox icon 3112, and a Microsoft Word document file 3104 named "Sales Strategies 2012" can display a SharePoint icon 3114. Each of the icons 3111, 3112, and 3114 can be rendered into the user interface 3100 upon identification of the source of the external file. The rendering of the icons 3111, 3112, and 3114 may be independent of user input. Some of the icons 3111, 3112, and 3114 may be generated from specifying an external data repository in an API. Some files may simply reference content stored on a website, such as a Tech Crunch article 3103 on www.techcrunch.com. Other files may reference content native to the on-demand database service, such as the Microsoft Word document file 3105 entitled "How to convert the Ambler load." Actions 3120 allow a user to initiate actions on the files, such as opening the file, downloading the file, or opening a detailed information page view regarding the file.

Figure 33:
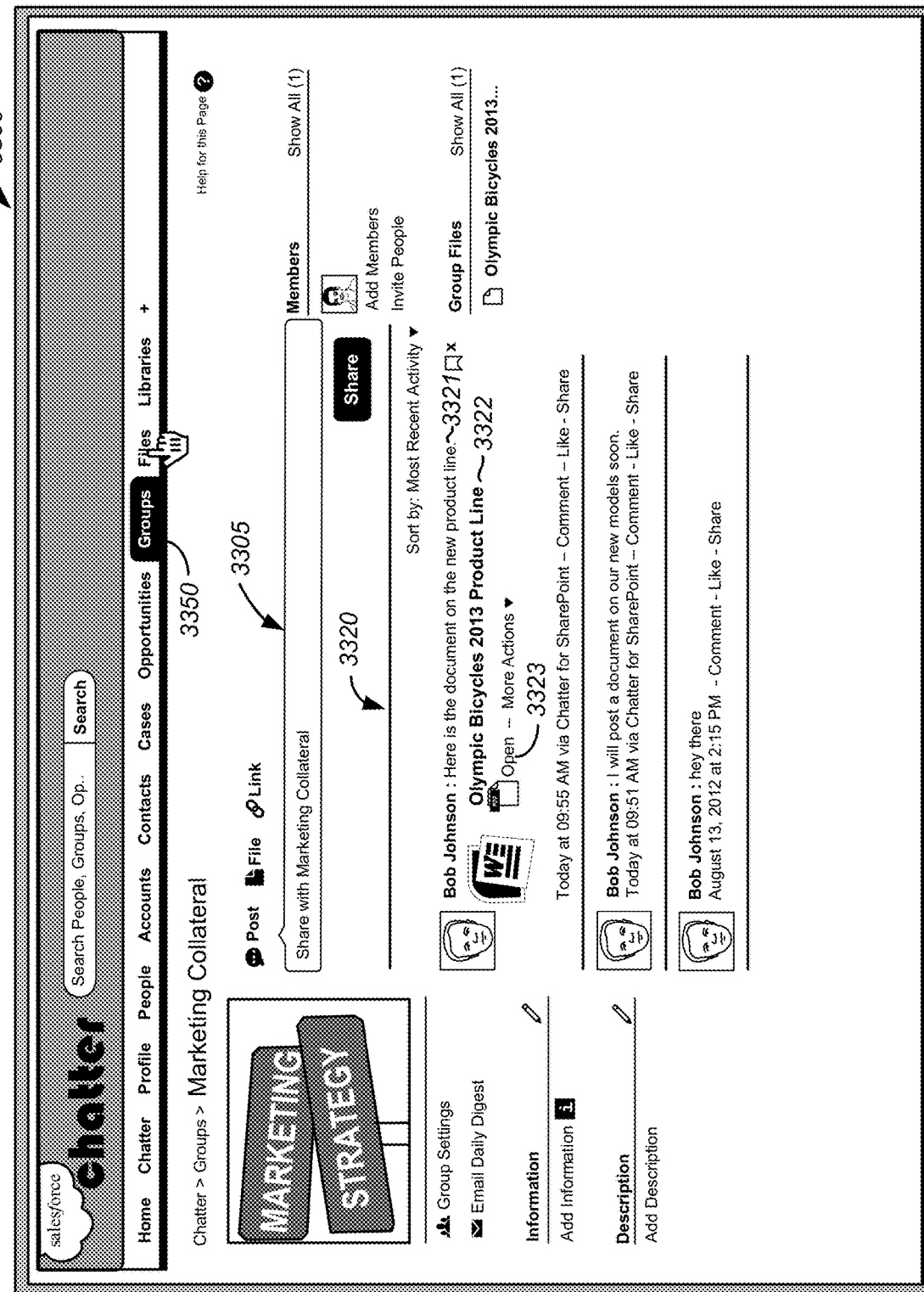
FIG. 33 shows an example of a user interface with the published feed item from FIG. 32B provided in an information feed of an on-demand database service.

In some implementations, providing the selectable component includes presenting the selectable component to a display device operable to display the selectable component in an information feed for the on-demand database service. FIG. 33 shows an example of a user interface with a published feed item having a reference to a persistent object in an information feed. In FIG. 33, a user interface 3300 can be displayed in an online social network for a group 3350. The user interface 3300 can include a publisher 3305 and an information feed 3320, where the publisher 3305 may be configured to publish information to the information feed 3320. The information feed 3320 can include a plurality of feed items related to the group 3350. A feed item 3321 can include a reference 3322, which can reference a persistent object corresponding to a Microsoft Word document entitled "Olympic Bicycles 2013 Product Line." The Microsoft Word document may be stored in an external data source, such as SharePoint. A user may initiate an action by clicking an actionable selection 3323. The action can open the content object via a URL or unique content object ID stored in the persistent object upon clicking the actionable selection 3323.

Figure 34:
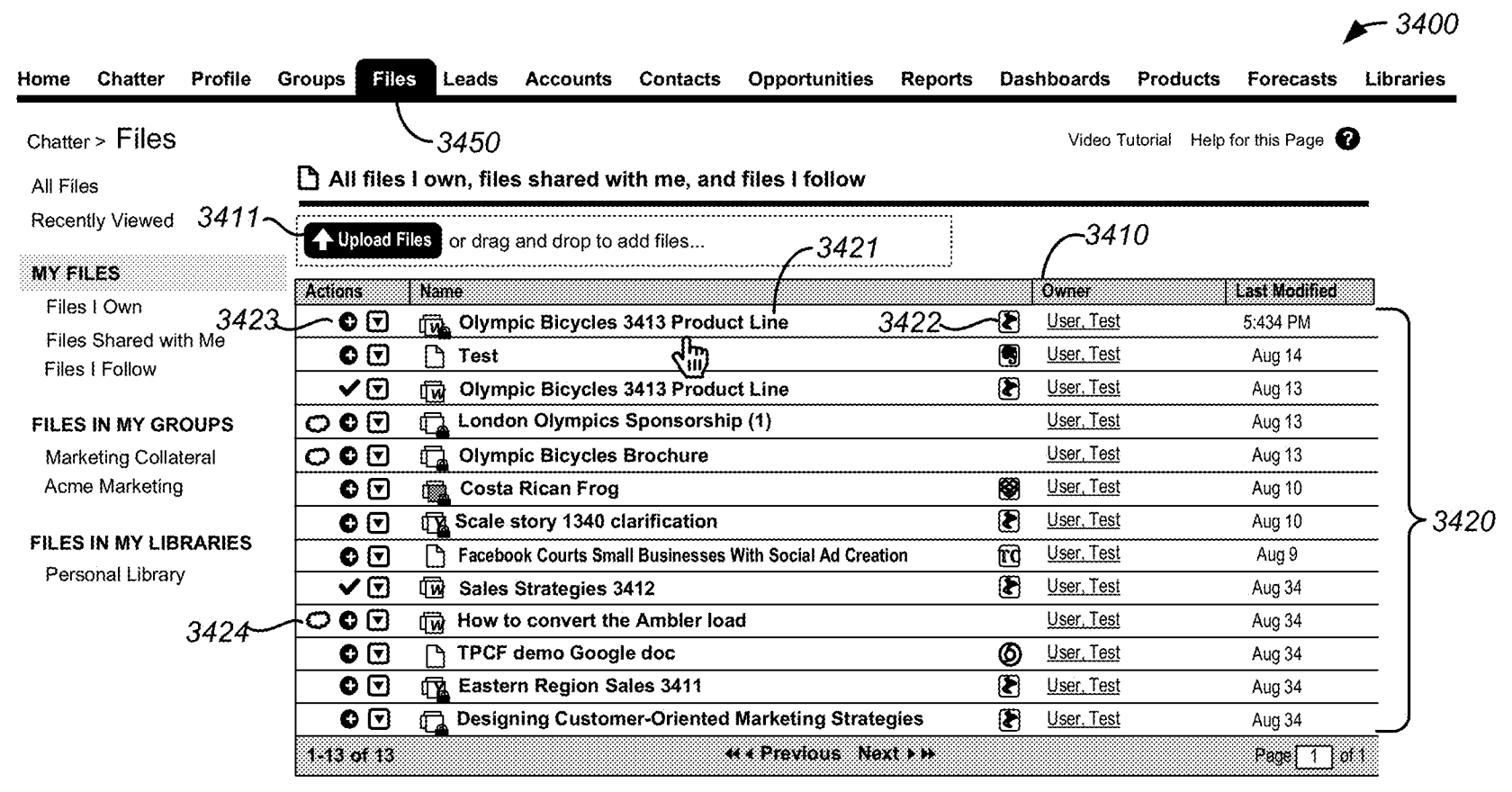

In some implementations, providing the selectable component includes presenting the selectable component for a display device operable to display the selectable component in a content management files list for the on-demand database service. FIG. 34 shows an example of a user interface of a content management files list presenting a reference to the persistent object. In FIG. 34, a user interface 3400 can be displayed for a files tab 3450. The files tab 3450 can include a content management files list 3410 that includes a plurality of files 3420. The plurality of files 3420 may be integrated across the on-demand database service for an entity, including native files and external files. Therefore, as shown in the example in FIG. 34, the content management files list 3410 can include one or more selectable components for persistent objects corresponding to external content objects as well as one or more selectable components for files stored in the database of the on-demand database service. A reference 3421 to a persistent object corresponding to a file stored in an external data repository can be displayed in the content management files list 3410. The reference 3421 may be accompanied with an icon 3422 indicating the source of the file, such as an icon for SharePoint. Other references in the plurality of files 3420 may have an icon 3424 indicating that the file is native to the on-demand database service. A user may initiate an action by clicking an actionable selection 3423, which may be configured to open the file, download the file, share the file, or open a detailed information page view regarding the file.

In some implementations, a search may be performed across the plurality of files 3420, each of the files representing content files stored across a plurality of content management data sources. The search may provide federated search results in a user interface of the display device.

In some implementations, the database of the on-demand database service may be synchronized with a storage medium of the display device, where the storage medium includes a plurality of native files. The database of the on-demand database service can be updated to include the plurality of native files. In some implementations, a user may upload one or more native files from the storage medium of the display device. Accordingly, the plurality of files 3420 can include both native files and content files stored across a plurality of external content management data sources.

In some implementations, a user input may select the selectable component in the method 1600. The user input may be transmitted to the computing device as a signal to initiate an action with respect to the content object. The signal can include instructions requesting access to the content object in the external data source, where the request can include a URL or a unique content object ID. The URL or unique content object ID may be taken from the persistent object when the selectable component is selected. The action can then initiate opening, sharing, or downloading the content object from the external data source to be delivered to the user.

Even when the user requests access to an external content object to interact with the external content object, the external content object may continue to remain in its original source. In some instances, the external content object may not get copied and duplicated into the database of the on-demand database service. Furthermore, security and access permissions may be controlled by the original source. When a user is taken to the content object for access, authentication can occur at the source of the content object.

Figure 35:
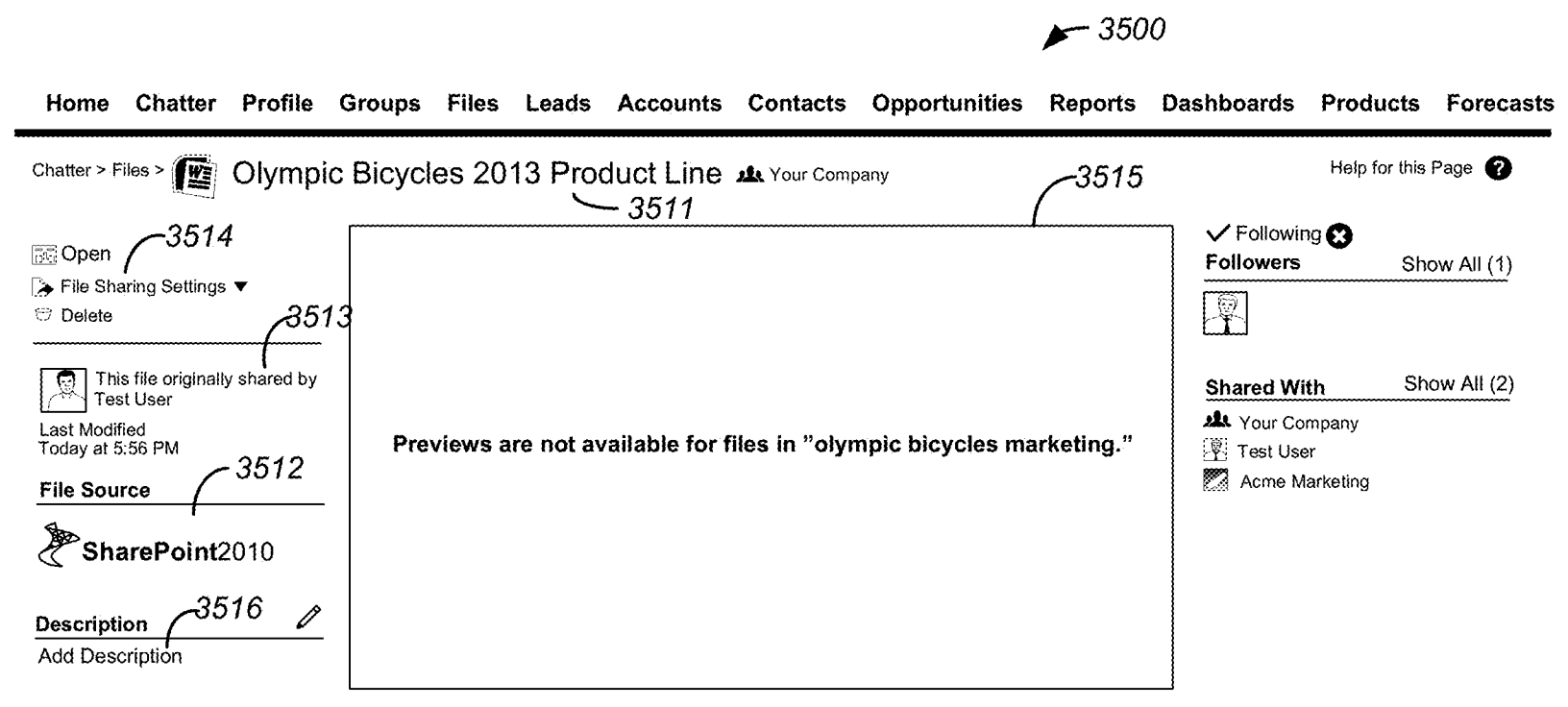

In some implementations, the user input selecting the selectable component can initiate an action to open a detailed information page regarding the persistent object corresponding to the external content object. Different information and capabilities can be displayed in the detailed information page depending on the source of the content object. FIG. 35 shows an example of a user interface including a detailed information page displaying data regarding a persistent object. A user interface 3500 for a detailed information page includes a title or reference 3511 to the persistent object corresponding to the content object, and a source 3512 of the content object. The user interface 3500 can further include additional metadata 3513 regarding the persistent object. This can include when the persistent object was originally shared, by whom the persistent object was originally shared, and when the persistent object was last modified. In addition, the user interface 3500 can include capabilities 3514 for interacting with the external content object via the persistent object, such as opening the content object from the external data source, deleting the content object, and editing file sharing settings. In some implementations, a preview window 3515 may display a preview of the content object. However, previews may be unavailable for content objects stored in external content repositories, such as when the user does not have permission to access the external content repository. The user interface 3500 can also include a description 3516, which can be added by a user input to the persistent object corresponding to the content object. In some implementations, changes to data regarding the persistent object can be written to the corresponding content object. Accordingly, a description provided from a SharePoint document can be updated by a user using the on-demand database service, and the updates can be subsequently saved to SharePoint.

Figure 32A:
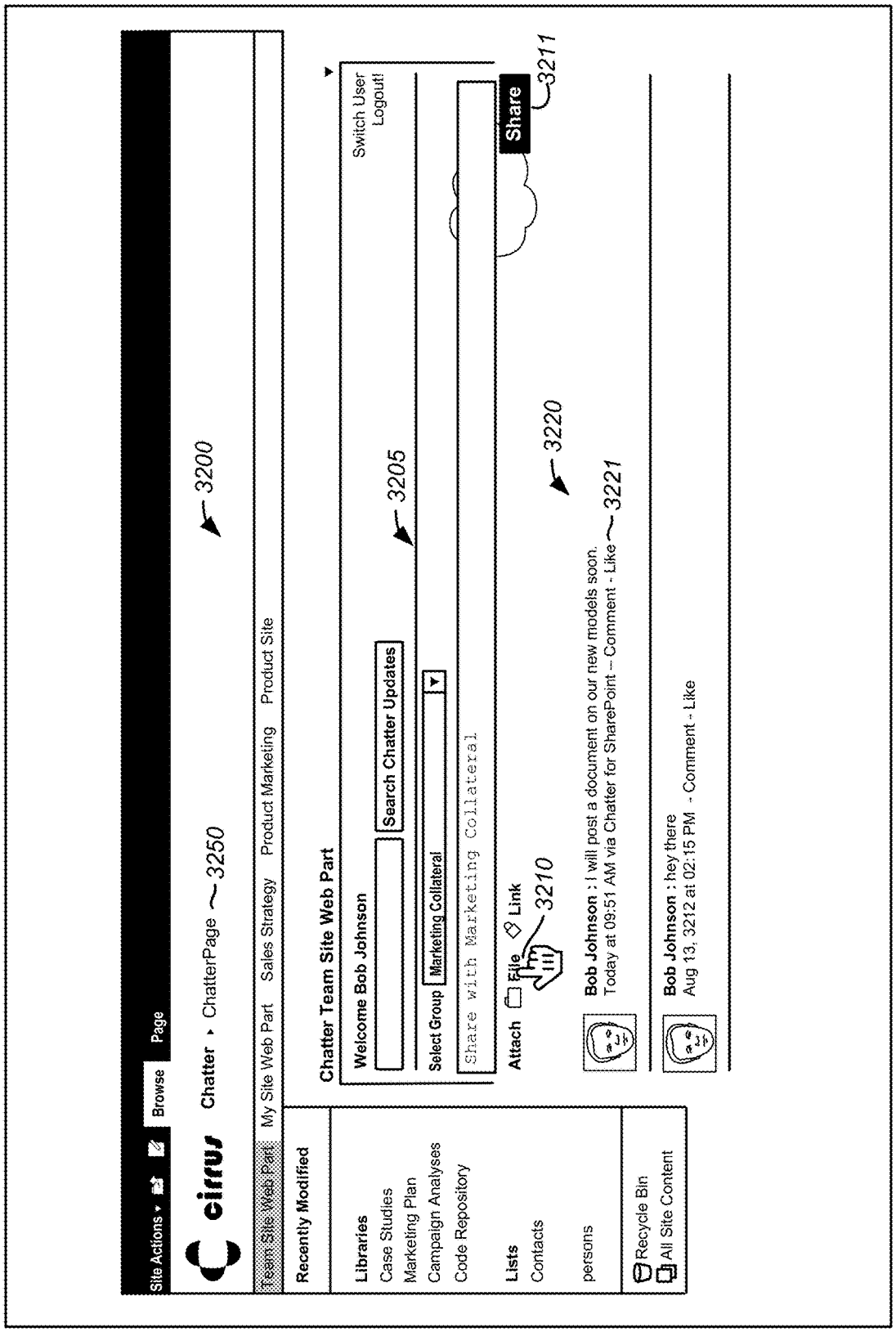
FIG. 32A shows an example of a user interface for accessing an external content management data source with a plug-in for publishing to an on-demand database service.

FIGS. 32A-35 show various stages and aspects of providing and propagating a selectable component for a persistent object to various social layers of an on-demand database service, where the persistent object represents an external content object. FIGS. 32A and 32B show that the selectable component for the persistent object can be provided from the external data source into the social layer. For example, a plug-in, webpart, or other client application can be provided in the external data source to facilitate access to the on-demand database service. FIGS. 33 and 34 show that the reference to the persistent object can be propagated in an information feed as well as a content management files list. FIG. 35 shows an example of a detailed information page of data regarding the persistent object upon opening the reference.

FIG. 32A shows an example of a user interface for accessing an external content management data source with a plug-in for publishing to an on-demand database service. The external content source can have an API for exposing a social media page of the on-demand database service. The API can include a browser plug-in that facilitates communication between a third-party page and the browser page. Here, a SharePoint site exposes a Chatter page with a Chatter feed, allowing access to a salesforce.com site from SharePoint.

In FIG. 32A, a user interface 3200 includes a Chatter Page 3250 having a publisher 3205 and an information feed 3220. The publisher 3205 can be configured to publish information to the information feed 3220. The information feed 3220 can include one or more feed items 3221 providing updates to the information feed 3220. A user can choose to attach a file 3210 in the publisher 3205 to publish into the information feed 3220. The user can choose from a plurality of files stored in the SharePoint content management data source.

Figure 32B:
FIG. 32B shows an example of the user interface of FIG. 32A updated to include a published feed item having a reference to a content object stored in the external content management data source.

FIG. 32B shows an example of a user interface of FIG. 32A updated to include a published feed item having a reference corresponding to a content object stored in the external content management data source. After a user selects a file stored in the SharePoint content management data source, the user can select Share 3211 in the publisher 3205 to provide a reference 3222 in a feed item 3221 of the information feed 3220. The feed item 3221 can also include a message accompanying the reference as well as a timestamp of the posted feed item 3221. Users can also have the option to comment and/or like the feed item 3221.

FIG. 33 shows an example of a user interface with the published feed item from FIG. 32B provided in an information feed of an on-demand database service. A user interface 3300 includes a Group page 3350 that mirrors the Chatter page 3250 in FIGS. 32A and 32B. The Group page 3350 includes a publisher 3350 and an information feed 3320, where the information feed 3320 includes a feed item 3321 having a reference 3322 corresponding to the file stored in the SharePoint content management data source. The reference 3322 may be to a persistent object stored in a database of the on-demand database service. While the persistent object behaves as a record in the database of the on-demand database service, the persistent object may not be the external content object or a copy of the external content object itself. The persistent object may not be synchronized with the external content object. Rather, the persistent object corresponds to the external content object and includes a URL or unique content object ID of the external content object. A user can access the external content object through the persistent object while having the external content object remain in its original data source. In FIG. 33, the user can click an actionable selection 3323 to open or otherwise initiate an action to interact with the external content object through the persistent object.

FIG. 34 shows an example of an example of a user interface displaying a content files list including the reference to the content object stored in the external content management data source from FIG. 32B. A user interface 3400 includes a content management files list 3410 displaying a plurality of files 3420. The plurality of files 3420 can include a reference 3421 corresponding to the file stored in the SharePoint content management data source. Like the reference 3322 in FIG. 33, the reference 3421 is to the persistent object in the database of the on-demand database system. When the reference 3322 is provided in a social layer of the on-demand database service, the reference 3322 can be shared and propagated into other social layers of the on-demand database service, such as the content management files list 3410. In the content management files list 3410, the reference 3421 is provided alongside files that are native to the on-demand database service and other references that correspond to other external content objects. The files and references can be ones that are owned by the user, shared with the user, and followed by the user. The files and references can be indexed and searchable within the database. Therefore, the persistent object represented by the reference 3421 can be indexed and searchable alongside other objects stored in the database. The user can upload additional files into the content management files list 3410 by selecting an Upload Files button 3411 or by dragging files directly into the user interface 3400.

FIG. 35 shows an example of a user interface including a detailed information page displaying data regarding a persistent object representing the content object stored in the external content management data source from FIG. 32B. A user interface 3500 includes a detailed information page view of a title or reference 3511 corresponding to the external content object. A user may initiate an action to open the detailed information page view of the reference 3511 by clicking on the reference 3322 in FIG. 33 or the reference 3421 in FIG. 34. The detailed information page view can include metadata 3512, 3513, and 3516 regarding the persistent object, where the metadata can relate to the external content object or retrieved from the external content object. The detailed information page view can also include capabilities 3514 for interacting with the external content object via the persistent object.

XIV. Interacting with External Content

The information data identifying the content object stored in the persistent object can be used to gain access to and interact with the external content object. Using the framework provided by the content hub, users in an on-demand database service may have complex social interaction related to external content objects. For example, external content files may be shared conveniently and seamlessly via persistent objects. Users may take advantage of the viral nature of social networking to quickly collaborate on content files, whether external or native to the on-demand database service. At the same time, permissions for accessing and updating the content files may be enforced. This can retain the security of files stored within external content management data sources and also advance the privacy needs of the organization to which the on-demand database service relates.

Figure 17:
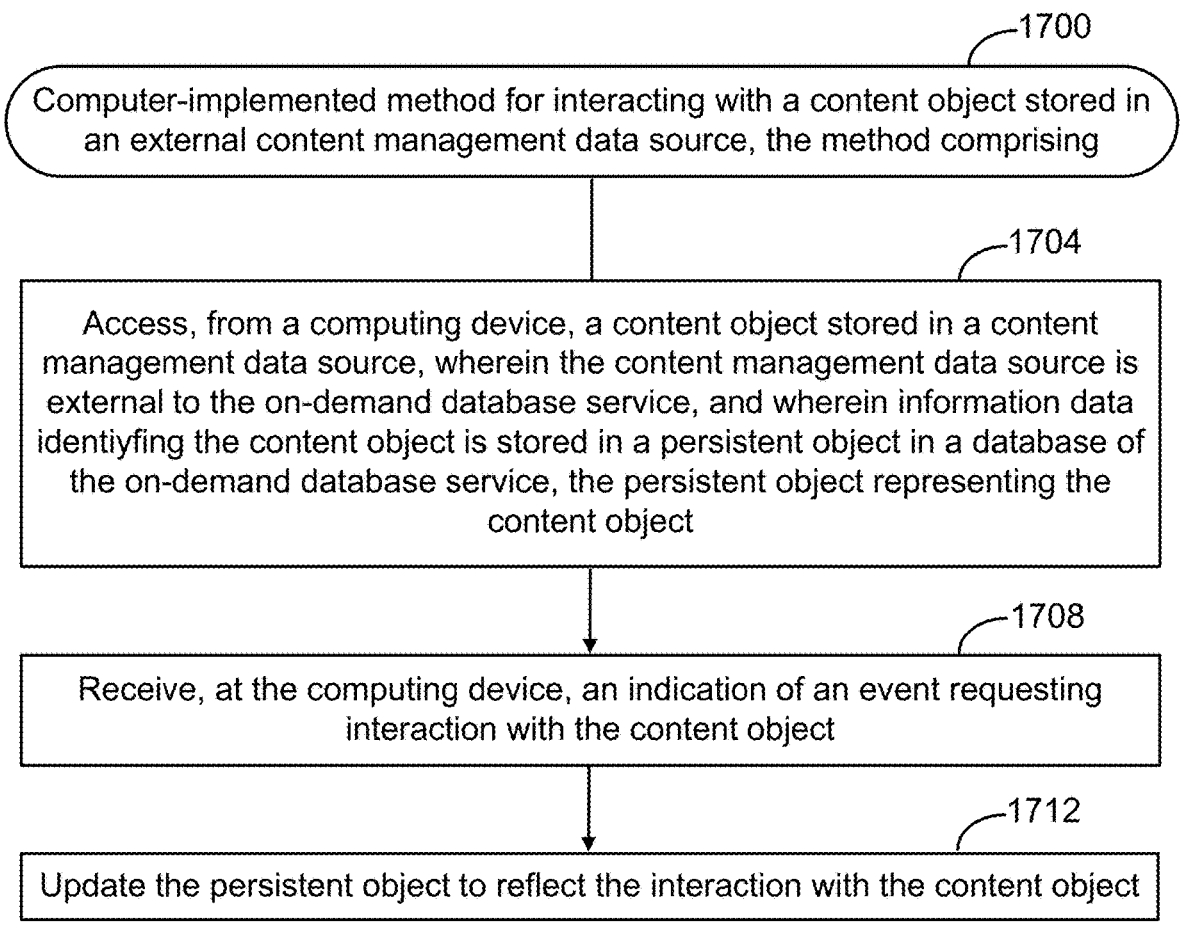
FIG. 17 shows a flowchart of an example of a computer-implemented method 1700 for interacting with a content object stored in an external content management data source, performed in accordance with some implementations.

FIG. 17 shows a flowchart of an example of a computer-implemented method 1700 for interacting with a content object stored in an external content management data source, performed in accordance with some implementations. The method 1700 may be described with reference to some examples illustrated in FIGS. 36-39C.

At block 1704 of the method 1700, a content object stored in a content management data source can be accessed at a computing device, where the content management data source is external to the on-demand database service, and where information data identifying the content object is stored in a persistent object in a database of the on-demand database service, the persistent object representing the content object. In some instances, block 1704 may be generally described with respect to some or all of blocks 1604, 1608, and 1612 of the method 1600.

In some implementations, to access the content object, the method 1700 can further include sending a content object identifier to the content management data source, where the content object identifier is retrieved from the persistent object. The method 1700 can further include identifying the content object via the content object identifier and establishing read/write access with the content object. One or more middleware components can facilitate such communication between the persistent object in the on-demand database service and the content object stored in the external content management data source, as described earlier.

At block 1708 of the method 1700, an indication of an event requesting interaction with the content object is received at the computing device. In some implementations, the event includes a request to modify the content object from the on-demand database service. In other implementations, the event includes a notification of a modification of the content object from the content management data source. In other words, a modification to the external content object can originate from the source of the content object or from the on-demand database service.

In implementations where the event includes a request to modify the content object from the on-demand database service, the request may be caused by actions or a sequence of actions performed in the on-demand database service. The actions may be initiated by a user input action originating from one or more social layers in the on-demand database service. In the one or more social layers, a selectable component for the persistent object may be provided, where the selectable component can serve as a copy of the external content object or as a link to the external content object. The selectable component may be provided in a social layer when a display device accesses the on-demand database service. The social layer may be accessible to a plurality of users in the on-demand database service. The social layer can include but is not limited to a group, a record, an organization, a content management files list, an information feed, a user profile, or other webpage of the on-demand database service.

Providing the selectable component for the persistent object in a social layer can facilitate access to, collaboration on, and distribution of content within a social networking framework. The content may include external content files capable of being viewed on the display device. For instance, the external content files can include word processing documents, video files, audio files, databases, and other such files.

When the persistent object is created for representing an external content object and stored in the database of the on-demand database service, one or more operations may be performed for providing and/or retrieving data regarding the external content object. Such data can include metadata so that the persistent object can be assigned a name, a type, a creation date, an owner, and other metadata. A virtual object may be temporarily created and stored to not only facilitate retrieval of data regarding the external content object but to also facilitate interaction with the external content object. As the virtual object can instantiate connection between the on-demand database service and the content object, a user can interact with the content object through the virtual object. In essence, the virtual object is a temporary object that allows interactions to be appropriately mapped and translated between the external content object and the on-demand database service, whereas the persistent object is a persistent representation of the external content object rendered in the on-demand database service.

In some implementations, more than one file object may be associated with the persistent object. In one example, the persistent object can include more than one version of a file object. In another example, the persistent object can be split into different file object portions, such as a file object having portions corresponding to different pages or sections in a document. In yet another example, the persistent object can represent a folder including a plurality of file objects.

In some implementations, the persistent object may be shared. Sharing the persistent object may refer to establishing a permission configuration specifying the type of access allowed for various users and groups. For instance, users and groups may be permitted to view, edit, comment on, share, publish, or perform various other operations relating to the persistent object.

In some implementations, the content object is collaborated on through the persistent object. Collaborating on the content object may include providing the persistent object to users or groups in accordance with certain sharing permissions. When a request to access the content object is detected, a determination can be made as to whether the access request complies with the sharing permissions.

Various operations related to the persistent object may be permitted depending on the sharing permissions. These operations can include, but are not limited to, the following operations: comments regarding the persistent object, edits to the content object corresponding to the persistent object, creation of a new content object corresponding to an existing or new persistent object, sharing the persistent object with additional users or groups, and initiating new conversations regarding the persistent object.

In some implementations, the persistent object is published or distributed as a selectable component. The persistent object may be made available for consumption by a broader audience of users or groups. For example, the persistent object may be published in a digital library or posted on a webpage.

Other operations can be performed on a persistent object. A persistent object can be archived or deleted. A persistent object can be followed. A persistent object can be searched for. A persistent object can be analyzed, sorted, filtered, or otherwise processed. Some of these operations are discussed in more detail below.

Figure 36:
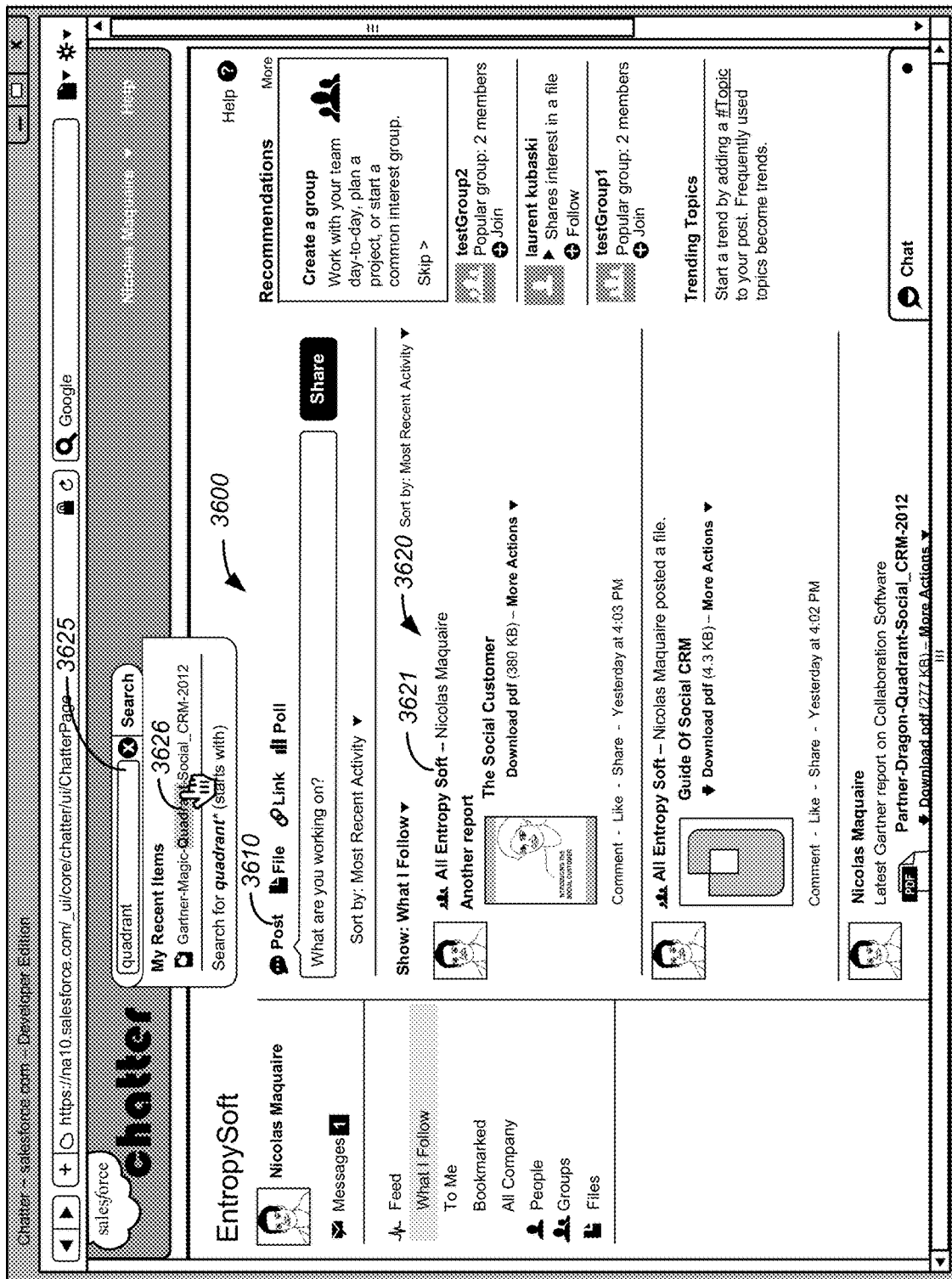
FIG. 36 shows an example of a user interface including a search component for searching through one or more databases in an on-demand database service.

FIG. 36 shows an example of a user interface including a search component for searching through one or more databases in an on-demand database service. A user interface 3600 includes a publisher 3610 configured to publish information to an information feed 3620. The information feed 3620 can include one or more feed items 3621. In addition, the user interface 3600 includes a search toolbar or component 3625 for searching across one or more databases in the on-demand database service. The search component 3625 can include a user input value 3626, where the user input value 3626 may include a string of characters that is contained in or similarly matching a string of characters corresponding to a persistent object. As shown in the example in FIG. 36, a user input value 3626 of "quadrant" can generate items such as a file that includes the search query.

Figure 37:
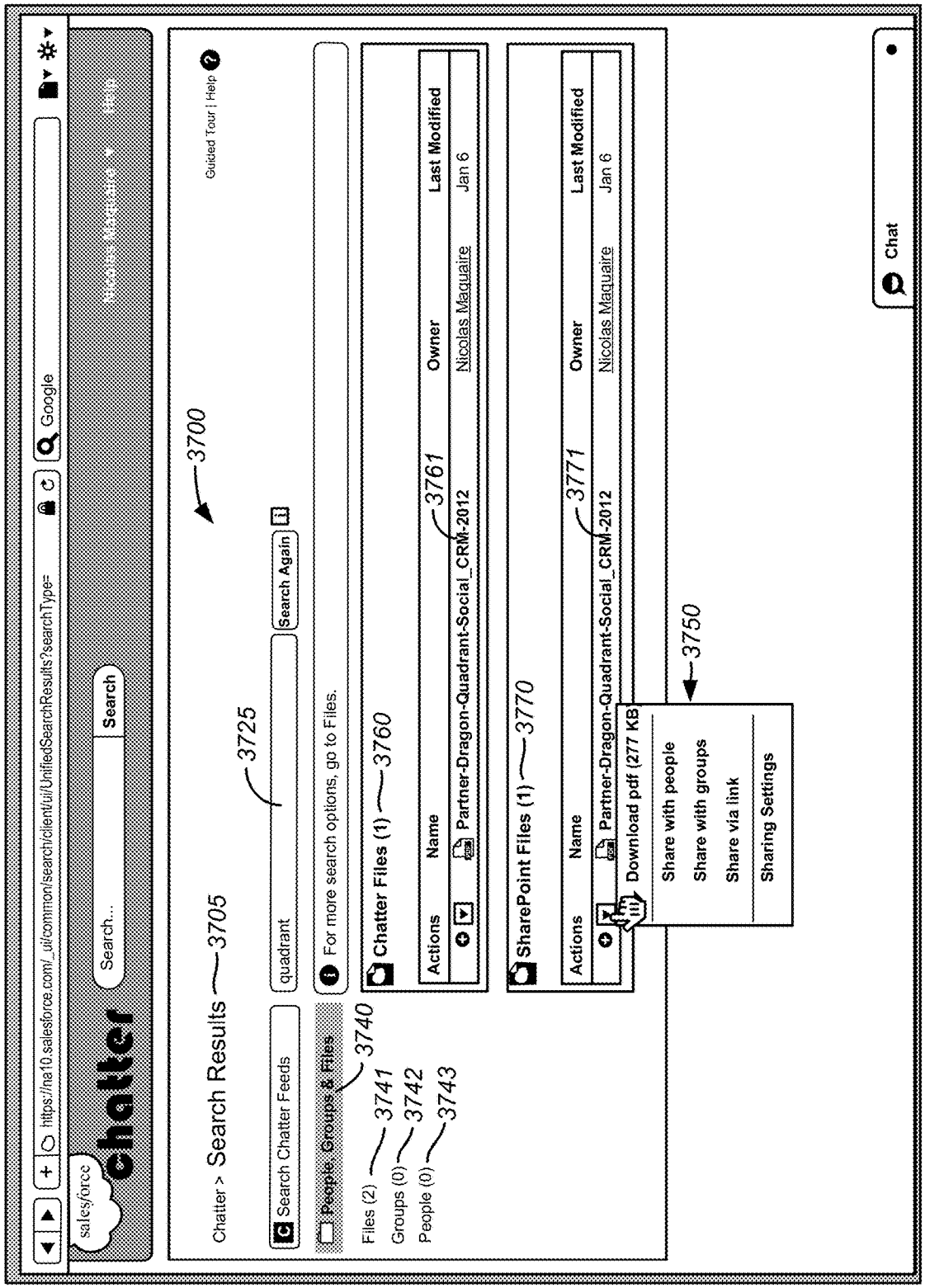
FIG. 37 shows an example of a user interface providing search results including native files and external content files in the on-demand database service.

FIG. 37 shows an example of a user interface providing search results including native files and external content files in the on-demand database service. The user interface 3700 can be generated in response to the search query performed in FIG. 36. Search results 3705 may be provided in the user interface 3700 showing federated search results generated in response to a search query 3725. A People, Group, & Files tab 3740 may summarize the files, groups, and people that contain or is similar to the search query 3725. In the example in FIG. 37, Files 3741 show two files, Groups 3742 show zero groups, and People 3743 show zero people as provided in the search results 3705. The federated search results 3705 can display native Chatter Files 3760 and external SharePoint Files 3770. A file 3761 is shown under Chatter Files 3760 and another file 3771 is shown under SharePoint Files 3770. A user may perform an action on any of the files 3761 or 3771. As illustrated in the example in FIG. 37, a user may cause an overlay window 3750 to appear in the user interface 3700 with respect to file 3771. The user may download the pdf, share with people, share with groups, share via link, or edit sharing settings from the overlay window 3750 with respect to file 3771.

When a plurality of external content objects are accessed in a content management data source, the content objects may be represented as persistent objects in the on-demand database service. A social layer, such as a content management files list in the on-demand database service, may provide a portal for users to navigate and search the plurality of external content objects from the on-demand database service. In some instances, the navigation and search can be performed across a plurality of content management data sources.

Figure 38A:
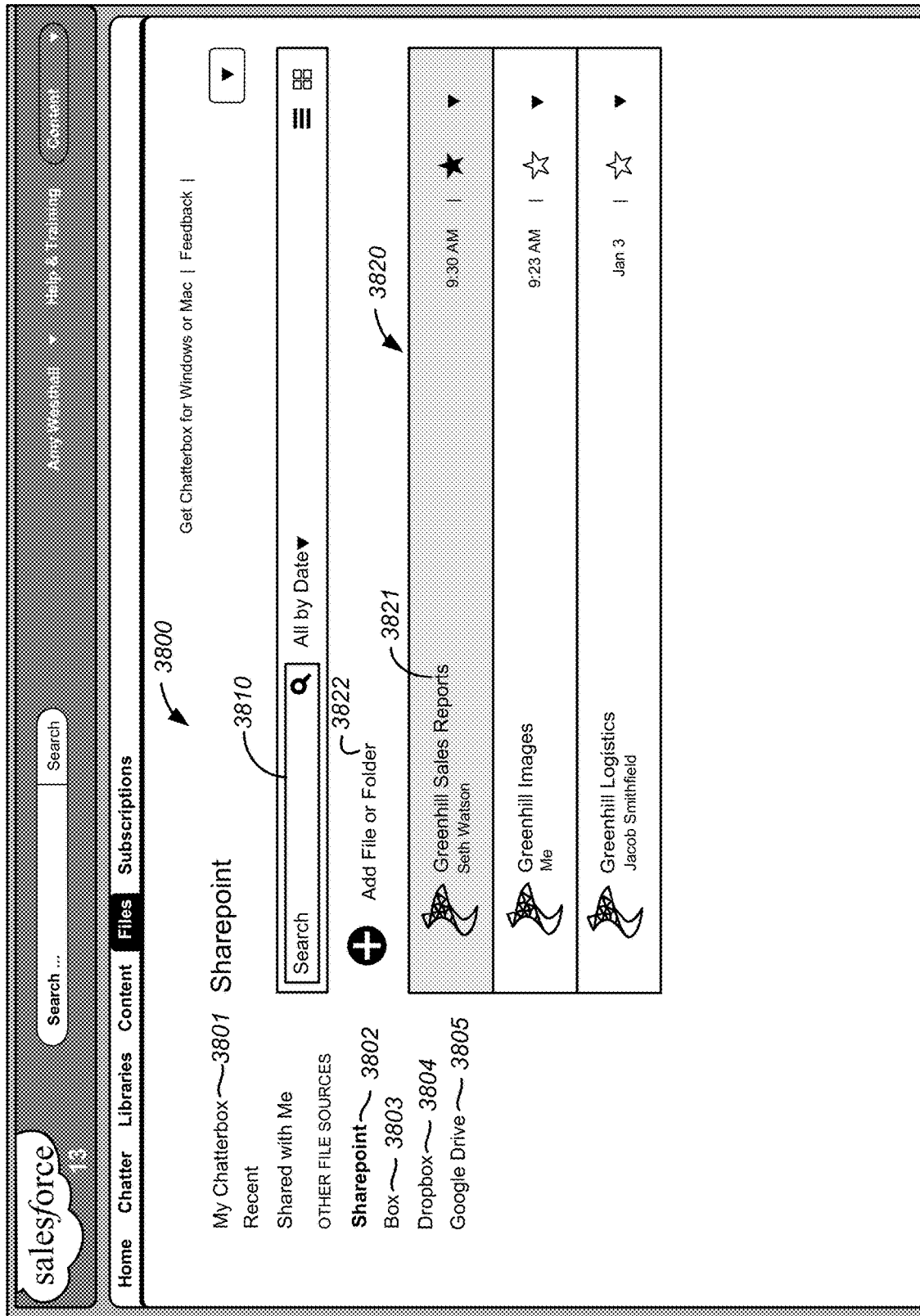
Figure 38B:
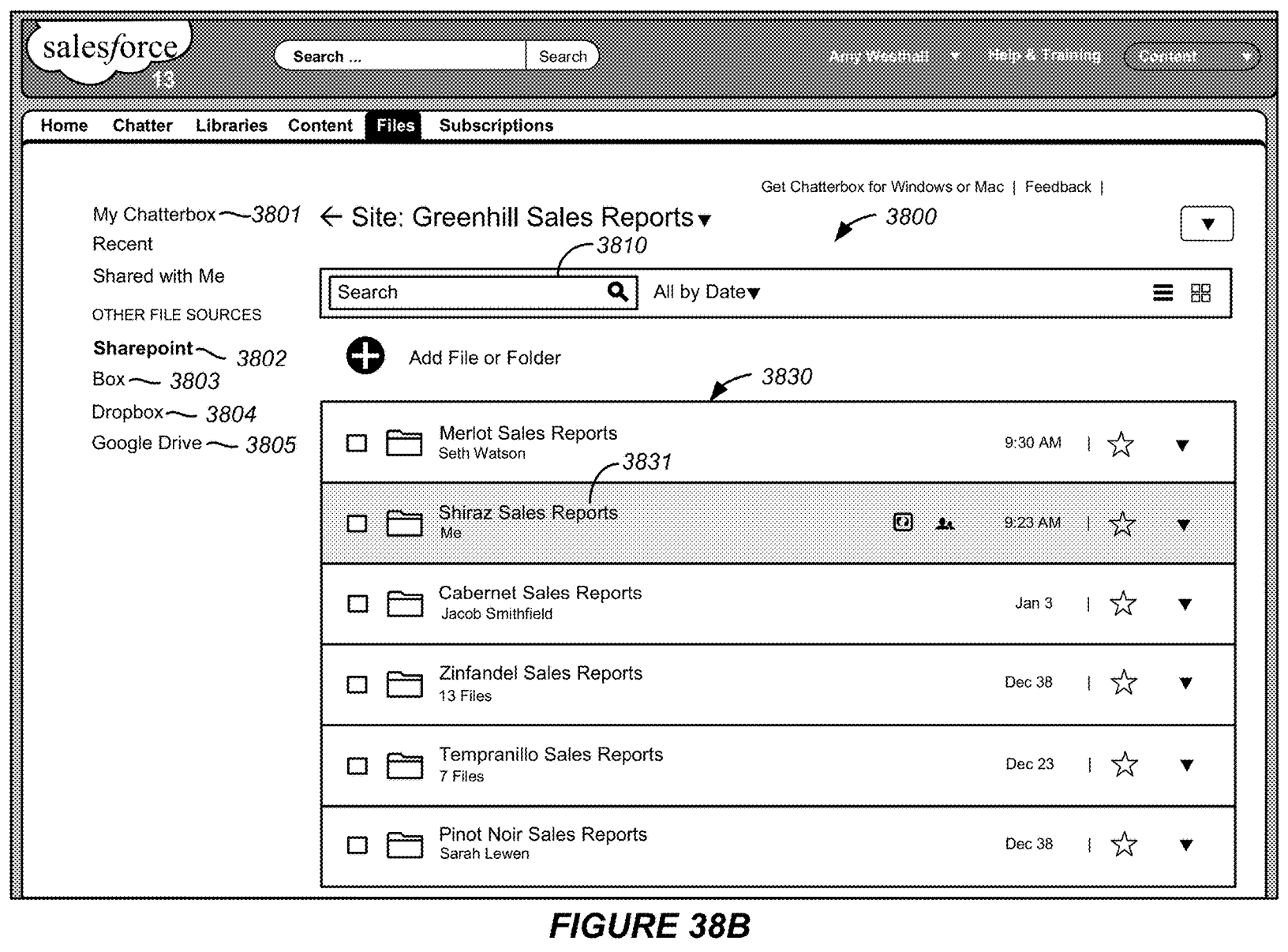
Figure 38C:
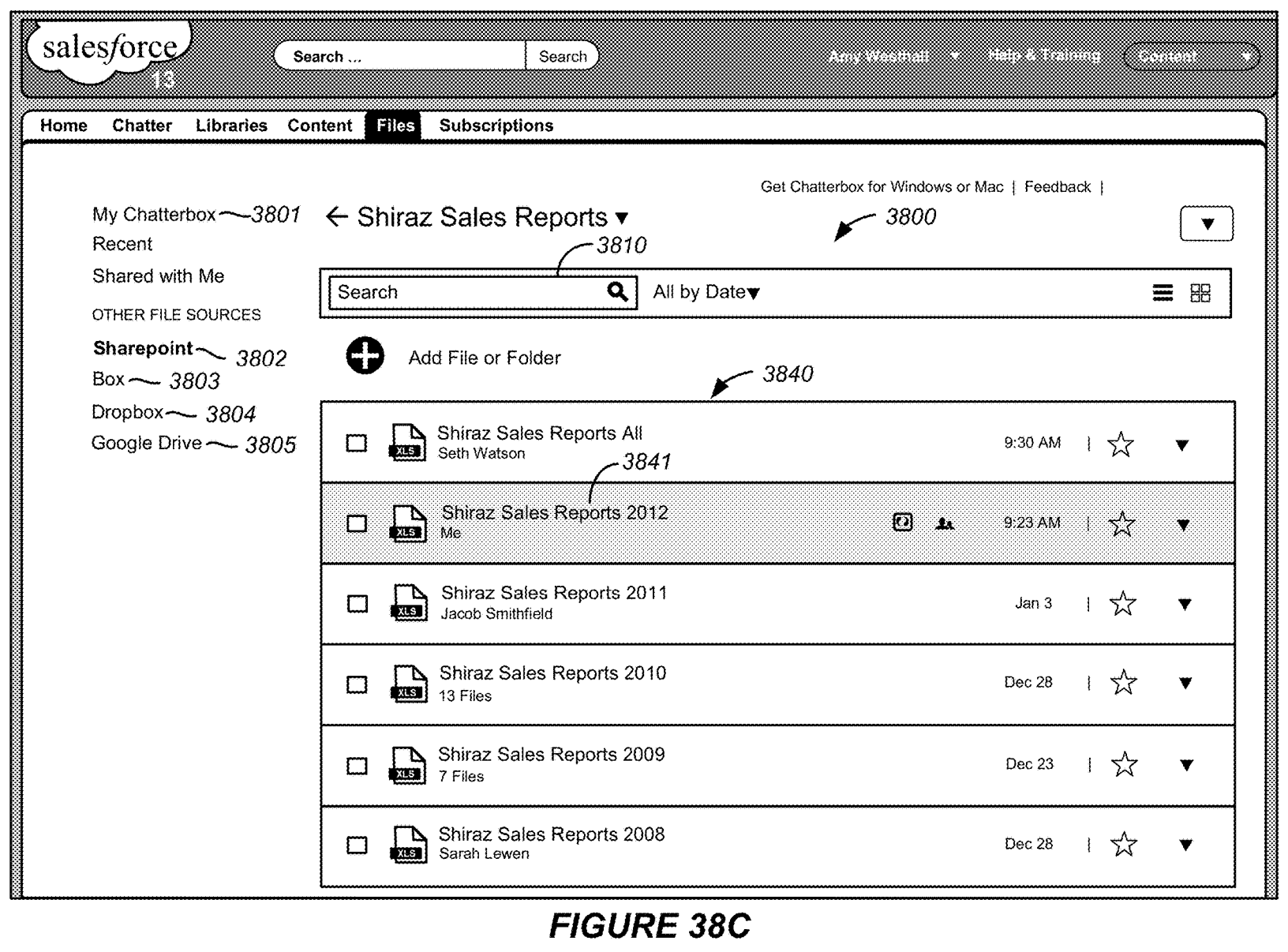

FIGS. 38A-38C show an example of a user interface illustrating navigation through content files and folders stored in an external content management data source from an on-demand database service. The user interface 3800 represents a portal that integrates a user's content files and folders from across a plurality of data sources. Some of the user's content files and folders may be stored in a database native to the on-demand database service. Here, the user may access his/her files in Chatterbox 3801, including files and folders that were recently accessed and/or shared with the user. Some of the user's content files and folders may be stored in data sources external to the on-demand database service. Here, the user may access his/her files stored in SharePoint 3802, Box.net 3803, Dropbox 3804, and Google Drive 3805. The user interface 3800 can also include a search toolbar 3810 to perform a search query across one or more data sources.

In FIG. 38A, when a user selects SharePoint 3802 to access his/her files and folders, a graphical user interface (GUI) 3820 can be displayed for navigating the user's SharePoint files and folders. The GUI 3820 can display a list of items, such as a plurality of folders 3821 accessible to the user. The user can select one of the folders 3821, which can include a title, an author, a data source icon, a timestamp, a star icon for marking, and a button for selecting more options. The user can also select a button in the GUI 3820 to Add File or Folder 3822, which enables the user to add new files and folders to the content management data source from the on-demand database service.

As shown in FIG. 38B, when the user selects the Greenhill Sales Reports folder 3821 in FIG. 38A, a GUI 3830 can be provided that displays a plurality of subfolders 3831 from SharePoint 3802 stored in the Greenhill Sales Report folder 3821. Some of the subfolders 3831 may be owned by the user and some of the subfolders 3831 may be shared with the user. Similar data or features in FIG. 38A (e.g., a title, an author, a timestamp, a star icon, and a button for selecting more options) may be displayed for each subfolder 3831. Additional data or features may be displayed, such as whether the subfolder 3831 is shared publicly or privately. Each of the subfolders 3831 can include one or more files.

As shown in FIG. 38C, when the user selects the Shiraz Sales Reports subfolder 3831 in FIG. 38B, a GUI 3840 can be provided that displays a plurality of files 3841 from SharePoint 3802 stored in the Shiraz Sales Report subfolder 3831. Each of the files 3841 may include data and features similar to FIGS. 38A and 38B (e.g., a title, an author, a timestamp, a star icon, a button for selecting more options, a public/private sharing icon). Thus, the user can access his/her files stored in the SharePoint 3802 data source in the user interface 3800 of the on-demand database service as if the user were navigating in SharePoint.

Figure 38D:
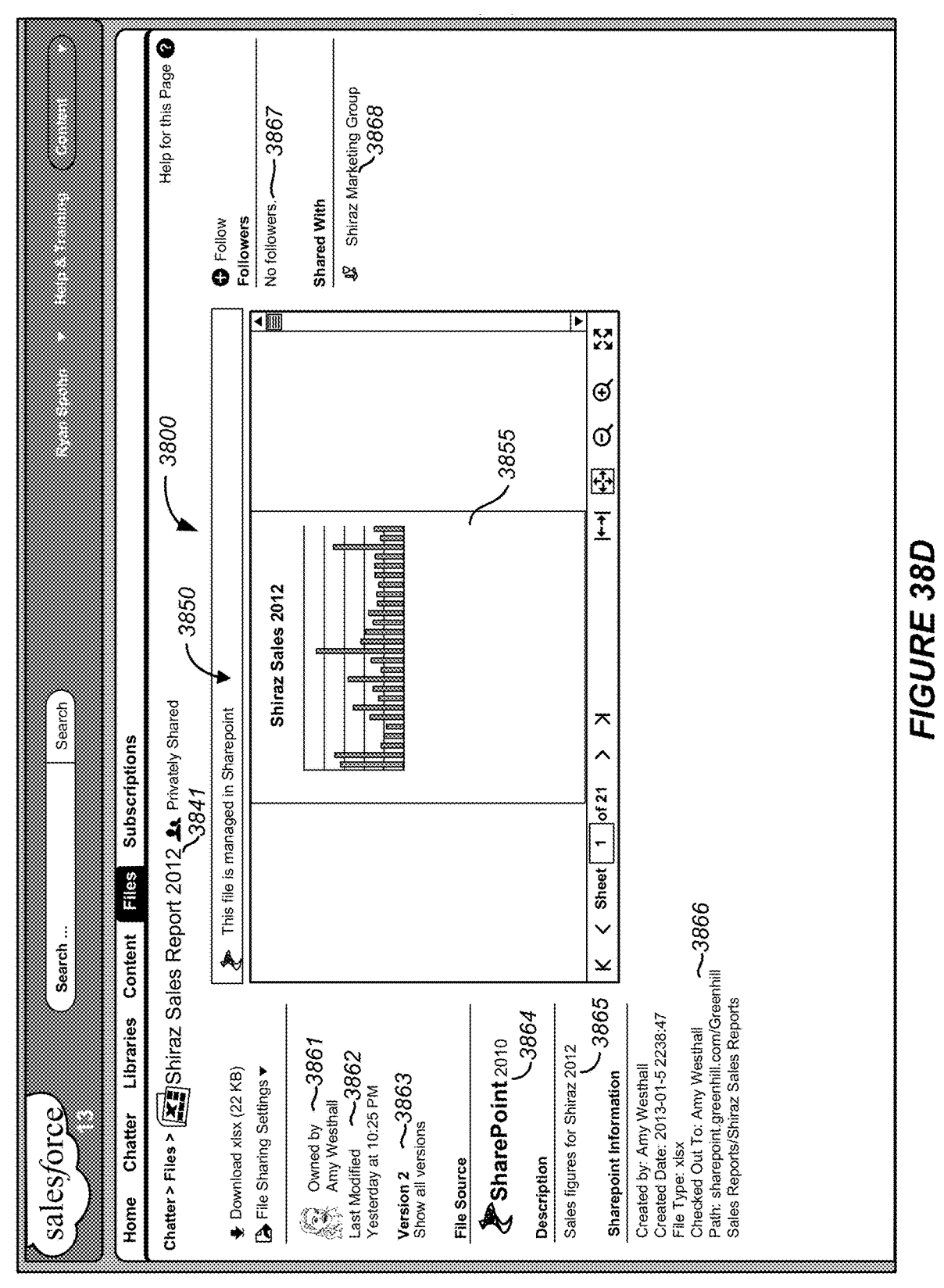

FIG. 38D shows an example of a user interface illustrating a detailed information page displaying data in the on-demand database service for an external content file. When the user selects the Shiraz Sales Report 2012 file 3841 in FIG. 38C, a detailed information page 3850 may be provided in the user interface 3800. The detailed information page 3850 may include an access-controlled preview 3855 of the selected file 3841. Metadata regarding the selected file 3841 may be provided in the detailed information page 3850, including the Owner 3861, the Last Modified time and date 3862, the version 3863, the data source 3864, the description 3865, and other SharePoint information 3866. The metadata can also include followers 3867 that are following the selected file 3841 as well as which entities 3868 to whom the selected file 3841 is shared with. In addition, the user can perform an action with respect to the selected file 3841, including downloading the selected file 3841 or editing sharing settings for the selected file 3841.

With middleware components facilitating communication between an on-demand database service and external content management data sources, fragmented content can be integrated into a single portal for ease of navigation and access. Persistent objects can be stored in the on-demand database service to represent external content objects. Not only can providing a selectable component for a persistent object facilitate access to the external content object, but the selectable component for the persistent object can facilitate sharing and collaboration in a social networking framework.

Figure 39A:
Figure 39B:
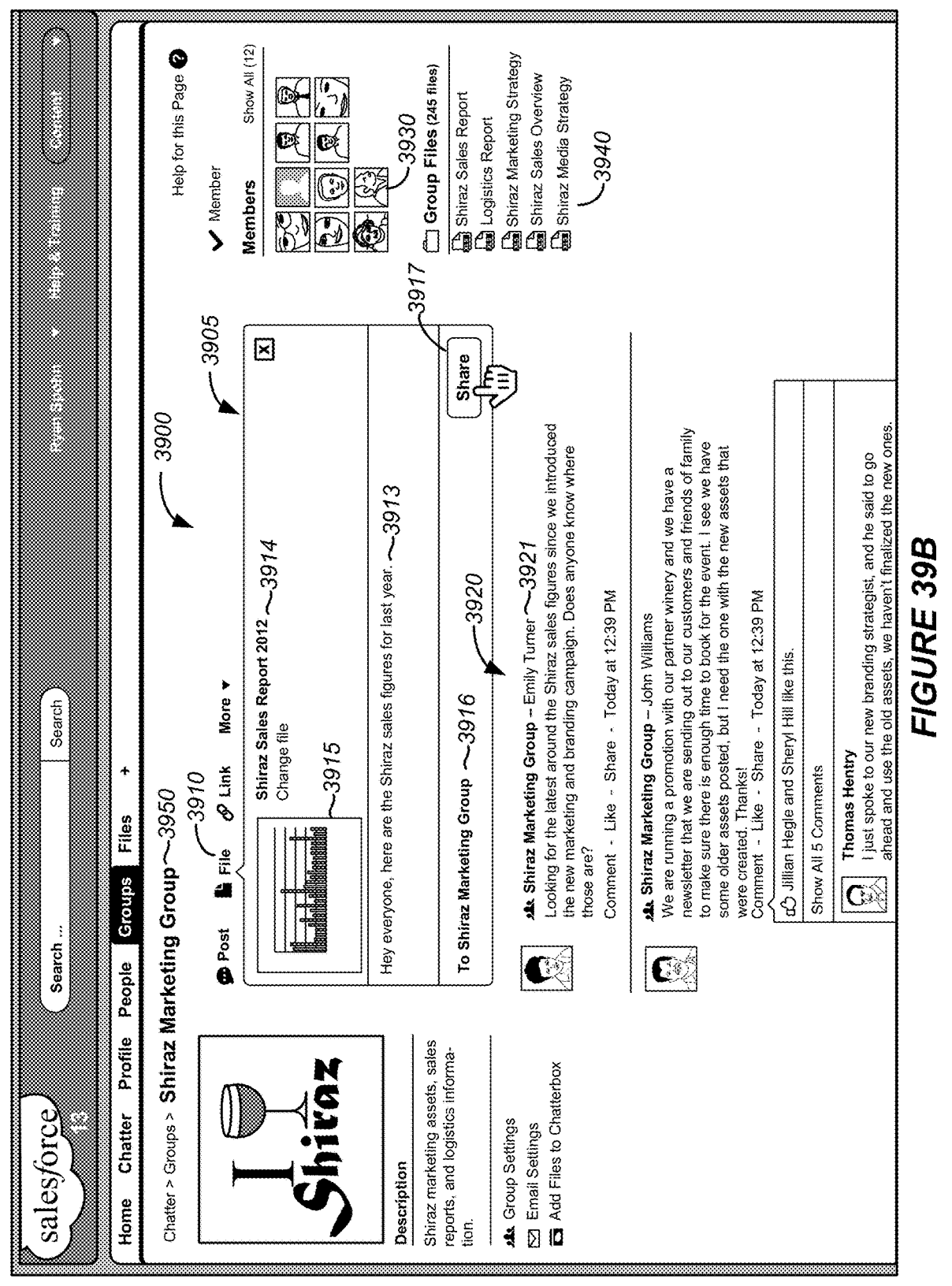
Figure 39C:
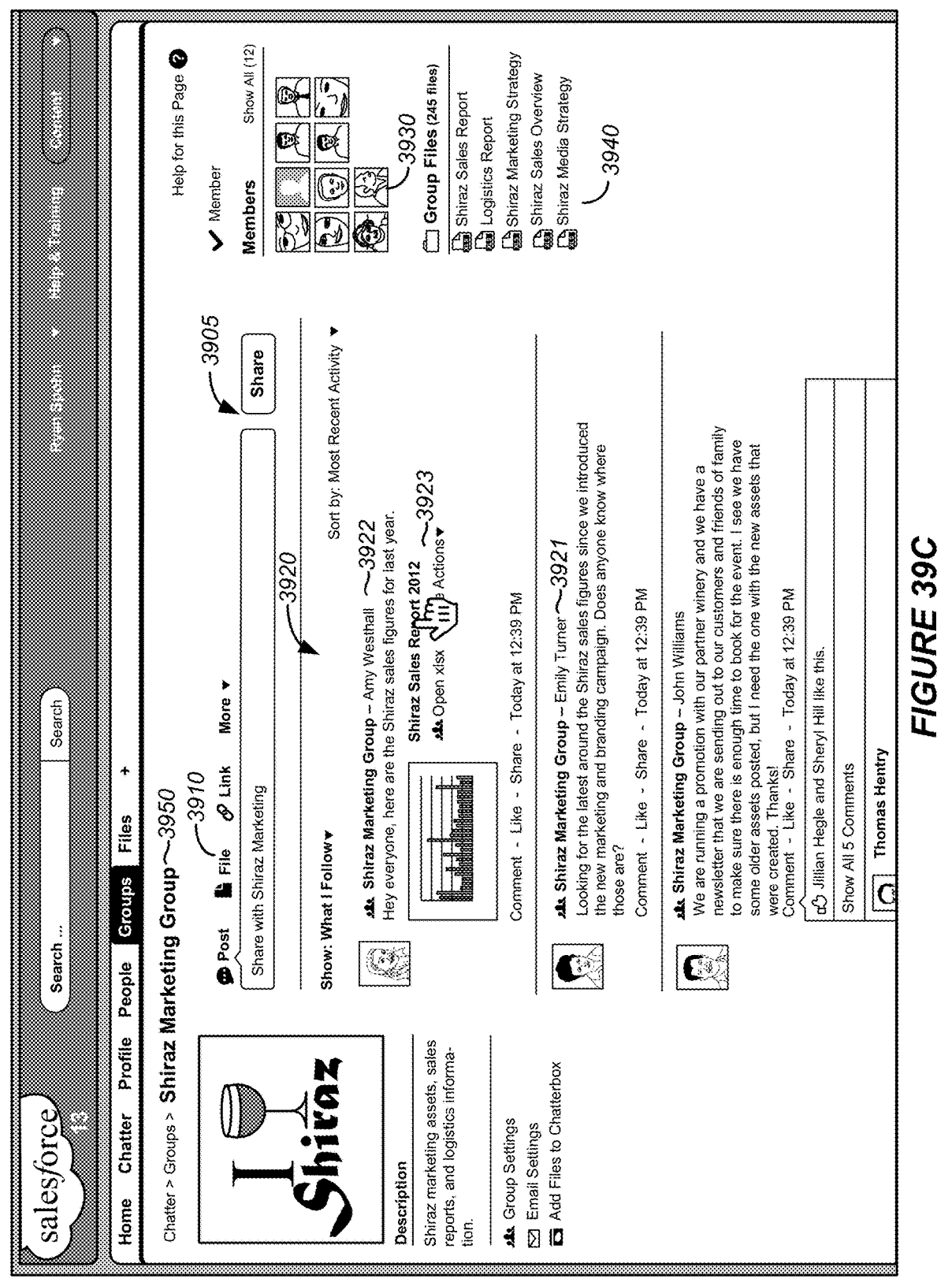

FIGS. 39A-39C show an example of a user interface illustrating a sequence of steps for sharing a content file stored in an external content management data source in an information feed in the on-demand database service.

In FIG. 39A, a user can access a Shiraz Marketing Group page 3950 that includes a publisher 3905 and an information feed 3920. The Shiraz Marketing Group page 3950 may also display information regarding the group, including its members 3930 and its group files 3940. The publisher 3905 may be configured to publish information to the information feed 3920. When a user publishes information from the publisher 3905, the information is posted as a feed item 3921.

When a user selects File 3910 in the publisher 3905, the user is provided a first option 3911 to select a file from Chatterbox and a second option 3912 to upload a file from one's computer. The first option 3911 can allow the user to select from among a plurality of files integrated across a plurality of data sources, including from external content management data sources as well as from data sources native to the on-demand database service. The second option 3912 can allow the user to upload a file stored locally on the user's client device.

In FIG. 39B, upon selecting the file, the user can publish a message or comment 3913 to accompany information being published to the information feed 3920. Here, the user has selected the Shiraz Sales Report 2012 file 3914. The Shiraz Sales Report 2012 file 3914 may be stored outside of the on-demand database service. In some implementations, the selected file 3914 can include a preview 3915 of the selected file 3914. The user can choose the destination feed 3916 for posting the selected file 3914 and the comment 3913. Accordingly, the selected or uploaded file 3914 is published as a reference in the Shiraz Marketing Group 3950. The reference can be a copy of the content object or a link to the file 3914.

In FIG. 39C, when the user selects Share 3917, the selected file 3914 and the comment 3913 is provided in the information feed 3920 as a feed item 3922. The feed item 3922 includes options 3923 to open the Shiraz Sales Report 2012 file 3914 and to select from additional actions. Other options can include commenting on the feed item 3922, liking or disliking the feed item 3922, and sharing the feed item 3922. Accordingly, members of the Shiraz Marketing Group 3950 may be able to access the Shiraz Sales Report 2012 file 3914 from the information feed 3920. Furthermore, conversations may be conducted with respect to the Shiraz Sales Report 2012 file 3914. Therefore, external content files may be edited, shared, commented on, collaborated on, and otherwise interacted with in a social networking framework.

Returning to the method 1700 in FIG. 17, the indication of the event can include a request to modify the content object from the on-demand database service. When a user accesses the content object stored in an external content management data source, the user can edit the contents of the content object via a web browser or application. For example, if the content object were a word processing document, then the user can open the content object via the selectable component for the persistent object by a word processing application like Microsoft Word or by a web-based document editing utility.

Data regarding the content object can be retrieved by creating a virtual object, and modifications to the data regarding the content object can occur via mapping and translation processes through the virtual object. The virtual object can facilitate reading and writing of the data regarding the content object. The modifications can be written and saved to external content object in the content management data source.

In some implementations, the method 1700 can further include determining that the user associated with the request to modify the content object from the on-demand database service has permission to perform the requested modification with the content object. While sharing the persistent object in the on-demand database service may allow more entities to access the external content object, a permission configuration may restrict read/write access to one or more entities. By providing access to the external content object through its corresponding persistent object in the on-demand database service, permissions to own, edit, and access the content object may be determined in part by the permission configuration associated with the persistent object. For example, if a persistent object is published to a digital library, then access to the external content object may be governed by the permissions established for the digital library. If a persistent object is published and shared with a private group of users, then members of the private group may be granted access to the external content object by virtue of the sharing operation.

When a persistent object is shared, a permission configuration may be established specifying the type of access allowed for various users and groups. In some implementations, the determination that a user associated with the request to modify the content object has permission to perform the requested modification can include identifying the requester and comparing the permission configuration with the identity of the requester. In some instances, the shared persistent object may permit some actions, such as viewing the external content object, but may not permit other actions, such as editing the contents of the external content object. In some instances, the shared persistent object may permit some actions to specific entities, such as the owner of the external content object being able to edit the contents of the external content object, but may not permit such actions to other entities. In some implementations, different entities may have different permission levels, also called authorization. This can distinguish, for example, an administrator, an owner, a member of a group, a standard user, and other user accounts. In some implementations, different entities may have different access permissions. Access permissions may include but is not limited to ownership of the content object, permission to collaborate on and edit the content object, permission to share the content object, and permission to view the content object.

In some implementations, the permission configuration associated with a persistent object may be based at least in part on the sharing arrangements of the social layers to which the persistent object belongs. When a persistent object is shared privately within a group, for example, only members of the group may access the external content object. When a persistent object is shared publicly, entities within the on-demand database service may access the external content object. In some implementations, the permission configuration associated with a persistent object may be based at least in part on designations provided by an owner of the external content object. For example, the owner of an external content object may limit the permission to edit the contents of the external content object to only specific entities. Permission configurations for a persistent object may be stored with the persistent object in the on-demand database service.

In some implementations of the method 1700, receiving the indication of the event can include receiving a request to follow the content object stored in the external content management data source. A user may be interested in being alerted when updates to the content object occur. Following the content object can include receiving an indication of an event regarding a state of the content object from the on-demand database service or from the content management data source, identifying an update regarding the content object, and sending a network communication providing a notification of the update to a user associated with the request to follow the content object. In some implementations, the external content management data source can identify the update to tell the on-demand database service what has changed. In some implementations, the external content management data source can send a signal to the on-demand database service regarding the state of the content object, and the on-demand database service identifies whether an update has occurred or not.

After receiving an indication of an event requesting interaction with the content object is received at the computing device, the method 1700 can further include sending a message to the content management data source in response to the requested interaction with the content object, the message requesting performance of the requested interaction with the content object. The message may be transmitted from the on-demand database service through the one or more middleware components to communicate with the content management data source. A virtual object may provide the interface by which the interaction with the content object occurs. Examples of requested interactions may include creating a new content object, modifying the contents of the content object, modifying access permissions or privacy controls of the content object, modifying metadata associated with the content object, deleting the content object, archiving the content object, following the content object, etc. When the requested interactions are performed in either the on-demand database service or the content management data source, updates to the content object may be saved in the content management data source.

In some implementations, sending the message can include creating a new content object in the content management data source. In other words, a user can create a new content file or folder in the content management data source from the on-demand database service. The new content object can have its own metadata associated with it. For example, the requester can provide metadata such as a name, a file type, and other information. In some implementations, the new content object can have its own permission configuration associated with it. In some implementations, the new content object can be a new version of a file overwriting a previous version. The new content object can have a corresponding persistent object stored in a database of the on-demand database service.

In some implementations, sending the message can include modifying the content object from the on-demand database service. Modifications to the content object can take the form of editing the contents of the content object and/or editing the metadata associated with the content object. The content object can be accessed via the persistent object stored in the on-demand database service. The persistent object stores information data identifying the content object so that the content object can be identified via the one or more middleware components. Read/write access can be established with the content object. The contents of the content object may be displayed through a web browser or application in a display device so that the user can edit the contents of the content object. In some instances, the metadata of the content object may be displayed in a display device so that the user can edit the metadata associated with the content object. Modifications to one or both the contents of the content object and metadata associated with the content object can be saved to the content management data source.

In some implementations, the content object may be a document file that is capable of being displayed on a display device. For example, the document file may be a word processing document, an image a video, or an audio file. In some instances, while the persistent object may not necessarily include the contents of the content object, the persistent object may be configured to identify the content object and retrieve the contents of the content object. Hence, sending the message can include retrieving the contents of the content object from the content management data source to be displayed on a display device. In some implementations, the contents of the content object can be displayed in a web browser or application that is appropriate to the document file type.

In some implementations, sending the message can include updating access permissions of the content object. Access permissions can include ownership of the content object, permission to collaborate on and edit the content object, permission to share the content object, and permission to view the content object. A requester, such as an owner of the content object, can modify access permissions for various users. That way, some users may have permission levels that are different from other users, or the permission levels may be the same for all users.

When a selectable component for a persistent object is provided in a social layer, a user input can be received at the computing device with respect to the selectable component, where receiving the indication of the event in the method 1700 is responsive to the user input. The user input can initiate one or more actions with respect to the persistent object. In some implementations, the user input can initiate one or more actions on the external content object via the persistent object. The one or more actions can request performance of some of the above-referenced interactions.

At block 1712 of the method 1700, the persistent object is updated to reflect the interaction with the content object. The update to the persistent object may be stored in the database of the on-demand database service. In some implementations, the update may include changes to data regarding the content object. By way of an example, a timestamp indicating the most recent change may be updated. The update may trigger other actions, including inserting a feed item into an information feed to reflect the update. Then, one or more entities in the on-demand database service may be alerted of the update.

Updates to the persistent object may occur by modifications made directly to the persistent object. In such instances, the modifications can be written to the corresponding content object in the external content management data source. For example, a user can change the description of a SharePoint document from Chatter® and choose to save the changes to SharePoint.

Some modifications can be made in the content management data source. In some implementations, a plug-in or other client application can send push notifications to the on-demand database service. The push notifications can provide information regarding modifications made to a content object. The corresponding persistent object can be updated accordingly. For example, a user can edit the contents of a SharePoint document, SharePoint can notify Chatter® of the changes, and a corresponding Chatter® file representing the SharePoint document can be updated.

XV. Identifying One or More Categories for External Content

When fragmented content is integrated and persistently represented in a social collaborative environment, information regarding such content can be ascertained and shared in a social context. Not only can metadata regarding an external content object provide knowledge to an on-demand database service, but information ascertained in the social context can also provide knowledge to the on-demand database service. In other words, as external content objects (via persistent objects) are indexed, searched, commented upon, recommended to other users, liked, followed, shared, accessed, propagated, moved, edited, updated, deleted, and otherwise interacted with in the on-demand database service, more information can be ascertained regarding the external content objects. Analytics regarding the external content object can generate useful information that can be utilized in the social context. In fact, the on-demand databases service can leverage such information to recommend relevant files to groups or users in the on-demand database service.

Figure 18:
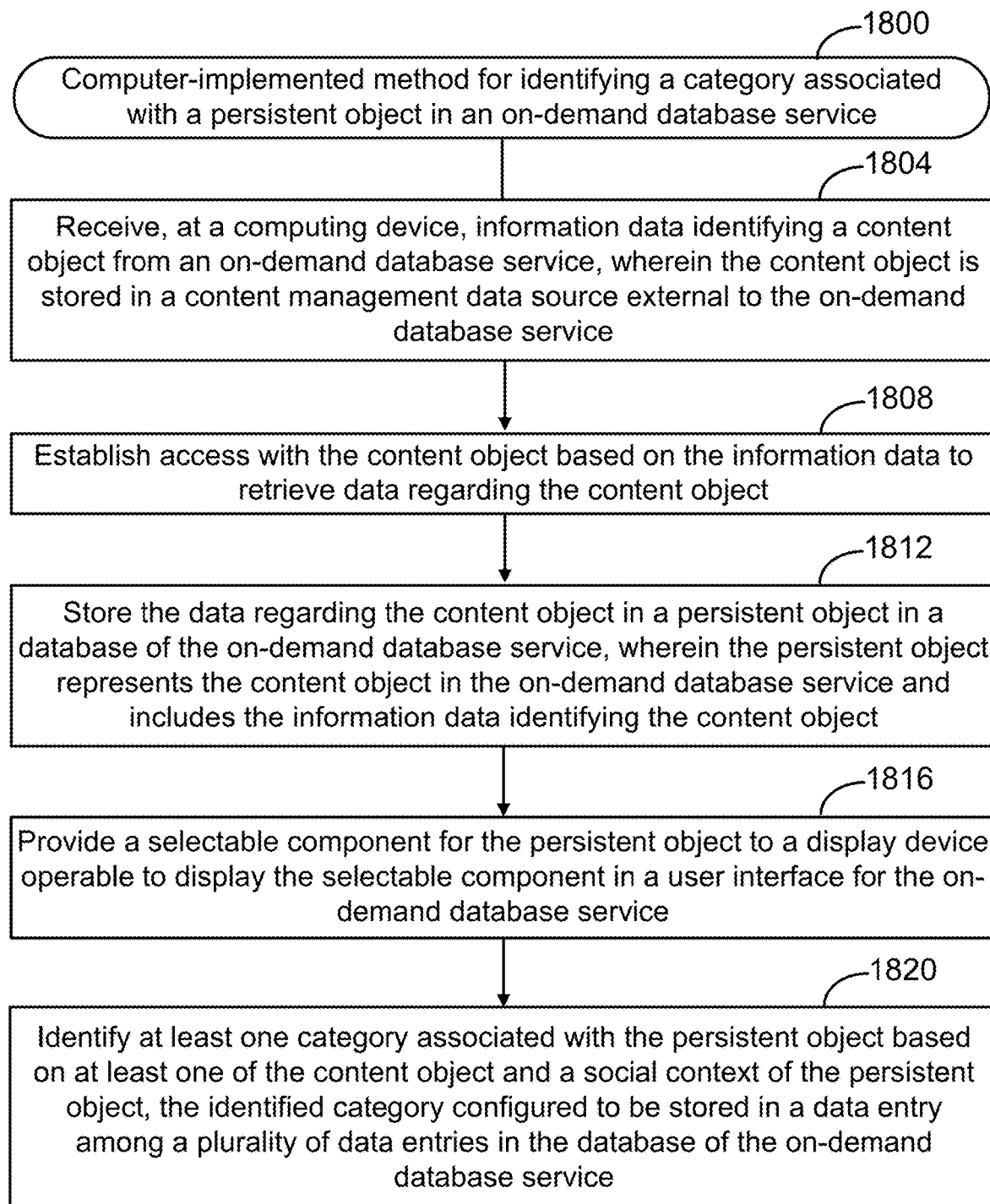
FIG. 18 shows a flowchart of an example of a computer-implemented method 1800 for identifying a category associated with a persistent object in an on-demand database service, performed in accordance with some implementations.

FIG. 18 shows a flowchart of an example of a computer-implemented method 1800 for identifying a category associated with a persistent object in an on-demand database service, performed in accordance with some implementations. The method 1800 may be described with reference to an exemplary diagram in FIG. 40.

At block 1804 of the method 1800, information data identifying a content object is received at a computing device from an on-demand database service, where the content object is stored in a content management data source external to the on-demand database service, as generally described above at block 1604 of the method 1600. At block 1808, access is established with the content object to retrieve data regarding the content object, as generally described above at block 1608 of the method 1600. At block 1812, data regarding the content objet is stored in a persistent object in a database of the on-demand database service, where the persistent object represents the content object in the on-demand database service and includes the information data identifying the content object, as generally described above at block 1612 of the method 1600.

At block 1816 of the method 1800, a selectable component for the persistent object is provided to a display device operable to display the selectable component in a user interface for the on-demand database service. A social layer may be part of an online social network or online business application that provides an interface that facilitates access to, collaboration on, and sharing and distribution of content. Examples include a webpage associated with a particular network URL, a particular digital library, or some other destination. The social layer may be accessible to a plurality of users in the on-demand database service. In some implementations, the social layer includes a group, a record, an organization, a content management files list, an information feed, a user profile, or other webpage of the on-demand database service. When the selectable component for the persistent object is provided in a social layer, the persistent object is made available for consumption by a broader audience of users.

The social layer may provide an interface for performing a wide range of operations on external content through the persistent object. From the social layer, users can perform searches on content stored in one or more external content management data sources in accordance with some implementations. From the social layer, users may share or otherwise distribute external content to one or more destinations in the on-demand database service in accordance with some implementations. Thus, more users in the on-demand database service may access the external content. From the social layer, users may collaborate on external content depending on the access permissions associated with the persistent object in accordance with some implementations. From the social layer, users may publish comments regarding external content in accordance with some implementations. Users may update, archive, delete, recommend, analyze, sort, filter, and otherwise process external content from the social layer in accordance with some implementations.

As the external content is exposed to a wide range of operations in a social context, more information can be ascertained regarding the external content to provide knowledge to the on-demand database service. In some implementations, the social layer can provide an interface for processing the external content to identify a tag or category to associate with the persistent object.

At block 1820 of the method 1800, at least one category associated with the persistent object is identified, the identified category configured to be stored as a data entry among a plurality of data entries in the database of the on-demand database service. In some implementations, the identified category can be a topic and/or a hashtag. The identified category can be used in the on-demand database service to unify fragmented content sharing the same or similar category. Specifically, document files scattered across a plurality of different databases can be unified through a content hub when the document files share the same or similar identified category.

In some implementations, the plurality of data entries may be stored in a database table. The database table can represent an index of categories by which a category can be identified. The index can be continuously updated as categories are identified for a persistent object. In some instances, the index can include a value, ranking, or score for indicating the relevancy of a category associated with a persistent object. In some instances, the index can include a value, ranking, or score for indicating the relevancy of a category associated with a text (e.g., word or phrase in a description of a file) and/or event (e.g., search or user interaction with a file).

By way of an example, the contents of an external content object can include a corpus of text. Each data entry in the database table can include a text and a text-to-category association. The text can be an alpha-numeric string of characters, word, phrase, or combination of words. In some implementations, each data entry may also include a text-to-category score, value, or ranking. The text-to-category score, value, or ranking can be continuously adjusted each time the appearance of a text in a corpus of text is assigned (or not assigned) to a category.

In some implementations, identification of the at least one category can occur upon receiving a user input of the data entry to identify the at least one category. For example, when a selectable component for the persistent object is provided in the social layer of the on-demand database service, such as when the persistent object is provided in a post or a feed, a user may be given the opportunity to tag or otherwise categorize their post or feed. In certain implementations, the user may select from a pre-defined list of categories or suggested categories. The user may manually enter one or more categories to associate with the persistent object, in some implementations. When a category is identified based on a user input, a data entry may be added or updated to the plurality of data entries.

In some implementations, identification of the at least one category can include processing a corpus of text in the accessed content object and analyzing text in a corpus of text against a plurality of data entries in the database to identify at least one category. When a content object stored in an external content management data source is accessed as described above, a corpus of text can be read and processed. While a number of techniques may be applied to read and process a corpus of text to extract a topic or category to associate with the corpus of text, an exemplary technique is described below.

A social intelligence engine can be implemented in the social layer to identify one or more categories to associate with the persistent object and provide recommendations of relevant persistent objects to user accounts in the on-demand database service. The social intelligence engine can include hardware, software, firmware, and/or processing logic to support identification of categories and provision of recommendations. The social intelligence engine can be in communication with a database that includes the database table storing the plurality of data entries. The database table can represent an index that is continuously updated and continuously learns from previously associated categories. Thus, if a user associates a document containing certain key words and phrases relevant to a topic, then the social intelligence engine can add that topic and its association to the index. The social intelligence engine can learn from the previous association to suggest that topic to another document containing the same or similar words and phrases.

The social intelligence engine can read and process a corpus of text included in the contents of the content object and/or the metadata of the content object. The corpus of text may include words, phrases, or word combinations that can be intelligently linked or otherwise associated with one or more categories. Hence, a given text in the corpus of text may be analyzed against certain categories to identify one or more topics. For example, if a title of an external document file contains "Obama," a potential category for identification can be "politics." If a description of an external document file includes "Lakers," a potential category for identification can be "sports."

Analysis of the text in the corpus of text can include comparing the text to a text-to-category association (e.g., word-topic pair) in the plurality of data entries. Each of the data entries can include a text-to-category score, value, or ranking where the score, value, or ranking can reflect the strength of the association between the text and the category. For example, the score, value, or ranking can reflect the number of times that the category has been assigned to an object containing the text. The text-to-category score, value, or ranking can be continuously updated in the plurality of data entries. For example, as users assign topics to various media types, such as social media messages, word-to-topic scores can be generated. The number of occurrences of a word in a social media message, previously-made correlations in other social media messages including the word, and other factors may influence the word-to-topic score. Thus, some word-to-topic scores, values, or rankings may be higher than others, which can be based on the relevancy of the word-to-topic association. Therefore, a description of an external document file that contains "Lakers" may be analyzed, where a topic of "basketball" may have a higher score, value, or ranking than "sports" or "Los Angeles." A more detailed description of obtaining word-to-topic scores, values, or rankings can be found in U.S. application Ser. No. 14/018,107 entitled "Computer Implemented Methods and Apparatus for Identifying a Topic for a Text" to Palmert et al., the entirety of which is incorporated by reference herein and for all purposes.

While the highest score, value, or ranking for a text-to-category association may identify a likely category to associate with the persistent object, other parts of the corpus of text may be taken into account to identify the category. For instance, a category may appear multiple times in various text-to-category associations, and each appearance of the category may be summed together so that the category with the highest score can be the most likely category to associate with the persistent object. If a description of an external document file contains "Lakers," "Getty Museum," "city," and "Hollywood," then a topic of "Los Angeles" may be more likely to associate with the document file.

Moreover, the text-to-category score, value, or ranking may be incremented based on the number of times the given text appears in the corpus of text. Thus, if "Obama" appears five times in a corpus of text and "Lakers" appear only once in the corpus of text, then the text-to-category association of "politics" may be greater than the text-to-category association of "sports."

In addition or in the alternative, identification of the one or more categories to associate with the persistent object may be based at least in part on the social layer or social context to which the persistent object is provided in. Typically, information about a file can be ascertained by its content and metadata. When a file is provided in an on-demand database service, more information about the file can be ascertained from its social context. A social context can refer to information about a data object (e.g., persistent object) based on how the data object is used in the on-demand database service. Such information can be ascertained from, for example, who is accessing the data object, who is searching for the data object, who is sharing the data object, where the data object is being surfaced, what operations are being performed on the data object, what comments are being made about the data object, etc. Thus, a social context of a persistent object can be ascertained from a social layer in which the persistent object is provided in as well as user interaction data regarding the persistent object.

With a content hub as described earlier herein, content objects stored in external data sources can be surfaced in a social layer via persistent objects that represent the content objects. As such, external content objects can be presented in a social networking environment. The content objects can be shared and distributed among a plurality of users in an on-demand database service. The content objects can be integrated in business processes and workflows.

Content objects may be "surfaced" in a social layer when its corresponding persistent object is provided in the social layer, and information regarding the surfaced content object may be ascertained from the social layer. Some information regarding the surfaced content object that may be ascertained in the social layer can come from comments or conversations, posts, and feeds that accompany the persistent object. Other information regarding the surfaced content object that may be ascertained in the social layer can come from other objects in the social layer as well as information regarding the group, organization, or user to which the persistent object is provided in. In some implementations, information ascertained in the social layer can include metadata from CRM objects, such as opportunities, leads, contacts, accounts, cases, etc. For example, if the account where the persistent object is provided in is a healthcare account, then the persistent object is more likely to be associated with a topic of health or healthcare.

In some implementations, identification of the at least one category can include extracting information regarding a social context of the persistent object. The information regarding the social context can include, for example, attribute information of the social layer in which the persistent object is provided in, metadata of other objects in the social layer in which the persistent object is provided in, textual information of the social layer in which the persistent object is provided in, and user interaction data regarding the persistent object. The information regarding the social context is analyzed with respect to one or more data entries in the database. In one example, text extracted from a social layer can be compared to word-to-topic pairs in a topics database. In another example, aggregated user interaction data regarding a persistent object can be analyzed to develop trends and patterns towards a certain topic.

A social intelligence engine can extract and analyze a social context in social layer. Some examples of information regarding a social context in a social layer can include: (1) a user composes a post that includes a persistent object to publish to the social layer, where the post includes a description of the external content object represented by the persistent object; (2) a user comments on a feed item containing a persistent object; (3) a user publishes a post that includes a persistent object to a record feed about an opportunity; (4) a user provides a persistent object in a group about cars where the persistent object represents an article about hydrogen fuel cells stored in Dropbox; and (5) a user provides a persistent object in a webpage that also includes several documents of real estate listings, where the persistent object represents an image of a home for sale stored in Box.net. In each of these examples, it can be readily apparent how processing and analyzing information in the social layer can assist identification of one or more appropriate categories to associate with the persistent object. The aforementioned examples demonstrate that information regarding the surfaced content object may be ascertained from posts, comments, feeds, groups/organizations/users, and surrounding objects, where such information may analyzed to identify at least one category to associate with the persistent object. It is understood that the aforementioned examples are meant to be illustrative only and not meant to limit the scope of the disclosed implementations.

In addition or in the alternative, identification of the one or more categories to associate with the persistent object may be based at least in part on event-based data. Some examples of event-based data can include instances of searching for a persistent object, accessing a persistent object, updating a persistent object, deleting a persistent object, providing a persistent object in a CRM object, sharing a persistent object, posting conversations about a persistent object, etc. Event-based data can include user interaction data with respect to a persistent object in the on-demand database service. Event-based data can also include user interaction data with respect to the content object in the external content management data source. Events can include, for example, a content object being updated, accessed, created, deleted, indexed, moved, etc. Such events can be communicated to the on-demand database service to update or provide user interaction data regarding the corresponding persistent object. In some implementations, user interaction data regarding the persistent object can be collected, where identifying the at least one category is based at least in part on the user interaction data.

In some implementations, the user interaction data can include data regarding selection of the persistent object from items in a search result. When users perform search queries in the on-demand database service for content, search results may be displayed that include content files or folders that are native to the on-demand database service and that are external to the on-demand database service, where a persistent object can represent a content file or folder external to the on-demand database service. By way of an example, a user performs a search for "dog food sales" in Chatter®, and a sales report of Kibbles n' Bits® in 2013 is presented in the search results where the sales report is stored in SharePoint. The user selects the sales report, and user interaction data regarding the sales report is updated in a database of the on-demand database service. In some implementations, the search string or portions of the search string can be used to generate a topic to associate with the persistent object. Specifically, a social intelligence engine can identify the category of "dog food" or "dog food sales" to associate with the persistent object representing the Kibbles n' Bits® 2013 sales report.

In some implementations, the user interaction data includes attribute information of one or more users who accessed the content object through the persistent object. Information regarding the persistent object can be gathered depending on who is choosing to access the external content object. Knowledge about a user can be ascertained from their attribute information, which can include the user's role and definition, the user's preferences, or the user's behaviors. A social intelligence engine can ascertain user attribute information, in some implementations. To illustrate some examples, if patent attorneys predominantly access a first external document file or if a user whose behavior exhibits an interest in cars accesses a second external document file, then user interaction data regarding the persistent object can be created or updated based on such user attribute information. The first external document file can more likely be associated with patents and the second document file can more likely be associated with cars.

The identification of the at least one category to associate with the persistent object can be based on an aggregation of some or all of the ascertained information discussed above. This can include but is not limited to information ascertained from one or both of the contents and the metadata of the content object, information ascertained from the social layer in which the persistent object is provided in, and information ascertained from event-based data regarding the persistent object. In some implementations, a social intelligence engine can be used to ascertain such information regarding a persistent object to facilitate identification of the at least one category.

In some implementations, the method 1800 can further include updating a value associated with the data entry in the database based at least in part on the user interaction data, the value indicating a relevancy of the at least one identified category associated with the persistent object. Some or all of the data entries in the plurality of data entries can have a value (e.g., score) reflecting the degree of relevancy of a category for the persistent object. The relevancy value can be based in part on the occurrences of words in the content and/or metadata of the content object. The relevancy value can also be based in part on the occurrences of words in the social layer in which the persistent object is provided in. Moreover, as users interact with an external content object in the on-demand database service, the relevancy of some categories may be adjusted based on who is accessing the external content object, whether users access the external content object from a search, etc. The highest values may account for some or all of the aforementioned factors to identify the one or more categories to associate with the persistent object.

Figure 40:
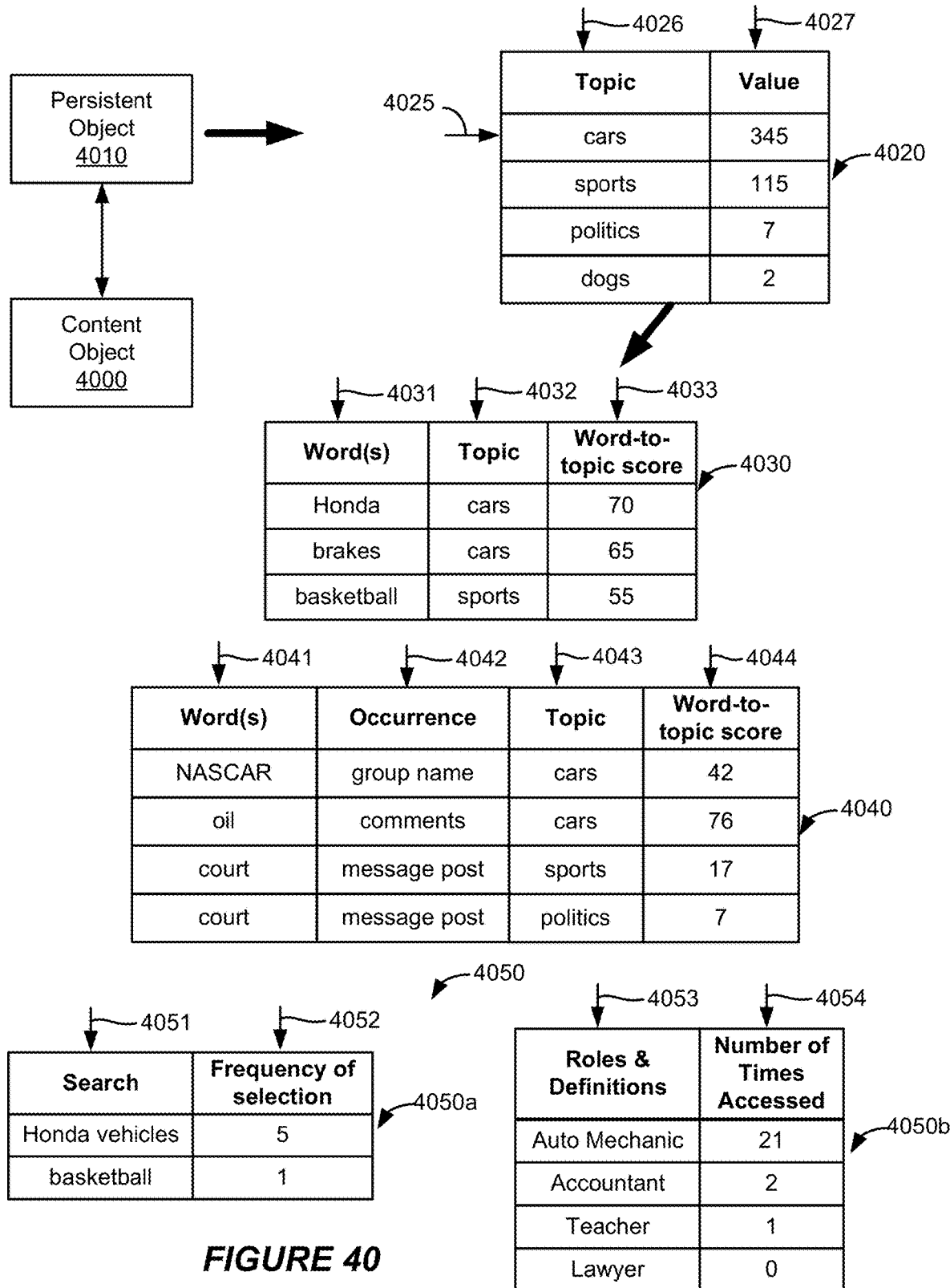
FIG. 40 shows an example of a database table for a plurality of data entries identifying topics for a persistent object and corresponding values indicating relevancy of the topic for the persistent object.

FIG. 40 shows an example of a database table for a plurality of data entries identifying topics for a persistent object and corresponding values indicating relevancy of each topic for the persistent object. A persistent object 4010 can represent an external content object 4000. The persistent object 4010 can correspond to a database table 4020 that includes a plurality of data entries 4025. Each of the data entries 4025 includes a topic 4026 and a corresponding value 4027. The corresponding value 4027 can indicate the relevancy of the topic 4026 to the persistent object 4010. In the example illustrated in FIG. 40, the topics 4026 include "cars," "sports," "politics," and "dogs," with a value of 345, 115, 7, and 2, respectively.

The corresponding values 4027 can be calculated based at least in part on an analysis of text in the accessed content object 4000, an analysis of text in the social layer in which the persistent object 4010 is provided, and user interaction data regarding the persistent object 4010. A first analysis database table 4030 includes a list of words 4031, a list of corresponding topics 4032, and a list of corresponding word-to-topic scores 4033. The word-to-topic scores 4033 for a given topic can be used to calculate the values 4027 in the database table 4020. In FIG. 40, the occurrence of words like "Honda" and "brakes" in the accessed content object correspond to the topic of "cars" to add to the value of "cars" in the database table 4020.

A second analysis database table 4040 includes a list of words 4041, a list of occurrences 4042 where the word is provided, a list of corresponding topics 4043, and a list of word-to-topic scores 4044. Words such as "NASCAR" and "oil" that appear in the group name and in a user's comments regarding the persistent object can add to the value 4027 of the topic 4026 of "cars" in the database table 4020.

A third analysis database table 4050 includes user interaction data regarding the persistent object. The third analysis database table 4050 can include a sub-table 4050a that shows search queries 4051 in which the persistent object 4010 was selected and the number of times 4052 that the persistent object 4010 was selected. The third analysis database table 4050 can also include a sub-table 4050b that shows roles and definitions 4053 of users that accessed the persistent object 4010 and the number of times 4054 that the persistent object 4010 was accessed. Search queries 4051 and roles and definitions 4053 can be related to a topic by a score or value, and the score or value can be adjusted based on the number of times the persistent object was selected or accessed. The score or value can be used to adjust the value 4027 of any of the topics 4026 in the database table 4025. In FIG. 40, a search query of "Honda vehicles" where the persistent object 4010 was selected five times can be indicative of the persistent object 4010 relating to cars. In addition, users having an occupation as an auto mechanic that access the persistent object 4010 several times can also be indicative of the persistent object 4010 relating to cars.

Values 4027 can represent a degree of relevancy of a topic associated with a persistent object 4010, where the values can be calculated by an aggregation of the word-to-topic scores 4033, word-to-topic scores 4044, a frequency of selection 4052, and number of times accessed 4054. Each of the scores 4033, 4044, 4052, and 4054 can be weighted by various inflation factors to arrive at final value.

Identification of categories associated with a persistent object can help unify the persistent object with fragmented content spread across a plurality of data sources. In other words, if a file stored in a data source is associated with a topic, then other files associated with the same or similar topic but stored in other data sources can be unified in the on-demand database service. For example, a car owner is involved in a car accident and creates a report for the accident. The report for the car accident is emailed to his insurance company, where the email is stored in a first data source. The car owner also takes a picture of the car accident and saves the picture in a second data source. The insurance company accesses the insurance contract for the car owner, which is stored in a third data source. Even though the report, the photograph, and the insurance contract may be stored in separate data sources, the on-demand database service may integrate content across the separate data sources. Specifically, the content can be integrated in a single database system. Furthermore, one or more overlapping categories associated with each of the files can unify the files in the on-demand database service. For instance, a social intelligence engine can identify one or more categories associated with each of the files as described above, and the files can be organized or stored in a database in the on-demand database service according to the one or more identified categories.

Whether a content file or folder is recommended to a particular user or group of users may be based on analytics provided by a social intelligence engine. Analytics may be considered the development and communication of meaningful patterns in data that can be derived through the application of statistical models and analysis. Such application of statistical models and analysis in analytics can lead to decision recommendations and/or insights. As an example, analytics data may aggregate information about trends developing about a document, likes and dislikes about a document, topics being discussed related to a document, key document attributes, and demographics and social profile data of people discussing a document. The analytics associated with a persistent object may be used to predict what content files or folders may be of interest to a particular user or group of users.

In some implementations, the analytics provided by the social intelligence engine may identify one or more categories to associate with a persistent object as discussed above. Using such information provided by the social intelligence engine, the external content object represented by the persistent object may be recommended to one or more users in the on-demand database service.

The persistent object may be accessible to a plurality of users in the on-demand database service. In some implementations, the method 1800 can further include determining that the persistent object is relevant to at least one user in the on-demand database service and providing a selectable component for the persistent object to a display device associated with the user operable to display the selectable component as a suggested content object when the display device associated with the user accesses the on-demand database service.

Determining whether content is relevant to a user can depend on ascertaining information about the user. The social intelligence engine may collect and analyze information about the user. In some implementations, determining that the persistent object is relevant can be based at least in part on one or more of: profile information of the user, preferences of the user, and usage patterns of the user.

Data regarding profile information of the user can include a user's role and definition that can include a job title, a list of responsibilities, and a team to which the user belongs, among others. Data regarding preferences of the user can include inputs received about what kind of content the user prefers to consume. Such inputs can be received from one or more of the user himself or herself, a third party data source, and the on-demand database service. Data regarding usage patterns of the user can include metrics that track user behavior implicitly and/or explicitly. Data regarding usage patterns of the user may be drawn from the on-demand database service. In some implementations, the data regarding usage patterns of the user may be drawn from social networks such as Facebook®, Twitter®, LinkedIn®, and the like. In some implementations, data regarding usage patterns of the user may be drawn from third party data sources, such as external data repositories.

Once information about the user is obtained, the information can be compared against the attributes of the persistent object. In some implementations, the attributes of the persistent object can include the at least one identified category associated with the persistent object. The social intelligence engine can determine whether the at least one identified category may be of interest to the user based on the ascertained information about the user. Then, a selectable component for the persistent object can be provided to the user as a recommendation in a user interface component, such as a notification, prompt, window, or other graphical representation. The user interface component may include one or more actionable selections to accept, reject, or ignore the recommendation.

In some implementations, the delivery of relevant content can occur upon receiving an indication of an event at a computing device. An indication of an event can include, for example, a creation of a group, a user accessing group data, transmission of data to update a record, a change in a user's profile, a change in a group's description, a request to perform a search, etc. The occurrence of the event may provide data regarding the user associated with the event such that external content associated with a persistent object may be relevant to the user. Hence, if a user creates a group with a portion of the group's description matching an identified category associated with a persistent object, a selectable component for the persistent object may be delivered to the user. In some instances, the delivery of the persistent object can be in the form of a recommendation.

With respect to the aforementioned display device for implementing any of the methods described above, the display device can include any one of a number of display devices. For example, the display device can be one of a smartphone, a laptop, a tablet, a wearable display device, and a desktop computer. The wearable display device can include, for example, a smart watch or smart glasses.

In implementing any of the methods described above, the display device may also be part of one or more connected devices. For example, the display device can be part of one of a vehicle, a consumer appliance, wearable technologies, a sensor, a robot, and an electronic product.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for combining team-based conversations, meetings, file storage, file collaboration and applications in a work environment, the system comprising:

a database system implemented using a server system, the database system configured to cause:

obtaining, from a computing device, a first request to add cloud storage to provide sharing of files stored in the cloud;

subsequent to the first request, displaying, in a user interface at the computing device, a list of cloud storage services with which the database system is capable of communicating, each cloud storage service being presented in the list with an associated one or more selections providing turning on or turning off file sharing and cloud file storage options for the cloud storage service;

obtaining, from the computing device, one or more picks of one or more of the cloud storage services in the list;

obtaining, from the computing device, a second request to upload and share files from the picked one or more cloud storage services;

subsequent to the second request, adding a plurality of cloud files from the picked one or more cloud storage services to a channel associated with a team of users, the adding of the plurality of cloud files comprising processing information received from the picked one or more cloud storage services, the information identifying the plurality of cloud files;

adding a plurality of computing device files from the computing device to the channel associated with the team of users;

obtaining, from the computing device, a search command comprising one or more of: a name, a keyword, or a phrase entered into a box in the user interface at the computing device;

performing, using the search command, a file search on: the plurality of cloud files added to the channel, and the computing device files added to the channel; and subsequent to performing the file search, obtaining a search result.

2. The system of claim 1, the database system further configured to cause:

obtaining, from the computing device, a third request to filter the search result by one or more of: a date, a subject, or an author; and filtering the search result according to the third request.

3. The system of claim 1, the database system further configured to cause:

obtaining, from the computing device, a third request to see files associated with an identified cloud storage service; and subsequent to the third request, displaying, in the user interface at the computing device, information identifying one or more of a set of cloud files associated with the identified cloud storage service.

4. The system of claim 1, wherein the cloud storage services comprise one or more content management data sources.

5. The system of claim 1, wherein the list of cloud storage services is displayed in a files tab.

6. The system of claim 1, the database system further configured to cause:

providing for user composition of a post comprising a first selectable component identifying a cloud file, the post configured to be shared in a stream of a social networking system for display at a user device of a user of the social networking system.

7. The system of claim 6, wherein the first selectable component is configured to provide access to one or more operations associated with the cloud file identified by the first selectable component.

8. A computing device program product comprising computing device-readable program code to be executed by one or more processors when retrieved from a non-transitory computing device-readable medium, the program code comprising instructions configured to cause:

obtaining, from a computing device, a first request to add cloud storage to provide sharing of files stored in the cloud;

subsequent to the first request, displaying, in a user interface at the computing device, a list of cloud storage services with which a database system is capable of communicating, each cloud storage service being presented in the list with an associated one or more selections providing turning on or turning off file sharing and cloud file storage options for the cloud storage service;

obtaining, from the computing device, one or more picks of one or more of the cloud storage services in the list;

obtaining, from the computing device, a second request to upload and share files from the picked one or more cloud storage services;

subsequent to the second request, adding a plurality of cloud files from the picked one or more cloud storage services to a channel associated with a team of users, the adding of the plurality of cloud files comprising processing information received from the picked one or more cloud storage services, the information identifying the plurality of cloud files;

adding a plurality of computing device files from the computing device to the channel associated with the team of users;

obtaining, from the computing device, a search command comprising one or more of: a name, a keyword, or a phrase entered into a box in the user interface at the computing device;

performing, using the search command, a file search on: the plurality of cloud files added to the channel, and the computing device files added to the channel; and subsequent to performing the file search, obtaining a search result.

9. The computing device program product of claim 8, the instructions further configured to cause:

obtaining, from the computing device, a third request to filter the search result by one or more of: a date, a subject, or an author; and filtering the search result according to the third request.

10. The computing device program product of claim 8, the instructions further configured to cause:

obtaining, from the computing device, a third request to see files associated with an identified cloud storage service; and subsequent to the third request, displaying, in the user interface at the computing device, information identifying one or more of a set of cloud files associated with the identified cloud storage service.

11. The computing device program product of claim 8, wherein the cloud storage services comprise one or more content management data sources.

12. The computing device program product of claim 8, wherein the list of cloud storage services is displayed in a files tab.

13. The computing device program product of claim 8, the instructions further configured to cause:

providing for user composition of a post comprising a first selectable component identifying a cloud file, the post configured to be shared in a stream of a social networking system for display at a user device of a user of the social networking system.

14. A method comprising:

obtaining, from a computing device, a first request to add cloud storage to provide sharing of files stored in the cloud;

subsequent to the first request, causing display, in a user interface at the computing device, of a list of cloud storage services with which a database system is capable of communicating, each cloud storage service being presented in the list with an associated one or more selections providing turning on or turning off file sharing and cloud file storage options for the cloud storage service;

obtaining, from the computing device, one or more picks of one or more of the cloud storage services in the list;

obtaining, from the computing device, a second request to upload and share files from the picked one or more cloud storage services;

subsequent to the second request, adding a plurality of cloud files from the picked one or more cloud storage services to a channel associated with a team of users, the adding of the plurality of cloud files comprising processing information received from the picked one or more cloud storage services, the information identifying the plurality of cloud files;

adding a plurality of computing device files from the computing device to the channel associated with the team of users;

obtaining, from the computing device, a search command comprising one or more of: a name, a keyword, or a phrase entered into a box in the user interface at the computing device;

performing, using the search command, a file search on: the plurality of cloud files added to the channel, and the computing device files added to the channel; and subsequent to performing the file search, obtaining a search result.

15. The method of claim 14, further comprising:

obtaining, from the computing device, a third request to filter the search result by one or more of: a date, a subject, or an author; and filtering the search result according to the third request.

16. The method of claim 14, further comprising:

obtaining, from the computing device, a third request to see files associated with an identified cloud storage service; and subsequent to the third request, causing display, in the user interface at the computing device, of information identifying one or more of a set of cloud files associated with the identified cloud storage service.

17. The method of claim 14, wherein the cloud storage services comprise one or more content management data sources.

18. The method of claim 14, wherein the list of cloud storage services is displayed in a files tab.

19. The method of claim 14, further comprising:

providing for user composition of a post comprising a first selectable component identifying a cloud file, the post configured to be shared in a stream of a social networking system for display at a user device of a user of the social networking system.

20. The method of claim 19, wherein the first selectable component is configured to provide access to one or more operations associated with the cloud file identified by the first selectable component.

* * * * *